(12) United States Patent
Tormaschy et al.

(10) Patent No.: US 7,332,074 B2
(45) Date of Patent: Feb. 19, 2008

(54) WATER CIRCULATION SYSTEMS FOR PONDS, LAKES, AND OTHER BODIES OF WATER

(75) Inventors: Willard R Tormaschy, Dickinson, ND (US); Gary A Kudma, Dickinson, ND (US); Talt J Obritsch, Fairfield, ND (US); Joel J Bleth, Dickinson, ND (US); Corey M Simnioniw, Dickinson, ND (US)

(73) Assignee: PSI-ETS, a North Dakota partnership, Dickinson, ND (US)

( * ) Notice: Subject to any disclaimer, the term of this patent is extended or adjusted under 35 U.S.C. 154(b) by 420 days.

(21) Appl. No.: 11/067,061

(22) Filed: Feb. 25, 2005

(65) Prior Publication Data
US 2005/0142011 A1 Jun. 30, 2005

Related U.S. Application Data

(63) Continuation-in-part of application No. 10/749,064, filed on Dec. 30, 2003, now Pat. No. 7,285,208.

(60) Provisional application No. 60/437,217, filed on Dec. 31, 2002.

(51) Int. Cl.
*C02F 1/00* (2006.01)
*F16D 3/10* (2006.01)

(52) U.S. Cl. ............... 210/170.05; 417/61; 417/319; 464/106

(58) Field of Classification Search .......... 417/61, 417/319; 210/120.05, 120.08, 120.09; 403/360, 403/361, 381; 464/105, 106

See application file for complete search history.

(56) References Cited

U.S. PATENT DOCUMENTS

| | | | | |
|---|---|---|---|---|
| 1,530,326 | A | * | 3/1925 | Prindle .................... 464/71 |
| 2,827,268 | A | * | 3/1958 | Staaf ................. 210/170.09 |
| 3,204,768 | A | | 9/1965 | Daniel |
| 3,512,375 | A | * | 5/1970 | Bail et al. ............... 464/106 |
| 3,794,303 | A | | 2/1974 | Hirshon |
| 3,856,272 | A | | 12/1974 | Ravitts |
| 4,030,859 | A | * | 6/1977 | Henegar .................. 417/61 |
| 4,179,243 | A | * | 12/1979 | Aide ....................... 417/61 |
| 4,764,313 | A | | 8/1988 | Cameron et al. |
| 5,021,154 | A | * | 6/1991 | Haegeman ............ 210/221.2 |
| 5,122,266 | A | | 6/1992 | Kent |
| 6,273,402 | B1 | | 8/2001 | Cheng |
| 6,432,302 | B1 | * | 8/2002 | Obritsch et al. ...... 210/170.05 |
| 6,439,853 | B2 | * | 8/2002 | Tormaschy et al. ....... 417/61 |

FOREIGN PATENT DOCUMENTS

| CA | 1262052 | 10/1989 |
|---|---|---|
| JP | 11-47794 | 2/1999 |

* cited by examiner

*Primary Examiner*—Michael Koczo, Jr.
(74) *Attorney, Agent, or Firm*—W. Scott Carson

(57) ABSTRACT

Circulation systems for ponds, lakes, or other bodies of water using a flotation platform, dish, and impeller. One embodiment has a connecting arrangement between the drive motor and the impeller that permits the two to be easily and quickly coupled and uncoupled. The connecting arrangement also is designed to accommodate slight misalignments between the shafts. An arrangement to adjust and calibrate the depth of the inlet to the draft tube is disclosed. The system further includes solar panels that can be pivotally swung outwardly to open positions, angularly adjusted about a horizontal axis, and mounted to face toward the central axis of the flotation platform rather than away from it. Arrangements are further provided to monitor and control the components of the system including remotely from shore.

16 Claims, 32 Drawing Sheets

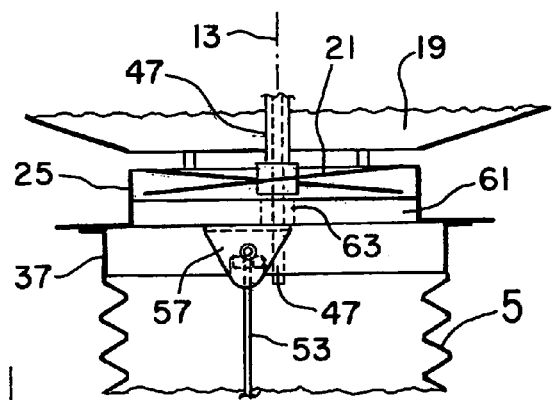
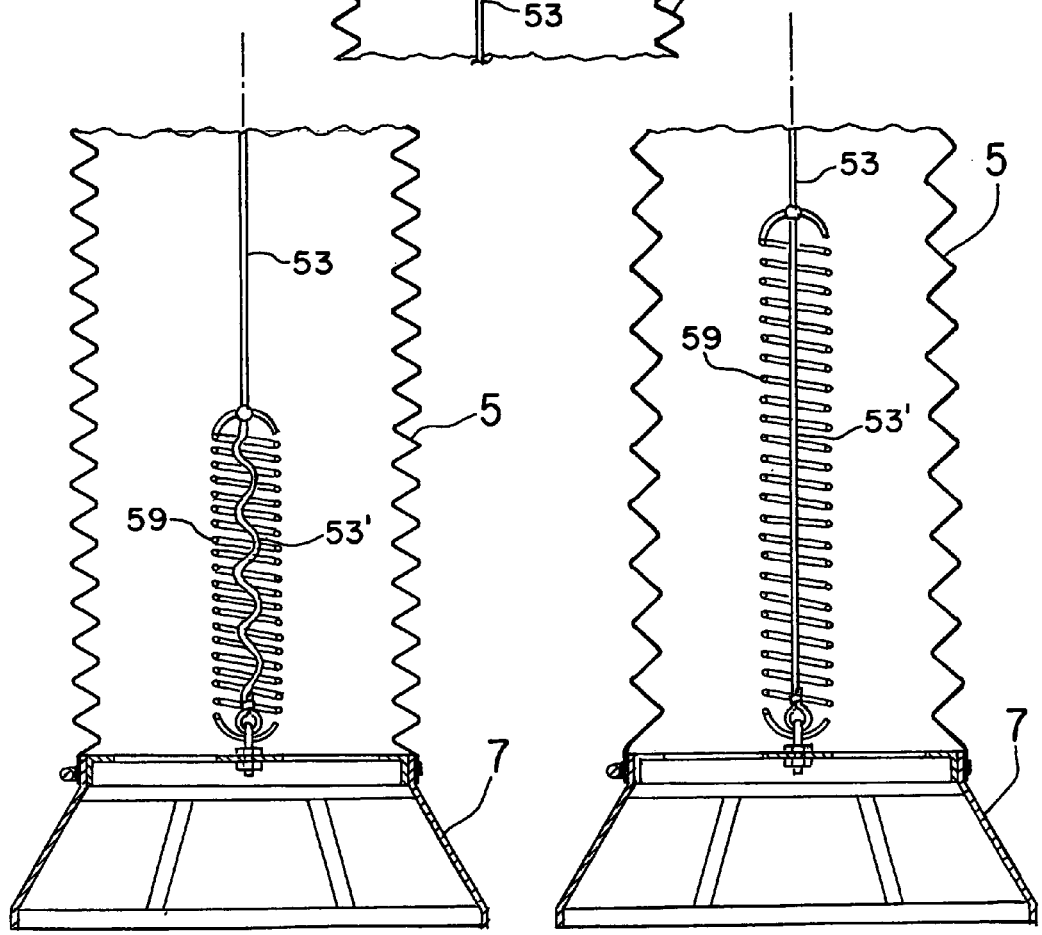
Fig. 8
Fig. 9          Fig. 10

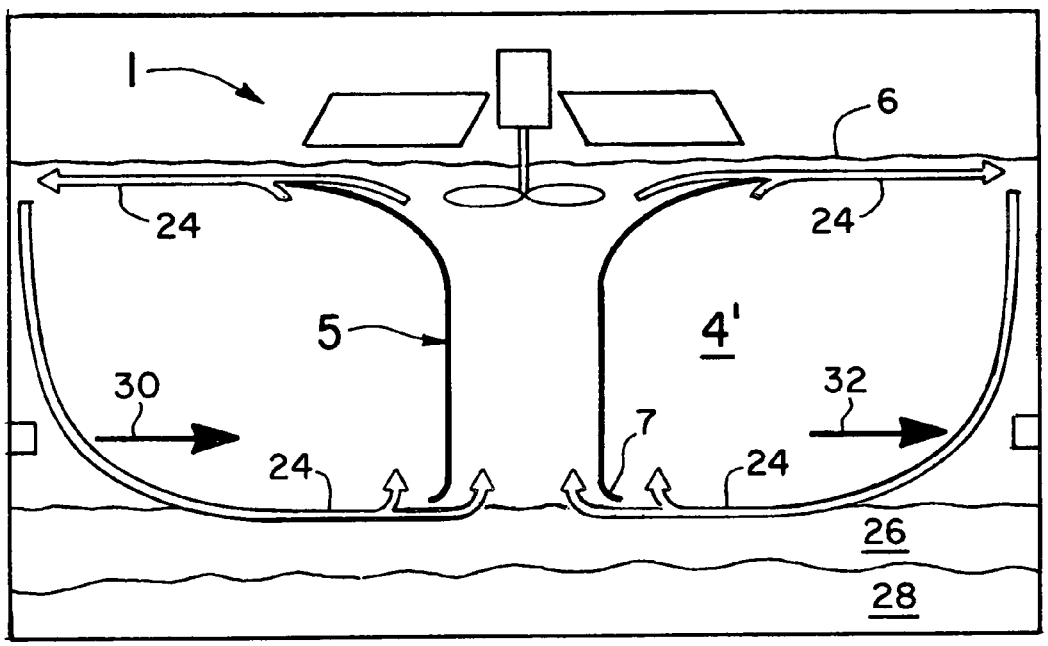
Fig. 13
Fig. 14
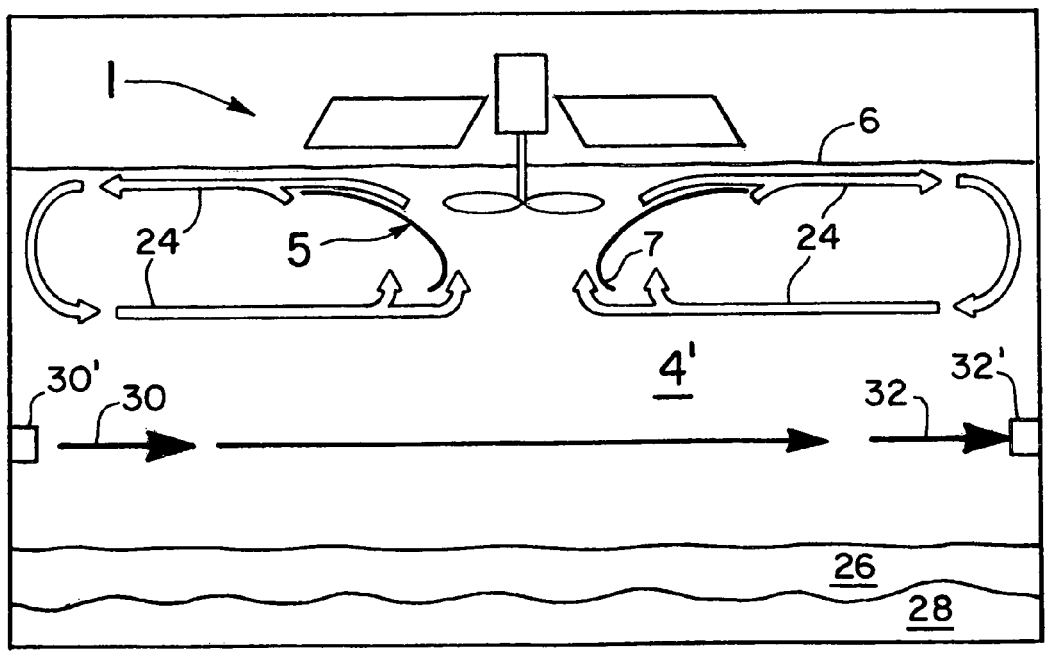

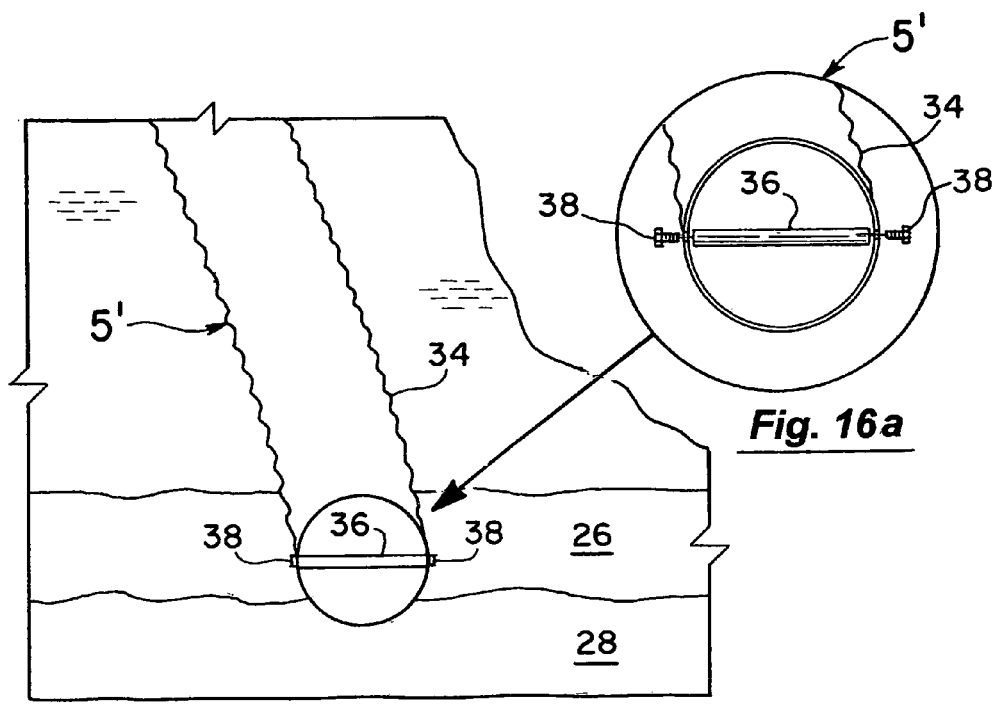
Fig. 16a
Fig. 16
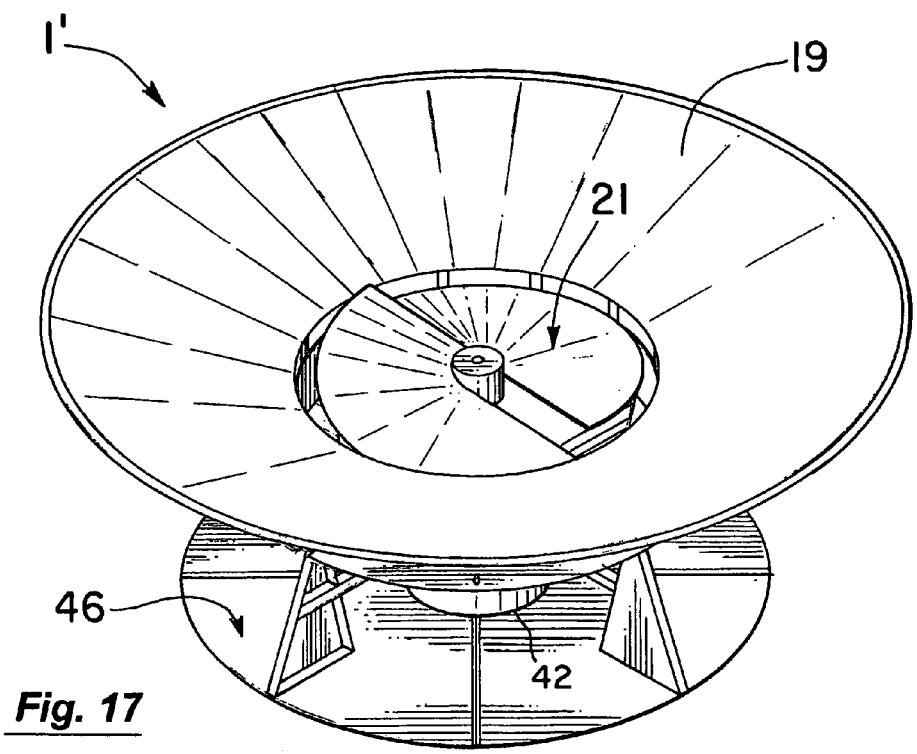
Fig. 17

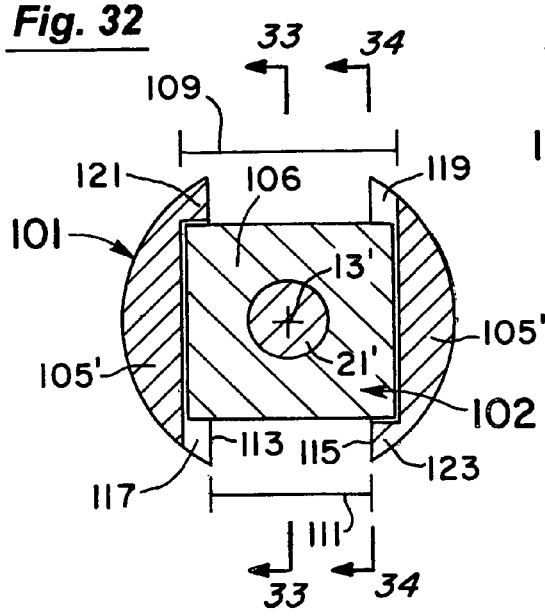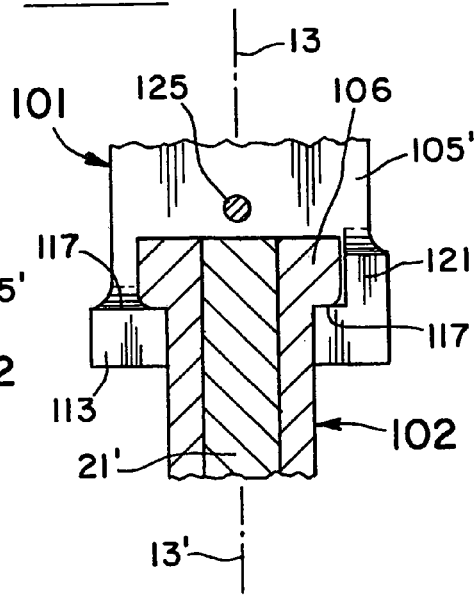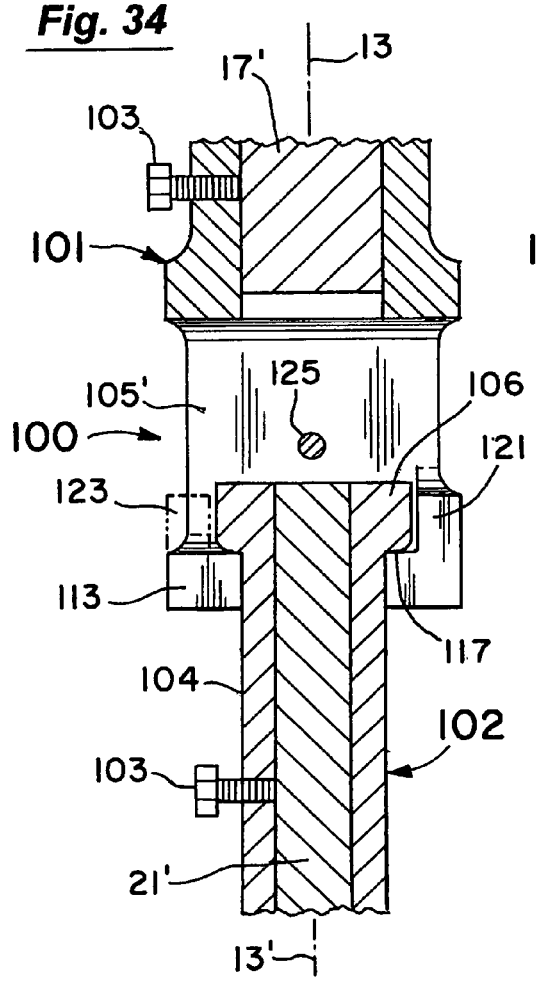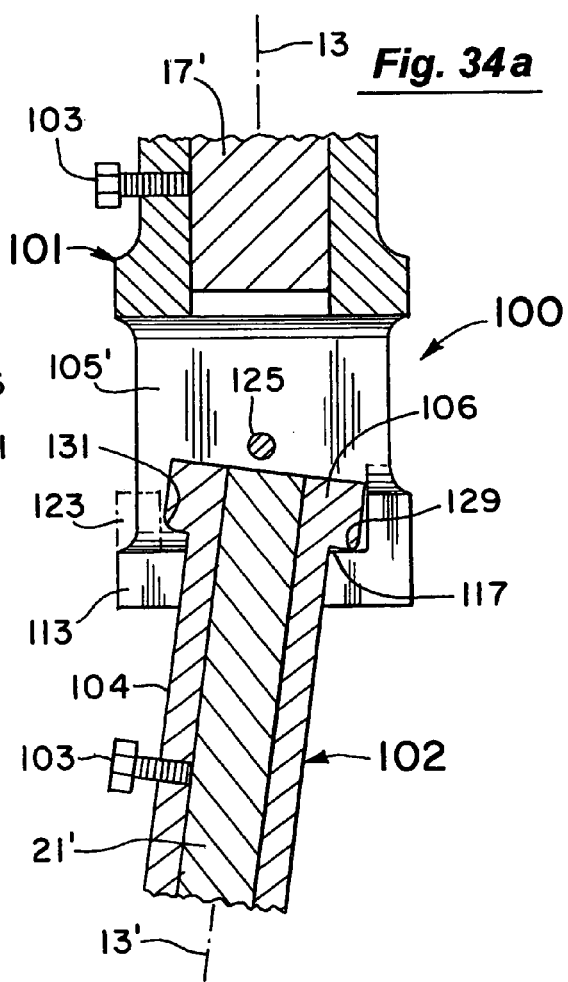

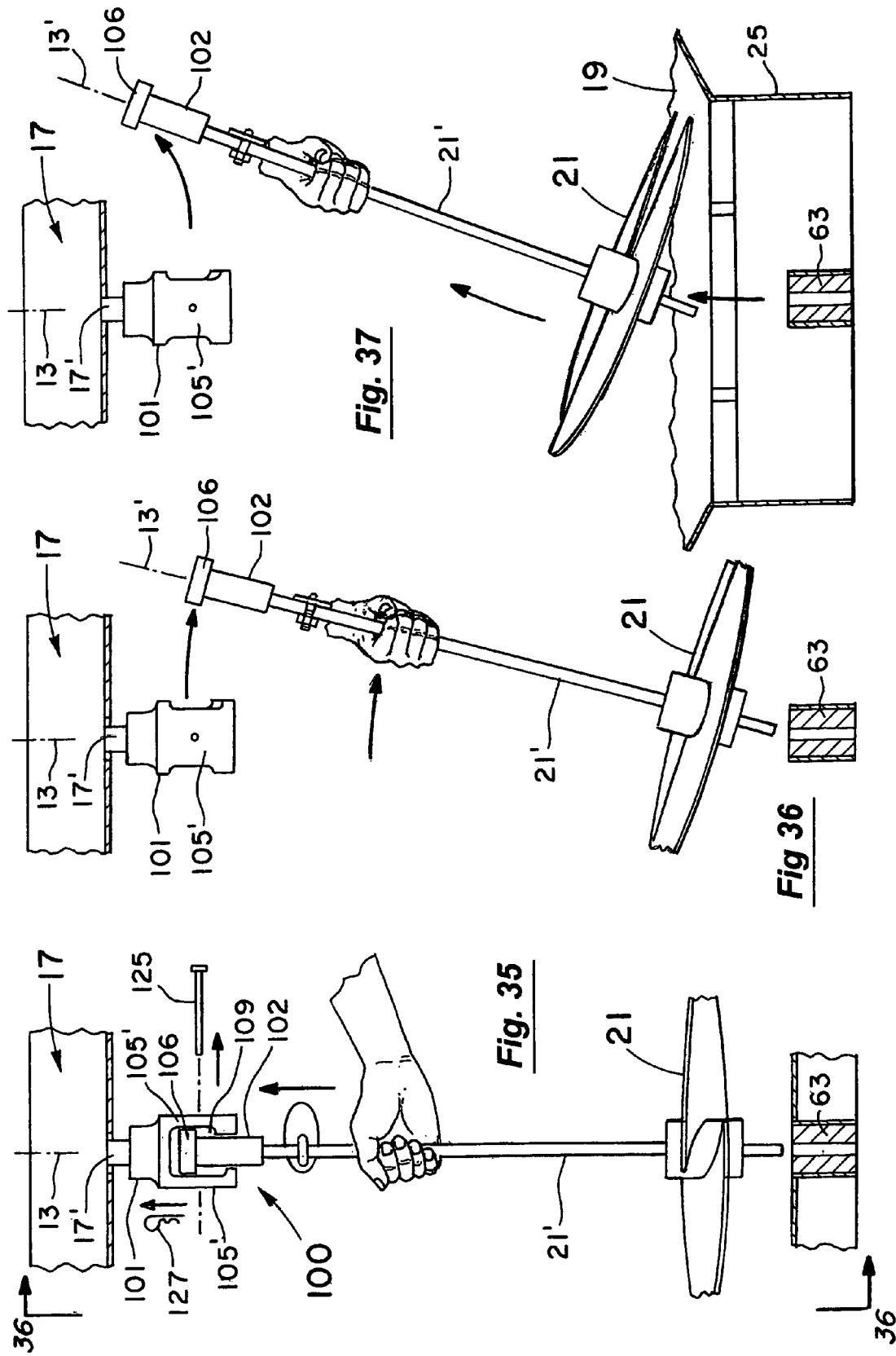

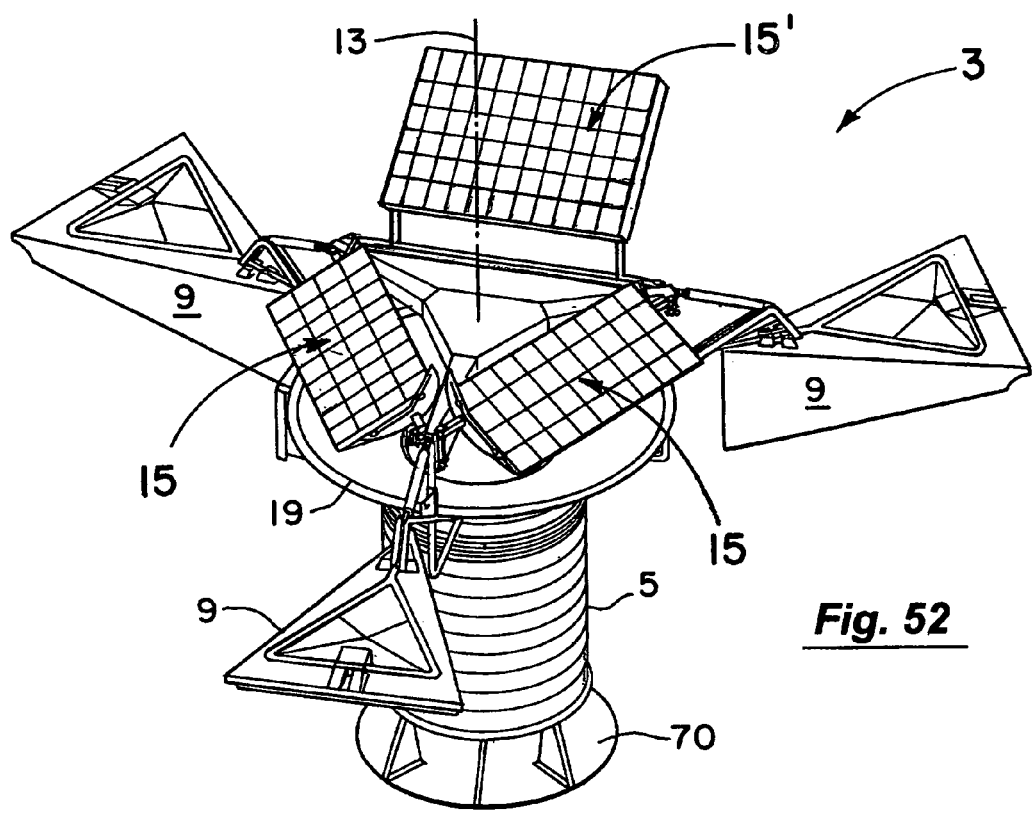
*Fig. 52*
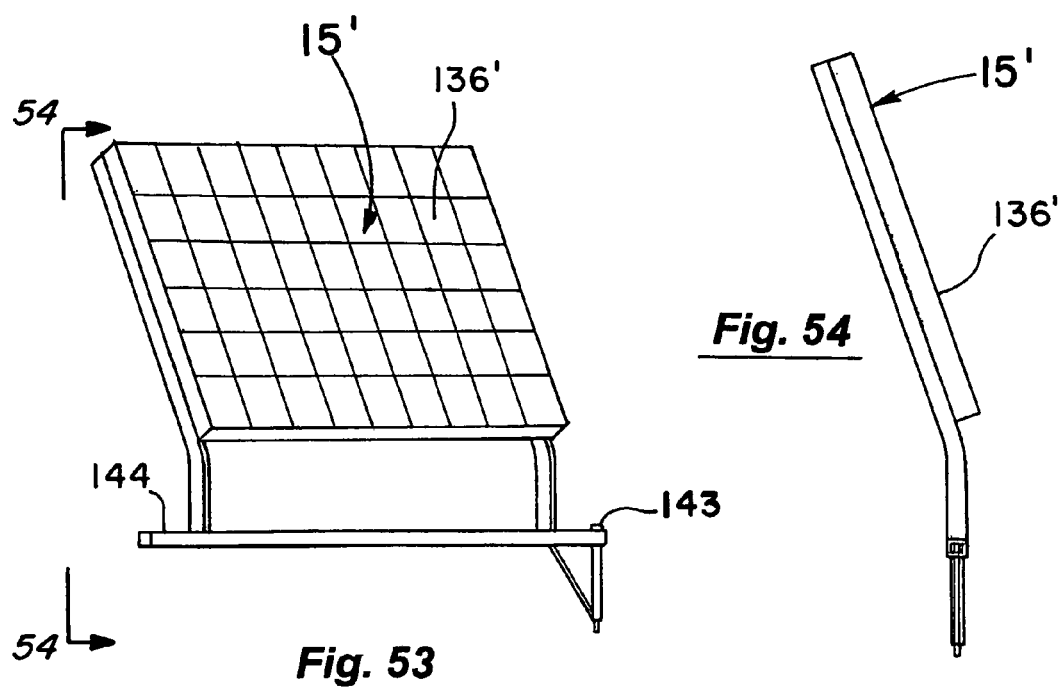
*Fig. 53*
*Fig. 54*

WATER CIRCULATION SYSTEMS FOR PONDS, LAKES, AND OTHER BODIES OF WATER

RELATED APPLICATIONS

This application is a continuation-in-part of U.S. patent application Ser. No. 10/749,064 filed Dec. 30, 2003 now U.S. Pat. No. 7,285,208, which claims the benefit of U.S. Provisional Patent Application Ser. No. 60/437,217 filed Dec. 31, 2002, both of which applications are incorporated herein by reference.

BACKGROUND OF THE INVENTION

1. Field of the Invention

This invention relates to the field of circulation systems for ponds, lakes and other bodies of water and more particularly to the field of such circulation systems for relatively large and deep bodies of water that require fairly high flow rates to be most effective and systems for smaller bodies such as municipal wastewater ponds that are designed primarily for treating domestic and industrial wastes and have special requirements to be effective.

2. Discussion of the Background

In regard to larger and deeper bodies of water that require high flow rates to be most effective, the fundamental goal of such systems is to create a nearly laminar surface flow out to the edges of the pond while uplifting water from the bottom depths of the pond. In doing so, the oxygen depleted water from the bottom depths is exposed to and absorbs oxygen from the atmosphere while undesirable gases such as hydrogen sulfide are passed off into the atmosphere. Additionally, an overall circulation pattern is generated in the pond that mixes the reaerated water throughout the entire pond. Such mixing in turn accelerates the biological and solar processes that clean up the water. The resulting cleansing is particularly desirable as it relates to controlling or removing weed growth, algae bloom, sludge buildup, fish kills, odors, high amounts of nitrogen and phosphorus, acidity, suspended solids, and other conditions.

Power availability to run the pump or impeller of the circulation system and seasonal weather conditions (e.g., surface ice) present great design challenges for optimum performance. Remote ponds or other bodies of water can be a particular challenge as the only available power source may be solar energy. Yet, the impeller of the system preferably will be able to lift and induce the flow of relatively large volumes of water from relatively large depths, as for example 30 to 50 or more feet. Further, the upflow or lifting must be done in a manner that spreads the water gently and evenly across the surface of the pond in a nearly laminar flow pattern. Otherwise, the overall flow and mixing of the uplifted water will not reach the edges of the pond and will simply be concentrated in the immediate area of the impeller leaving the outer reaches of the pond stagnant and untreated.

In a well designed system as indicated above, the surface of the pond would be continually renewed with water drawn up from the bottom depths while maintaining a laminar surface flow out to the edges of the pond. The surface water will then absorb oxygen from the atmosphere while undesirable gases such as hydrogen sulfide pass out of the water into the atmosphere. Among other beneficial actions, such surface reaeration and subsequent mixing and diffusion of the aerated water throughout the depths of the pond will increase desirable aerobic activity. It will also reduce suspended and dissolved solids in the water increasing pond clarity and aiding sunlight penetration and heat transfer for further cleaning.

In circulation systems for smaller bodies of water such as municipal wastewater ponds for treating domestic and industrial wastes, the high flow circulation pattern throughout the entire body of water discussed above is not always effective to process the wastes and in some cases can be counterproductive. One problem in such smaller ponds (e.g., 5 to 15 feet deep) is that the domestic and commercial wastes are usually much stronger and more concentrated. Also, such municipal wastewater ponds rely on more complicated mechanisms including biological and chemical ones for treating and processing the waste. These mechanisms involve the establishment of an upper, aerobic zone and a lower, anaerobic zone. Each zone is essential for the proper and overall treatment and processing of the various and different waste materials and each zone has its own biological and chemical needs that are often the opposite of the other and often detrimental to the other. Consequently, any thorough and overall mixing of the entire pond as in the earlier high flow systems for larger bodies of water will normally destroy the two zones and the effectiveness of the wastewater treatment pond.

With these and other considerations in mind, the water circulation systems of the present invention were developed.

SUMMARY OF THE INVENTION

In one set of embodiments of the present invention that are primarily designed for larger and deeper bodies of water, a high flow circulation system is disclosed. The high flow system draws water up from the depths of a pond, lake, or other body of water for exposure to the atmosphere and generates a desirable, overall circulation pattern throughout the entire body of water. The system includes a flotation platform, dish, impeller, and draft tube depending from an annular housing. The dish is supported just below the surface of the water and the bottom of the dish is spaced from the top of the housing to create an annular opening.

In operation, water from the depths of the pond is uplifted by the impeller through the draft tube toward the housing and dish. In doing so and in the preferred manner of use, the uplifted water passes out not only up over the upper edge of the dish but also out the annular opening between the housing and the dish. Preferably, about ⅔rds of the volume of the uplifted water passes out the annular opening and ⅓rd continues upwardly into and out of the dish. With this design, a significantly higher flow rate can be handled by the system without creating undesirable turbulent flow at the surface of the pond or other body of water.

The impeller preferably includes two, half blades with diameters less than the diameters of the housing and the bottom of the dish. In this manner, a gap is created between the blades and the housing as well as the dish which generates less turbulence in the uplifted water. The smaller diameters also permit the vertical positioning of the impeller blades relative to the dish and housing to be adjusted. This adjustment in turn allows the proportions of the uplifted water discharged through the annular opening and over the top of the dish to be varied as desired.

The draft tube is specially constructed to have a neutral or slightly positive buoyancy and a cable arrangement is provided to selectively adjust the extended length and depth of the collapsible tube. The cable arrangement includes a spring to aid in protecting the main cable and tube from damage from the uplifting forces of surface waves on the flotation platform. Additionally, the arrangement includes a short length of cable positioned adjacent the spring which limits the maximum extension of the spring and overall cable arrangement to protect the draft tube from being stretched beyond its design limits. An electronic eutrophication control system can also included to create apatite from calcium and phosphate molecules present in the water.

In the set of embodiments specifically intended for use in relatively small (e.g., 5 acres) and shallow (e.g., 5 to 15 feet) municipal wastewater ponds, many of the structural features of the high flow systems are used but their operation is modified. As for example, the impeller is still used to create a laminar flow pattern out to the edges of the pond but instead of having the draft tube draw up relatively large volumes of water from adjacent the bottom of the pond, only a very small or metered amount is drawn up. The circulation path of the water created by the impeller is then concentrated and preferably limited to the upper aerobic zone (e.g., top 2 feet of the pond). In this upper zone, the circulating and aerating of the flow are most beneficial and advantageous to the biological and chemical actions of the upper zone. The lower anaerobic zone (e.g., bottom 2 feet of the pond) is then essentially left alone and unaffected by the circulating flow established in the upper zone. The proper environment for the desirable biological and chemical actions of the lower zone is then not destroyed (e.g., by introducing dissolved oxygen from the upper zone into the lower one). Similarly and because the upper and lower zones are substantially isolated from one another, the biological and chemical actions of the upper zone are not detrimentally harmed by being thoroughly mixed as in the high flow systems. Nevertheless, it is still desirable for the overall treatment of the wastewater in the pond to bring up and mix very small volumes from the lower zone into the upper zone. In the second set of embodiments, this is accomplished by structure and its operation in a very careful and controlled manner.

Still other embodiments include a connecting arrangement between the drive motor and the impeller that permits the two to be easily and quickly coupled and uncoupled. The connecting arrangement also is designed to accommodate slight misalignments between the drive shaft of the motor and the driven shaft of the impeller. An arrangement to adjust and calibrate the depth of the inlet to the draft tube is disclosed. Solar panels are also provided which can be pivotally swung outwardly to open positions to provide better visibility and access to the interior of the flotation platform and the components on it including the impeller. The solar panels are additionally mounted via slotted tracks for movement about a horizontal axis and a modified panel is disclosed that faces toward the central axis of the flotation platform rather than away from it. Arrangements are further provided wherein the operation of the system can be monitored and controlled including remotely from shore or a central location.

Other features and modifications to the parts and operation of the circulating systems of the present invention are also disclosed to adapt them for use in additional environments and situations.

BRIEF DESCRIPTION OF THE DRAWINGS

FIG. 8 is a view taken along line 8-8 of FIG. 7.

FIG. 9 illustrates the operation of a safety feature of the cable arrangement wherein the spring of FIG. 7 expands to absorb the uplifting force of a surface wave on the flotation platform and protect the main cable from damage.

FIG. 10 illustrates the operation of the short length of safety cable adjacent the spring to protect the spring and more importantly the tube from being stretched beyond their design limits.

FIGS. 13 and 14 schematically illustrate difficulties in setting the proper depth of the inlet to the draft tube of circulating systems like those of FIG. 1 in the environment of a wastewater treatment pond in which it is desirable to have both aerobic and anaerobic zones.

FIG. 16 is a view taken along line 16-16 of FIG. 15.

FIG. 16*a* is an enlarged view of a portion of FIG. 16.

FIG. 17 is a perspective view of the dish, impeller, housing, and plate member of the circulating system of FIG. 15.

FIGS. 29-37 illustrate the connecting arrangement of the embodiment of FIG. 28 between the shafts of the drive motor and the impeller, which permits the two to be easily and quickly coupled and uncoupled.

FIGS. 51-54 show an array of solar panels with a modified panel that faces the central axis of the flotation platform rather than away from it.

DETAILED DESCRIPTION OF THE INVENTION

Figure 1:
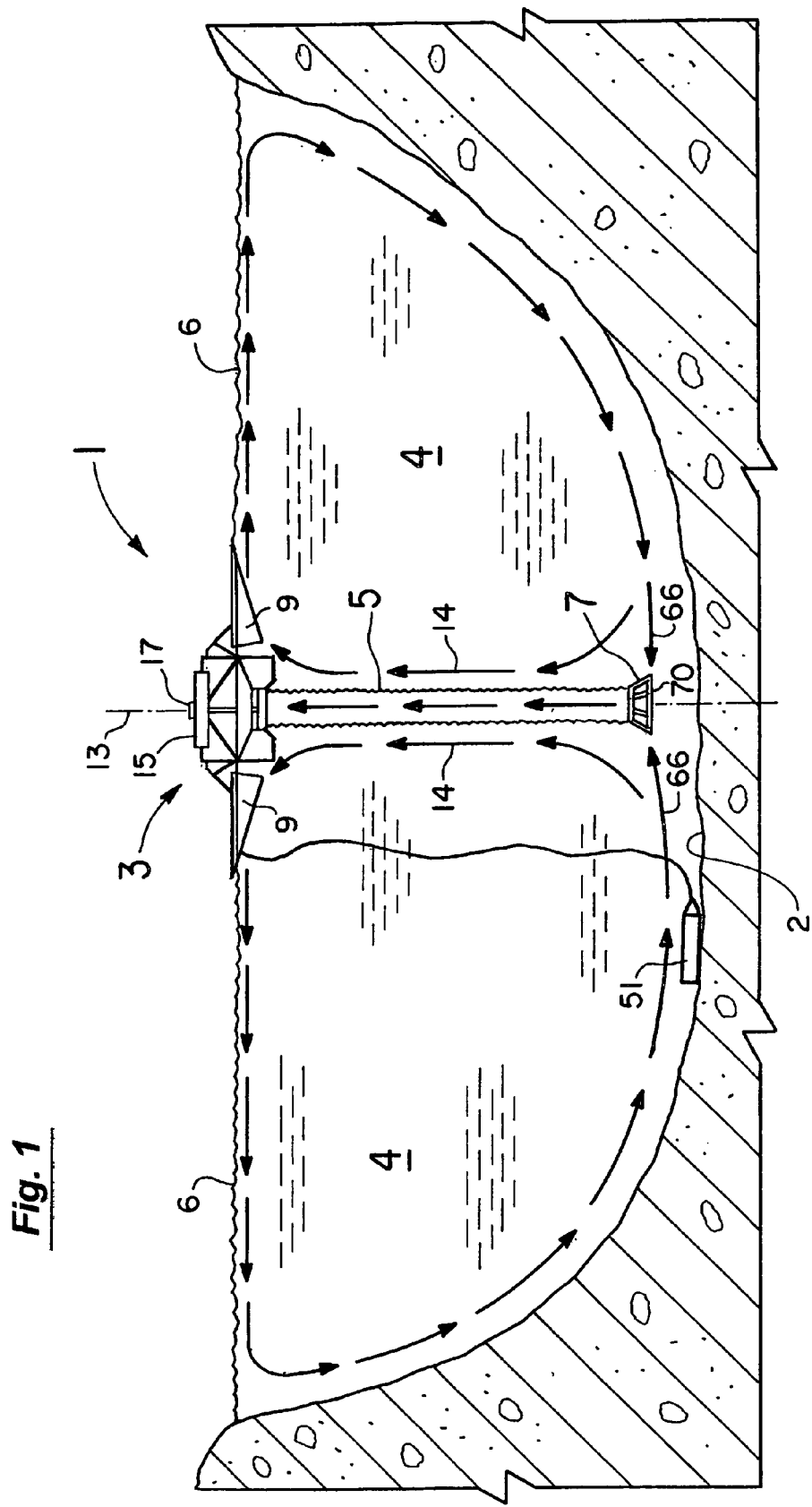
FIG. 1 is a cross-sectional view of the circulation system of a first set of embodiments of the present invention in use to create an overall flow pattern out to the edges and down to the depths of the pond or other body of water.
Figure 2:
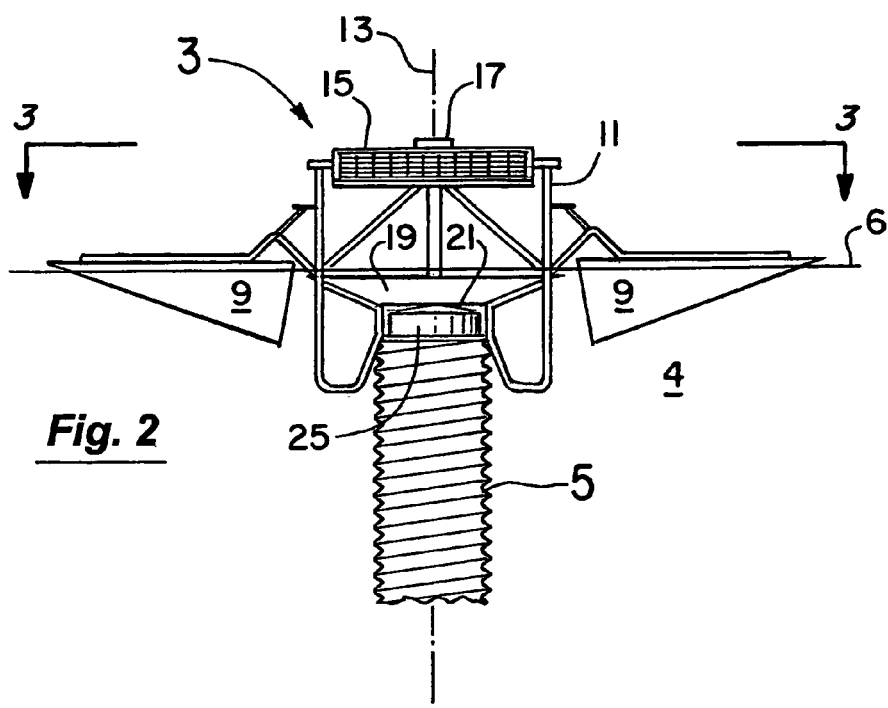
FIG. 2 is an enlarged view of the flotation platform of the system.
Figure 3:
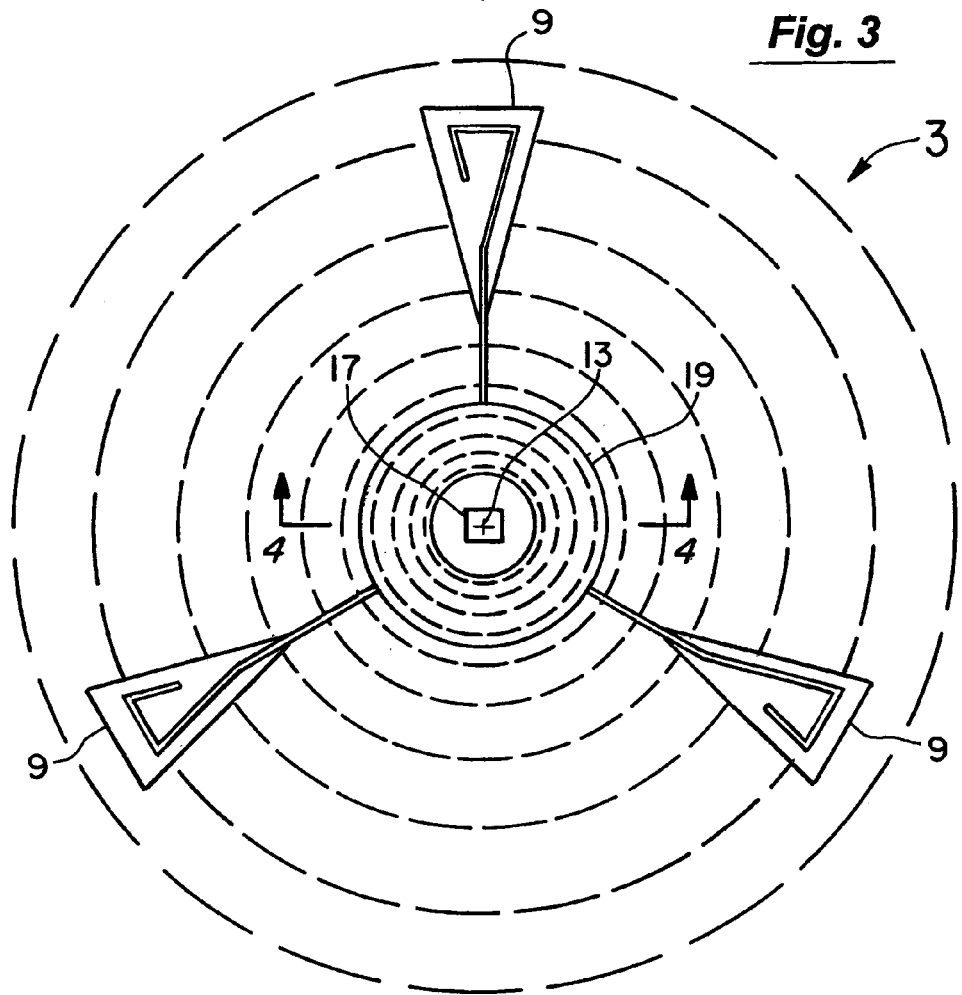
FIG. 3 is simplified, top plan view taken generally along line 3-3 of FIG. 2 showing the flotation platform and the laminar surface flow created circumferentially about the dish of the present invention.
Figure 5:
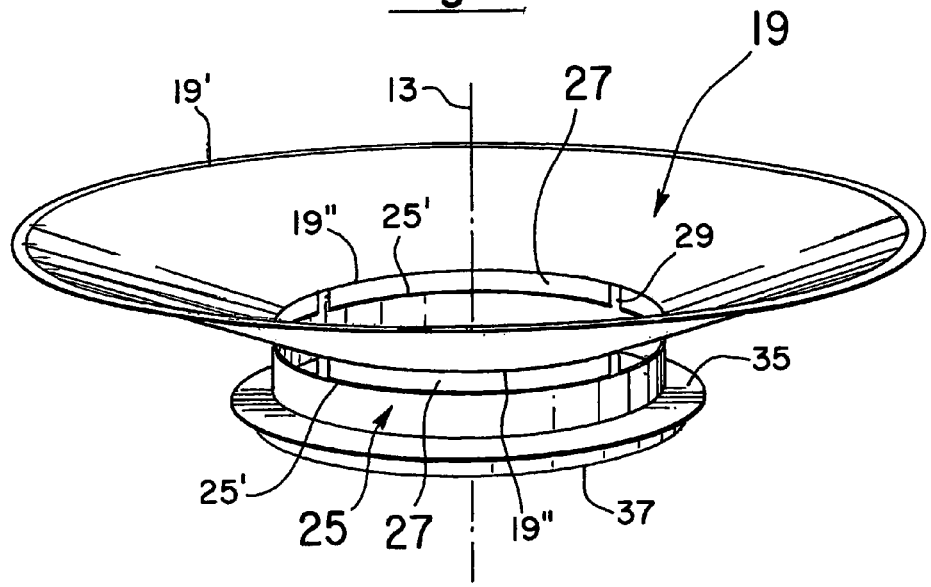
FIG. 5 is a perspective view of the dish and housing of the present invention showing the annular opening created between them.
Figure 6:
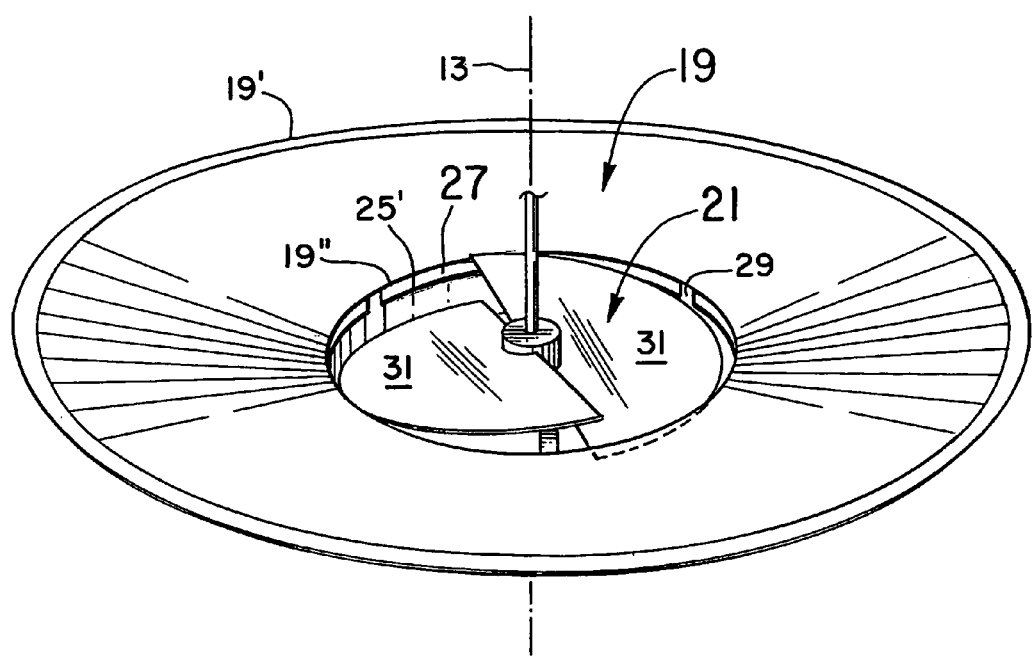
FIG. 6 is a perspective view similar to FIG. 5 but additionally showing the preferred positioning of the impeller blades relative to the dish and housing.

As schematically shown in FIG. 1, the water circulation system 1 of a first set of embodiments of the present invention includes an upper flotation platform 3 with a draft hose or tube 5 depending downwardly from it to the water inlet 7. The inlet 7 is preferably positioned adjacent and slightly raised from the bottom 2 of the pond or other body of water 4. The flotation platform 3 as best seen in FIGS. 2 and 3 includes three floats 9 supported on the tubular frame 11 of the platform. The floats 9 extend outwardly of the central axis 13 and are preferably evenly spaced about the axis 13 (see FIG. 3). The floats 9 extend far enough out from the central axis 13 to provide a relative stable and buoyant support structure for the system 1 including its solar panels 15, electric motor 17, dish 19 (see also FIGS. 4 and 5), impeller 21 (see also FIGS. 4 and 6), draft hose 5, and the water inlet 7 of FIG. 1. As explained in more detail below, the draft hose 5 is also specially designed to be essentially neutrally or slightly buoyant over its length, further adding to the stability of the system 1.

The overall buoyancy of the system 1 and in particular the platform 3 is preferably design to support the upper edge or lip 19' (see FIG. 4) of the dish 19 about 3 inches or so below the surface 6 of the pond or other body of water 4. Additionally, as perhaps best seen in FIG. 4, the bottom edge 19" of the dish 19 is spaced (e.g., 1.5 inches) from the upper edge 25' of the housing 25 to create an annular opening 27 extending about the axis 13 (see also FIG. 5). Spacers 29 as illustrated in FIG. 5 support the dish 19 and housing 25 apart to create the opening 27. The spacers 29 preferably are as few and small as possible so that the opening 27 extends substantially continuously and completely about the central axis 13. Preferably, the total amount of the opening 27 is at least 320 degrees or higher about the axis 13 with the spacers 29 then obscuring only a relatively small amount of the remaining 360 degrees.

As explained in more detail below, the impeller 21 is vertically adjustable along the axis 13. However, in the preferred positioning of FIGS. 4 and 6, the two cross blades 31 of the impeller 21 are symmetrically centered with half of each blade 31 above and below the horizontal plane of the lower dish edge 19" (see FIG. 4). In this regard, the diameter of the dish 19 at the top or upper edge 19' is about 6 feet. The dish 19 itself is approximately 6 inches deep and slopes downwardly and inwardly to the bottom or lower edge 19", which has a diameter of about 30 inches. The blades 31 of the impeller 21 are preferably about 27 inches across with the outer edges or tips being vertically spaced from each other about 4 inches. Each half blade 31 is inclined to the vertical axis 13 at about 15 degrees. The annular housing 25 in FIG. 4 (which essentially forms the upper end portion or outlet for the flexible draft tube 5) is approximately 30 inches in diameter. The housing 25 has an outwardly extending flange 35 (see FIG. 4) to which the depending flange 37 is affixed. The diameter of the depending flange 37 is about 36 inches. The upper rim of the flexible draft hose 5 (see FIG. 4) then extends about the depending flange 37 and is secured thereto by a band clamp 39.

Figure 4:
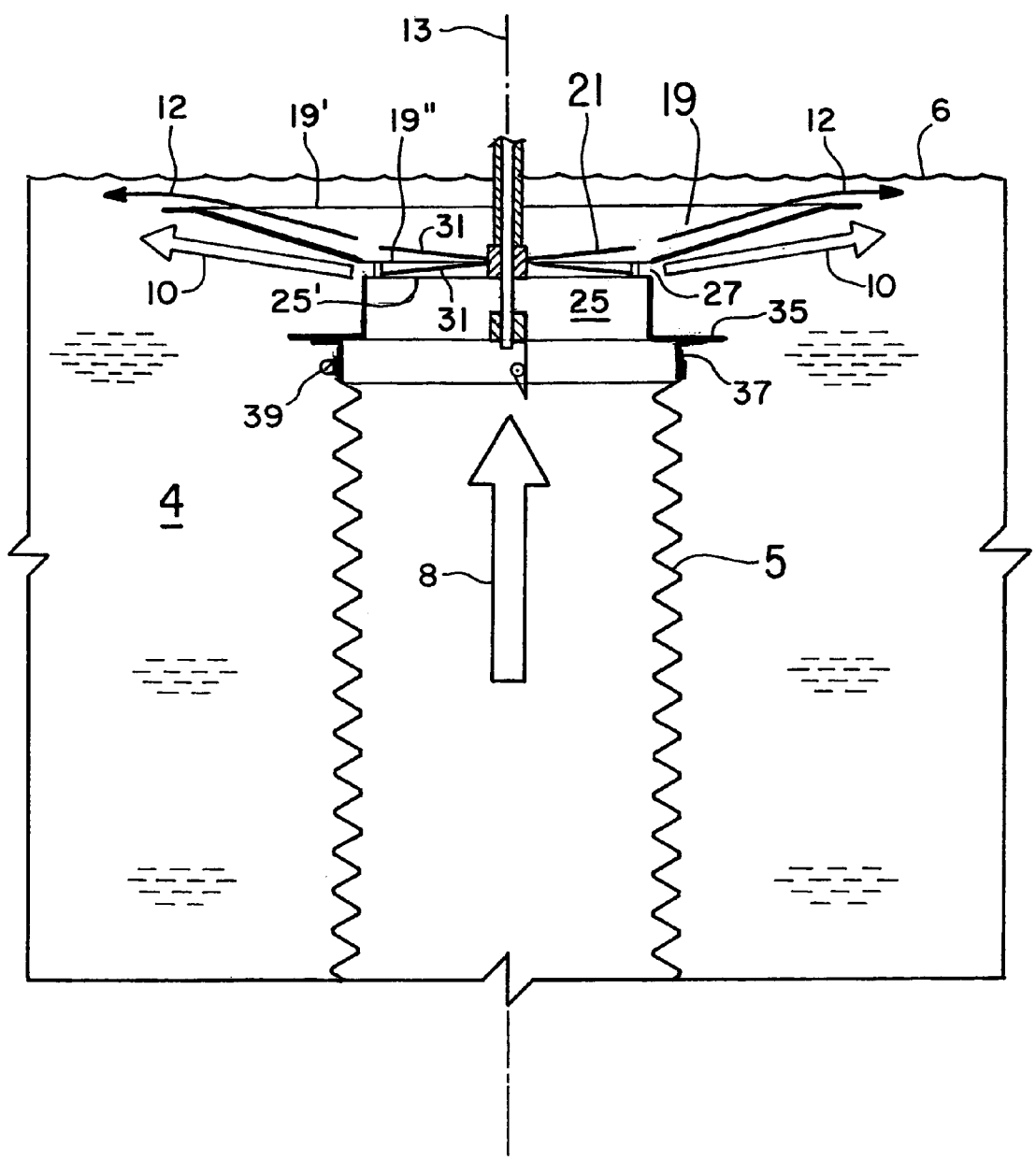
FIG. 4 is a view taken along line 4-4 of FIG. 3 illustrating the details of the flotation platform including the annular opening between the bottom of the dish and the top of the housing attached to the draft tube.

In operation as best seen in FIGS. 1 and 4, the impeller 21 (FIG. 4) is rotated about the axis 13 to draw water into the bottom inlet 7 (FIG. 1). The water is then uplifted through the draft hose 5 toward the housing 25 and dish 19. In doing so and in the preferred manner of operation, the volume of uplifted water (represented schematically by arrow 8 in FIG. 4) passes out not only up over the upper edge 19' of the dish 19 but also out the annular opening 27 between the housing 25 and the dish 19. Preferably, about ⅔rds of the volume of the uplifted water 8 passes out the annular opening 27 (schematically represented by arrows 10) and ⅓rd continues upwardly into and out of the dish 19 (see arrows 12). The uplifted water 8 in FIG. 4 is then discharged both below and above the dish 19.

In this last regard, it was discovered in using water circulation systems such as those of U.S. Pat. Nos. 6,432,302 and 6,439,853 (which are incorporated herein by reference) that significantly higher flow rates were needed to treat larger and deeper bodies of water. However, when the flow rates of the prior designs were increased, the surface discharge from the dish became undesirably turbulent. That is, when the flow rate was increased (e.g., from 450 gallons per minute to 3000) in order to generate the desired circulation pattern of FIG. 1 in larger and deeper bodies of water (e.g., 300 acres at 30 feet versus 30 acres at 12 feet), the surface discharge of FIG. 3 from the 6 foot dish of the prior designs no longer remained laminar. Consequently, the turbulent surface flow outwardly of the top of the dish only carried out to cover about a 5 acre circle (versus the normal 30 acre circle of such devices with the lesser but laminar surface flow). Lowering the upper edge of the dish more than 1 inch below the water surface of these prior devices did not help as the surface flow was still turbulent at the higher flow rates. It was contemplated to use a larger dish (e.g., 18 foot diameter versus 6) but this was not commercially feasible for manufacturing and shipping reasons. It was then discovered that by providing an annular opening 27 between the bottom of the dish 19 and the top of the housing 25, the circulation system 1 of the present invention could handle significantly larger flow rates (volumes) without creating undesirable surface turbulence. Further, the system 1 could do so still using only a relative small (e.g., 6 foot) dish 19.

The increased flow rate additionally induced much larger flows 14 (see FIG. 1) along the outside of the draft tube 5 further enhancing the ability of the present invention to treat much larger and deeper bodies of water than the prior devices. Even in smaller and shallower ponds that previously used a plurality of the prior devices for complete treatment, the present design was more efficient as fewer of them were needed to accomplish the same results. In most cases, a single system of the present design could replace four to six of the prior designs.

It is noted that in the prior systems of U.S. Pat. Nos. 6,433,302 and 6,439,853, their impellers were positioned completely in the dish above the plane of the lower edge of the dish. Further, the blades of their impellers extended outwardly beyond the diameter of the lower edge of the dish as well as the diameters of the housing and draft tube below it. The positioning of the impeller and its blades in this regard was limited to being in the dish. In contrast, the blades 31 of the impeller 21 of the present invention have diameters (e.g., 27 inches) less than the diameter (e.g., 30 inches) of the lower dish edge 19″ and the housing 25 below it. Consequently, there is a 1.5 inch annular gap or spacing between the outer diameter of the blades 31 and the circumferences of the lower dish edge 19″ and the housing 25. Additionally, each blade 31 as discussed above is preferably positioned half above and half below the horizontal plane of the lower dish edge 19″ (see FIGS. 4 and 6). By so dimensioning the diameters of the blades 31 to be smaller and positioning the blades 31 as discussed above, it was discovered that the blades 31 could lift a significantly higher volume of water than those of the prior devices (e.g., 3000 gallons per minute versus 450). Additionally, this could be done running the blades 31 at lower revolutions per minute than in the prior devices (e.g., 100 versus 150) and using less wattage (e.g., 80 watts versus 96). In terms of gallons per minute of flow per watt of energy used, the gain over prior devices was about 800 or more percent (e.g., 35 gpm/watt versus 4-4.5).

This performance improvement is believed to be due in part to a reduction in the turbulence and bounce back of the water outwardly against the housing 25 and draft tube 5 as the water is being uplifted by the impeller 21. Similarly, it is believed that with the gap versus a positive displacement arrangement, the lifting effect of the blades 21 induces a less turbulent flow along the walls of the draft tube 5. In this regard, the blades 31 (with 27 inch diameters as projected on a plane perpendicular to the axis 13 and together extending completely about the axis 13) preferably occupy about 80-90 percent of the cross-sectional area of the 30 inch diameter housing 25. The gap is then believed to work in conjunction with the upward water flow through the draft tube 5 to allow the water coming off the sides of the impeller 21 to turn and flow upward instead of tangentially outward and away from the center of the impeller 21. In operation and with reduced turbulence and bounce back, less energy is lost and higher flow rates are achieved. Empirically, it was determined that without the annular gap or spacing, the flow rate dropped 20 percent. The gap together with the slower rotation of the impeller 21, larger diameter blades 31, and larger pitch or bite of the blades 31 (e.g., 4 inches versus 1) all contribute to significantly improving the overall performance of the present system over prior designs.

The higher flow rate of the present invention additionally enables the dish 19 to be submerged lower below the surface 6 of the water (e.g., from 1 inch in the prior devices to 3 inches). The advantage of being able to lower the dish to 3 inches is particularly significant in many locations in that on a cold night, a 1 inch thick layer of ice can easily form on the water surface. Consequently, when the sun comes up and the impeller is restarted, the top of the dish of prior devices would often be completely plugged by the ice layer and no flow could pass out over the top of the dish. In an effort to overcome this, very small and narrow, radial slits in the dish were provided in the main body of the dish of the prior devices. The purpose of these radial slits was to allow a very limited amount of upward flow of warmer water from the bottom of the pond in an effort to melt the ice cap. In normal operation, no flow would pass through these radial slits and it was only when ice plugged the top of the dish that it would. However, even then, it was not enough in most cases to efficiently melt the ice cap and it was necessary to wait for the surface conditions (e.g., sun) to improve to melt the ice. In contrast and with the present invention, the dish 19 can be submerged lower in the water (e.g., 3 inches versus 1) so that it is less likely an overnight freeze will create a blocking cap. Further, even if it does, the annular opening 27 between the dish 19 and housing 25 will permit high volumes of water to pass out (e.g., 80 percent of the normal capacity of the impeller 21 or about 2400 gallons per minute). This will create an overall circulation pattern similar to the one of FIG. 1 to begin treating the water. It will also bring up significant amounts of the warmer water from the bottom 2 to help melt the ice cap above the dish 19. The uplifted water will then also begin melting the surface ice outwardly of the dish 19 to eventually establish the full surface and subsurface circulation pattern of FIG. 1.

As mentioned above, the impeller 21 of the present invention is vertically adjustable relative to the dish 19 and housing 25 (which essentially forms the upper end portion or outlet for the draft tube 5). As perhaps best seen in FIG. 7, the electric motor 17 for the impeller 21 is mounted on a plate 41 that can be raised or lowered relative to the frame 11 by rotation of the threaded bolts 43. That is, by rotating the bolts 43 relative to the nuts 45 affixed to the plate 41, the plate 41 and motor 17 can be raised or lowered as desired. The advantage of this adjustability is that the relative proportion of the uplifted water 8 in FIG. 4 that passes out the opening 27 versus up and over the dish 19 at 12 can be varied. As for example and by lowering the motor 17 (including the shaft 47 and attached impeller 21) to the position of FIG. 7, a higher percentage of the uplifted water in the draft tube 5 will pass out the opening 27 than in the raised position of FIG. 4. Conversely, if it is desirable for a particular operating condition to have more of the uplifted water pass up and out over the top of the dish 19, the impeller 21 can be raised toward or beyond the position of FIG. 4. As mentioned above, the relative portions of the uplifted water passing out the annular opening 27 versus up through and out the top edge 19′ of the dish 19 in FIG. 4 is about 2:1. However, by adjusting the vertical positioning of the impeller 21, this ratio can be varied as desired to be higher (e.g., 3:1) or lower (e.g., 1:1).

As briefly mentioned above, the draft hose or tube 5 is preferably designed to be neutrally or slightly positively buoyant. It is also designed to be collapsible from an extended length of about 26 feet down to four feet for ease of shipping and handling. Additionally, the extended length of the hose 5 has been made to be adjustable for use in bodies of water of different or varying depths. In this manner, the water inlet 7 (see FIG. 1) of the hose 5 can then be positioned as desired relative to the bottom 2 of the body of water 4. The inlet 7 in this regard essentially forms the lower end portion of the draft tube 5. Preferably, the inlet 7 in most cases does not actually rest on the bottom 2 but is slightly raised (e.g., 3-4 feet) above it. Another feature of the draft hose 5 of the present invention is an arrangement to allow for dampening the effect of surface waves (which in larger bodies of water can often be quite significant) and protecting the structure of the system 1 from being damaged.

Figure 7:
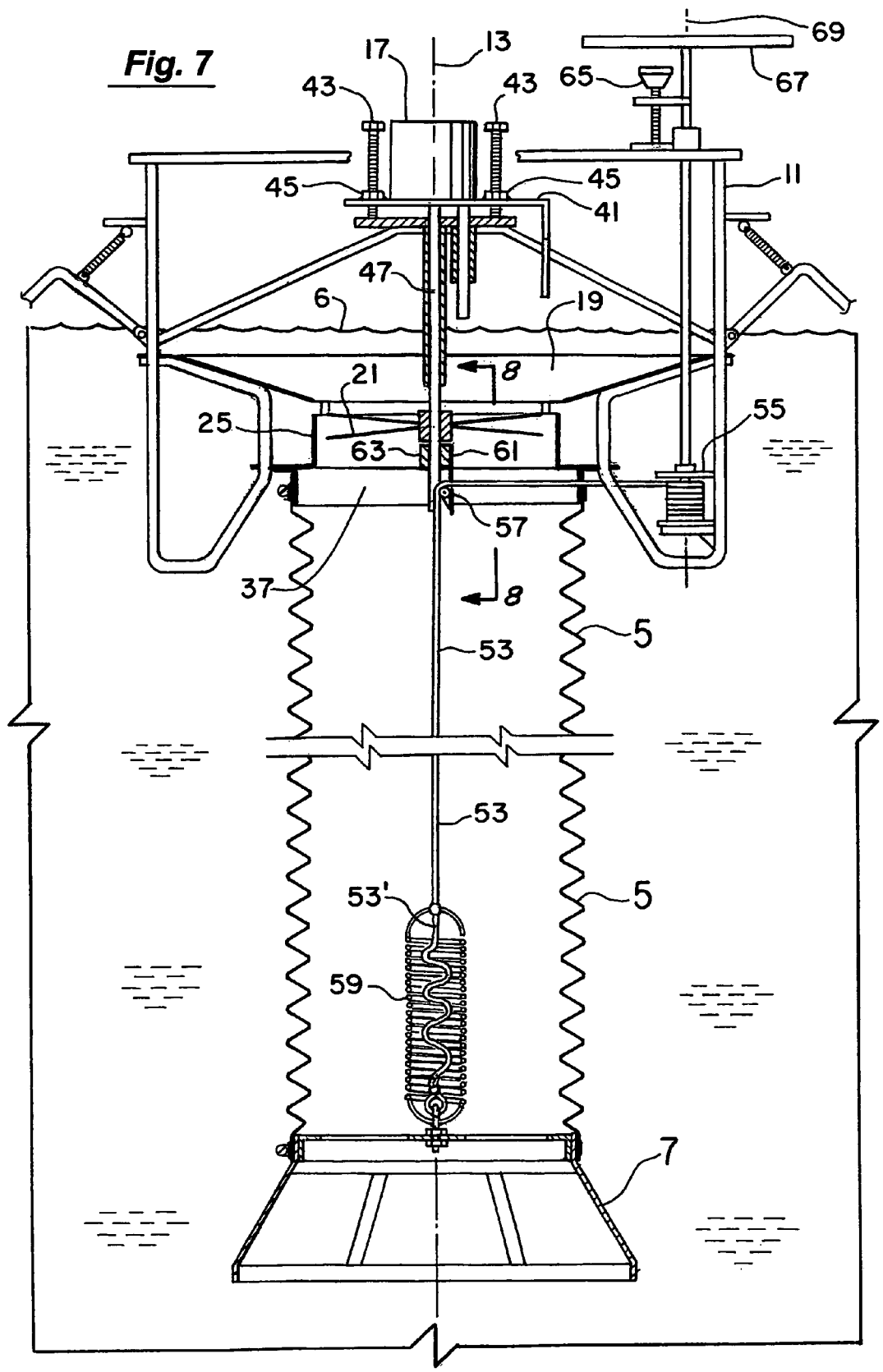
FIG. 7 is a view similar to FIG. 4 with the impeller blades shown in a lowered position and further illustrating the cable arrangement for controlling the depth of the draft tube and protecting the main cable and tube from damage due to surface waves.

In further reference to the hose 5 of the present invention, the increased length of the hose 5 for use in deeper bodies of water than in previous devices presented significant weight and adjustment problems. To overcome the weight problem and to allow for adjustment of the overall length of the tube 5, the hose 5 was made to be neutrally or slightly positively buoyant and given a collapsible, accordion design. The hose buoyancy was achieved by spirally wrapping styrofoam ribbon into the hose walls along with stainless steel wire, fiber, and plastic reinforcements. The slats of the hose walls in this regard are preferably about 3 inches and will collapse down from about 26 feet to about four feet. In use as illustrated in FIG. 1 and with the anchor 51 on the bottom 2 of the body of water 4, the accordion-shaped hose 5 is extended under the weight (e.g., 30 pounds) of the inlet 7 to a position just slightly raised (e.g., 1-4 feet) from the bottom 2. To accomplish this, a steel cable 53 (e.g., ⅜ths inch) is run as shown in FIG. 7 from the reel 55 through the bracket 57 and downwardly where the cable 53 is attached by a dampening spring 59 to the inlet 7. The bracket 57 depends from the vertical vane 61 (see FIG. 8) which is mounted across the housing 25 and which also supports the lower bearing 63 for the impeller shaft 47. The vertical vane 61 is positioned below the impeller 21 and also serves to limit the circular or vortexing flow of the uplifted water in the draft tube 5.

In initial operation to lower the draft tube 5, the locking bolt 65 of FIG. 7 on the hand crank 67 is first raised. The crank 67 can then be rotated about the axis 69 to release enough cable 53 from the reel 55 to lower the inlet 7 and attached tube 5 to the desired depth. This is normally done by simply lowering the inlet 7 to the bottom 2 and raising it 1-4 feet or until the flow at the dish 19 has the desired appearance representing the desired depth for best treatment of the water. In some cases, the depth of the bottom 2 may exceed the designed limit (e.g., 26 feet) of the hose 5. Consequently, the maximum length of cable on the reel 55 is set accordingly not to exceed this limit.

When used in larger bodies of water, relatively large waves may be generated by wind or recreational boats raising and lowering the flotation platform 3 several feet or more. To protect the cable 53 and hose 5 from damage from such fluctuations, the cable 53 as illustrated in FIG. 7 is attached to the spring 59. The spring 59 (e.g., ⅜ths inch coil spring of steel similar to a car body spring) is about 2 feet long in FIG. 7. As the flotation platform 3 in FIG. 7 is raised by a wave, the rising cable 53 will stretch the spring 59 (see FIGS. 9 and 10) to absorb the lifting force of the wave. This in turn will minimize damage to the cable 53 as well as the hose 5. The action of the spring 59 will then let the flotation platform 3 move up and down with the surface waves without adversely affecting the operation of the surface components of the system or damaging the cable 53 or hose 5. As an additional safety precaution to prevent damage to the draft hose 5 from overstretching, the arrangement of FIG. 7 includes the short length or section (e.g., 5 feet) of cable 53'. This safety cable 53' as illustrated is attached between the top of the spring 59 and the inlet 7. In use as best illustrated in FIG. 10, the safety cable 53' will limit the maximum distance (e.g., 5 feet) the spring 59 and hose 5 will be stretched by a surface wave lifting the flotation platform 3. The spring 59 but more importantly the hose 5 will then not be overstretched and damaged beyond design limits. With the above features, the system 1 can be safely used in relatively large bodies of water where many different depth settings are needed (both initially and from season-to-season as drought and other conditions may vary the water depths). It can also be safely used in bodies of water where relatively large waves may be generated by the wind or other factors such as recreational boats.

It is noted that the hose 5 is described above as being about 26 feet in length in the discussed embodiments. This is a length that serves many existing bodies of water; however, the hose could certainly be longer (e.g., 80-100 feet or more) or made up of sections or multiples of 26 foot hoses such as hose 5. As for example, a series of such 26 foot hoses 5 could be secured to one another by housings such as 25 to extend 104 feet or more down with the inlet 7 then on the bottom section. The sections would still preferably collapse to a relatively short height (e.g., 16 feet in this example) for ease of handling and shipping.

Figure 11:
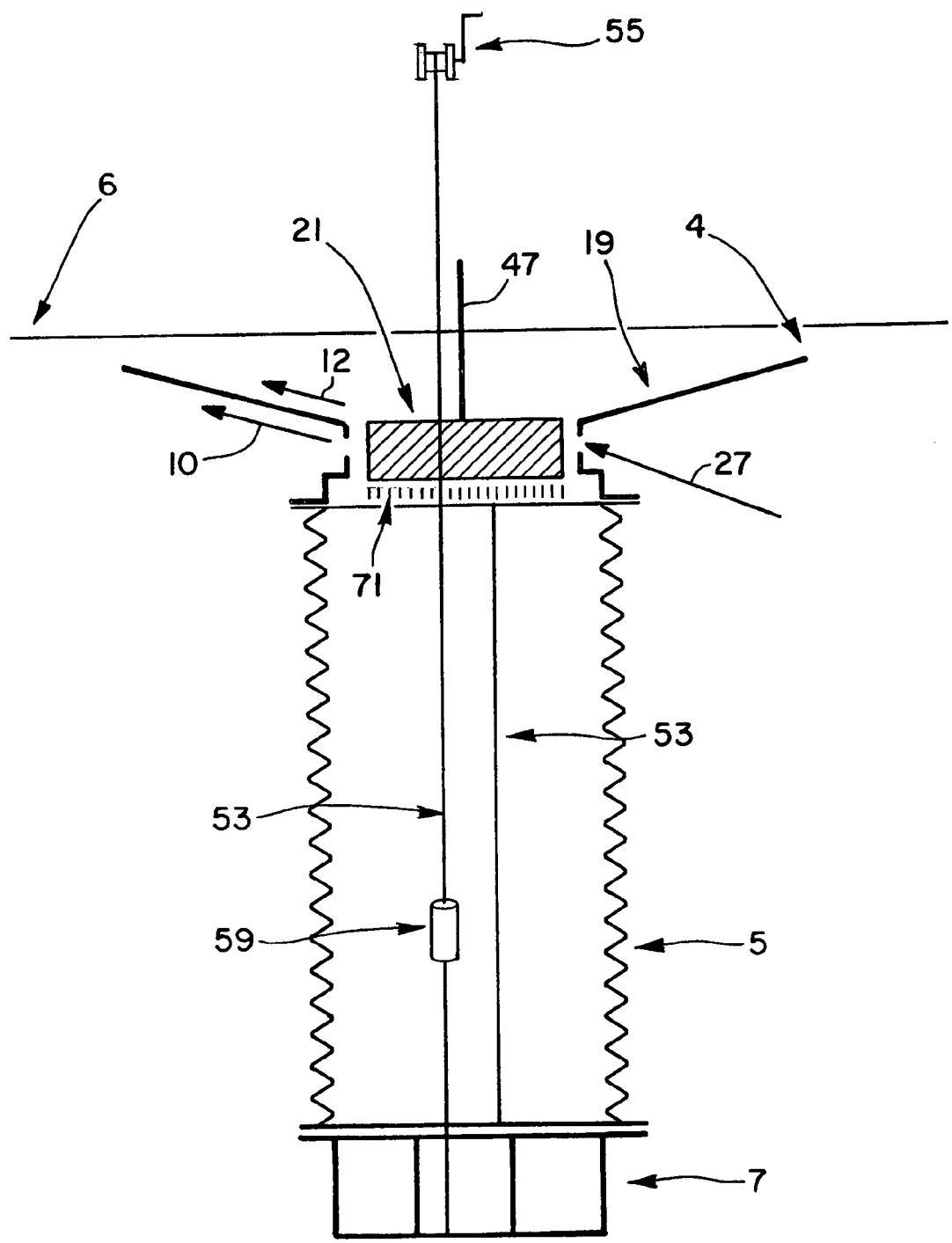
FIG. 11 schematically illustrates the circulation system of the present invention adapted to include an electronic eutrophication control system to create apatite from any calcium and phosphate molecules present in the water.

FIG. 11 schematically illustrates the circulation system 1 of the present invention adapted to include an eutrophication control system 71. In this regard, many lakes and wastewater reservoirs have excess dissolved phosphate which can lead to eutrophication. This is a condition where harmful algae blooms occur that can lead to low dissolved oxygen, fish kills, taste and odor in drinking water reservoirs, and other water quality problems. An estimated 60 percent of the reservoirs and lakes in the United States have such excess phosphate accumulations.

Phosphate is a highly polar molecule, with a positive (+) charge at one end and a negative (−) charge at the other end. It is believed that molecules like phosphate, when dissolved in water, become tightly surrounded by a sheath of water molecules since water molecules are also highly polar. The same thing is thought to occur with calcium hardness in water in which the calcium also becomes surrounded by a sheath of water molecules. In the case of calcium, it has been shown that if these sheaths of water are broken up (e.g., by magnetic fields as by putting a permanent or electromagnet around a pipe of flowing water or by passing a current through the water as by electrolysis or even sonic or ultrasonic waves), the calcium in the water has more exposed surface area and thus becomes more reactive. Small particles of calcium will then accumulate by surface attraction to each other forming relatively large clumps of calcium precipitate which will settle out of the water It has been known for some time that if phosphate and calcium are both present in water, and if the water is mixed, the two will combine in a surface-bonding manner to form a mineral called apatite. The apatite will then settle out to the bottom of the reservoir and will not easily go back into solution. It has also been demonstrated that slow mixing of algae-laden water aids the apatite formation process, probably due to molecular charges that exist on the biological film-type coating of the algae cells. However, the complete process is not well understood.

In the present invention of FIG. 11, a generator 71 has been added to the basic system 1 of FIGS. 1-10 to impart energy to the uplifted water (e.g., by generating a magnetic field, electric current (AC or DC), or sonic or ultrasonic waves across the flow). Preferably, the generator 71 is solar powered. The energy imparting generator 71 serves to break up the water sheaths surrounding both calcium and phosphate molecules so that they can more readily combine and form apatite. In this manner, the calcium normally present in abundance in ponds, lakes, reservoirs, and other bodies of water can be used to effectively reduce and precipitate out undesirable amounts of phosphate that may be in solution in the water.

Figure 12:
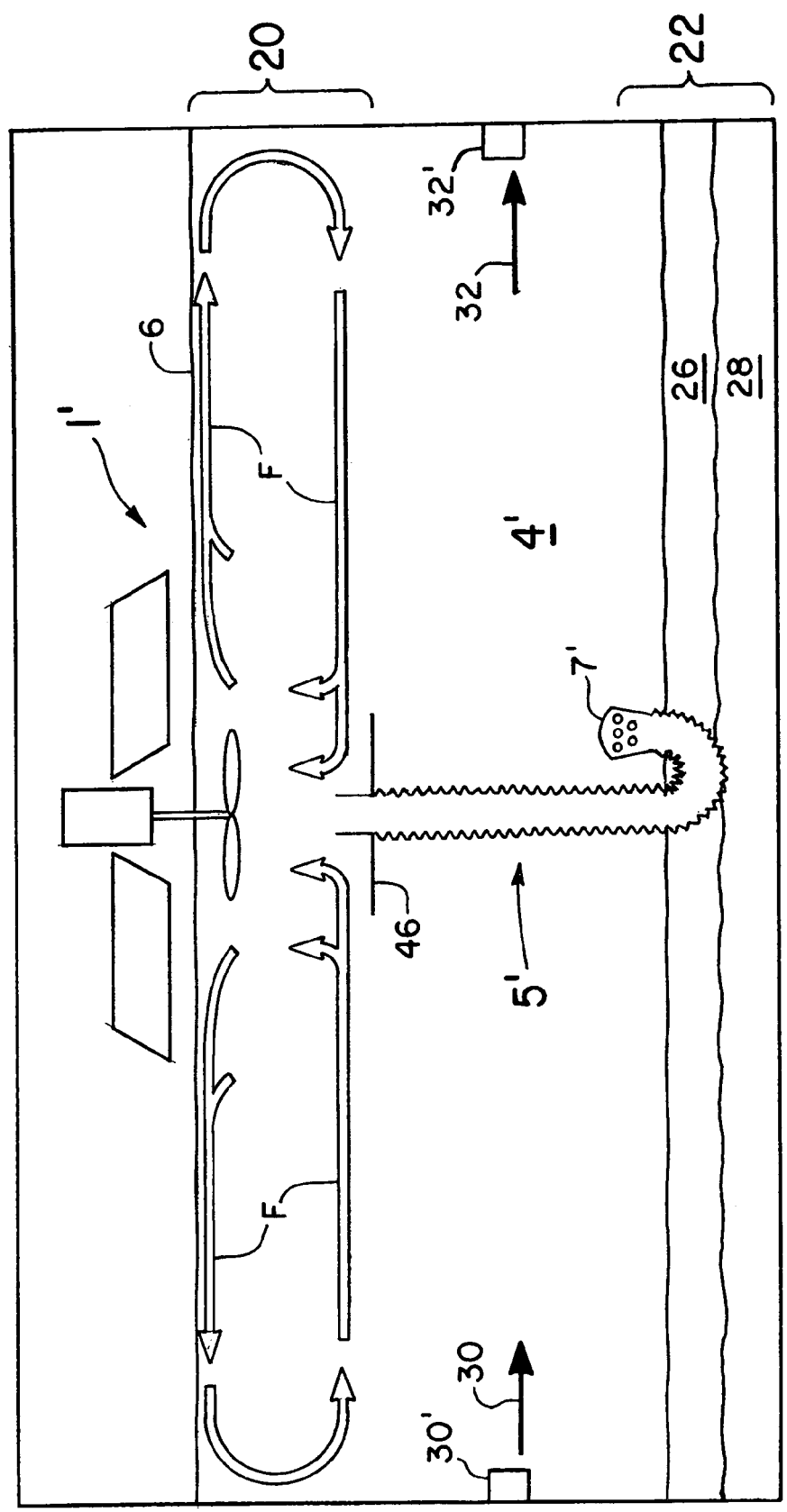
FIG. 12 schematically illustrates the preferred operation of another set of embodiments of the present invention in which an upper aerobic zone and a lower anaerobic zone are created and maintained in a wastewater pond.

FIG. 12 schematically illustrates another set of embodiments 1' of the present invention that are highly desirable in treating and processing bodies of water such as municipal wastewater ponds 4'. In such wastewater ponds 4', it is essential to establish an upper zone 20 for aerobic digestion using dissolved oxygen and a lower zone 22 with virtually no dissolved oxygen for anaerobic digestion of materials such as some organic wastes and chemical compounds. The ponds 4' themselves are typically 5 to 15 feet deep and the zones 20 and 22 are commonly about 2 feet each. Each zone 20 and 22 performs different but vital functions in the overall treatment and processing of the wastewater. Further, to be effective, the contents of the two zones 20, 22 must be essentially isolated from one another. Yet, at the same time and for best overall results in the treatment and processing of the entire pond 4', it is desirable to have a small quantity of the contents of the lower zone 22 brought up and mixed with the contents of the upper zone 20.

To accomplish this, conventional aerators and circulation systems as well as the circulating system 1 in FIGS. 1-11 are very difficult to effectively use in the environment of a wastewater pond such as 4'. The fundamental problem is that such systems as 1 are primarily intended to create an overall flow 24 (see Schematic FIGS. 13 and 14) in the body of water 4' circulating from the bottom or inlet 7 of the draft tube 5 up to the surface 6, out to the water edges, and back down to the level of the tube inlet 7. In this light and if the tube inlet 7 is set too deep as schematically shown in FIG. 13, it will mix the entire pond 4'. In doing so, it will bring up large quantities of sulfides and low pH (e.g., 6) water from the bottom region of the pond 4', which will normally kill the desirable aerobic bacteria and algae of the higher pH (7.5) upper region. Such overall pond circulation 24 in FIG. 13 will also drive dissolved oxygen from the upper region of the pond 4' down into the lower region, which will kill the desirable methane forming and other bacteria necessary to prevent sludge buildup in the bottom layers 26 and 28. Odors then develop in the pond 4' of FIG. 13 due to the pulling up the sludge and there is no upper zone 20 as in FIG. 12 conducive to eliminating it as well as reducing the ammonia and precipitating out any phosphorous. Conversely to being set too deep, if the tube inlet 7 is set too shallow as in FIG. 14, a short circuit is developed where the incoming influent 30 from inlet 30' will essentially pass untreated through the pond 4' and out the effluent pipe 32'.

To set the depth of the tube inlet 7 in the systems of FIGS. 13 and 14 between these extremes is virtually impossible in the dynamic environment of wastewater ponds such as 4'. Among other things, such ponds 4' have changing overall depths depending upon the volume of influent 30 and effluent 32 as well as varying depth thermoclines and temperature gradients. The changing of the overall depth of the pond 4' has the effect of raising and lowering the surface level 6 and thus the level of the tube inlet 7 depending from the flotation platform. Thermoclines and temperature gradients in the pond 4' can also operate to effectively change the desirable level to set the tube inlet 7. As for example, the influent 30 typically enters the pond 4' (e.g., one or two feet above the sludge layer 26) at a different temperature (e.g., 1 to 20 degrees F. lower in the summer) than the pond water above it. A thermocline or gradient can then be created across the pond 4'. As the temperature difference varies over time (days or seasons) and/or the volume of the influent 30 and effluent 32 varies, the thermocline may rise or fall changing the desired level for setting the inlet 7. Too low a setting of the tube inlet 7 as discussed above will create the undesirable conditions of FIG. 13 and too high a setting will result in the undesirable conditions of FIG. 14.

To solve these problems, the embodiments 1' of FIGS. 12 and 15-22 were developed. With them, a circulating aerobic flow F (FIG. 12) in the upper zone 20 is created and limited to the upper 2 feet or so of the pond 4'. Additionally, a small volume of the contents of the lower anaerobic zone 22 is brought up and mixed into the circulating flow F of the upper aerobic zone 20. However, the zones 20 and 22 are essentially otherwise isolated from each other. In particular, no harmful dissolved oxygen from the upper aerobic zone 20 is driven down and mixed into the lower anaerobic zone 22, which would destroy the beneficial methane forming and other bacteria of the lower zone 22. Further, variations in the overall depth of the pond 4' over time and varying thermoclines and temperature gradients created over time in the pond 4' largely do not affect the efficient operation of the embodiments 1'. This is the case because the embodiments 1' are essentially independent of such factors.

As indicated above, certain of the contents (e.g., sulfides) of the lower zone 22 can be detrimental to the desirable bacteria and algae of the upper zone 20. However, the bringing up of a very small volume of these contents as well as other contents can be beneficial to the overall treatment and processing of the wastewater in the pond 4'. More specifically, the lower zone 22 does have nutrients (e.g., carbon, nitrogen, and phosphorous) beneficial to a strong algae crop or growth. In particular, carbon from the lower zone 22 in the form of carbonic acid is very desirable to bring up to the upper zone 20 to nourish the algae. A strong algae crop in turn raises the pH of the upper zone 20 (e.g., to a level of 7.5 to 10). The elevated pH helps to process the liquid ammonium ions being brought up from the lower zone 22 through nitrification. Additionally, at the higher pH ranges (e.g., over 9.2 pH), virtually all of the liquid ammonium ions will be converted into ammonia gas and harmlessly dissipated or gassed off into the atmosphere. Heavy algae growth in zone 20 provides increased surface area for attachment of beneficial nitrifier bacteria needed for the nitrification and denitrification process of ammonia removal. Further, the higher pH's in the upper zone 20 help to precipitate out calcium hardness.

The upper zone 20 and its algae growth are normally limited to the first 2 feet or so of the pond 4' This is due in part to natural factors (e.g., sunlight typically is greatly diffused at depths greater than 2 feet in such ponds 4'). It is also due to the mechanical operation of the embodiments 1' which serve to confine and substantially limit the circulating flow F in FIGS. 12 and 19 to about 2 feet. Further, and in addition to the movement of the circulating flow F physically limiting any descent of the algae growth below 2 feet, a thermocline is establish at the level of the plate member 46 (as explained in more detail below) to inhibit any descent of the algae below it. Algae is then not mixed below the level of the plate member 46 (e.g., 2 feet) in normal winds and other operating conditions. In this way, little if any algae passes down and out of the effluent pipe 32' in FIG. 12 in violation of governmental and other guidelines on the amount of such biochemical oxygen demand materials that can be present in the discharging effluent 32.

Figure 15:
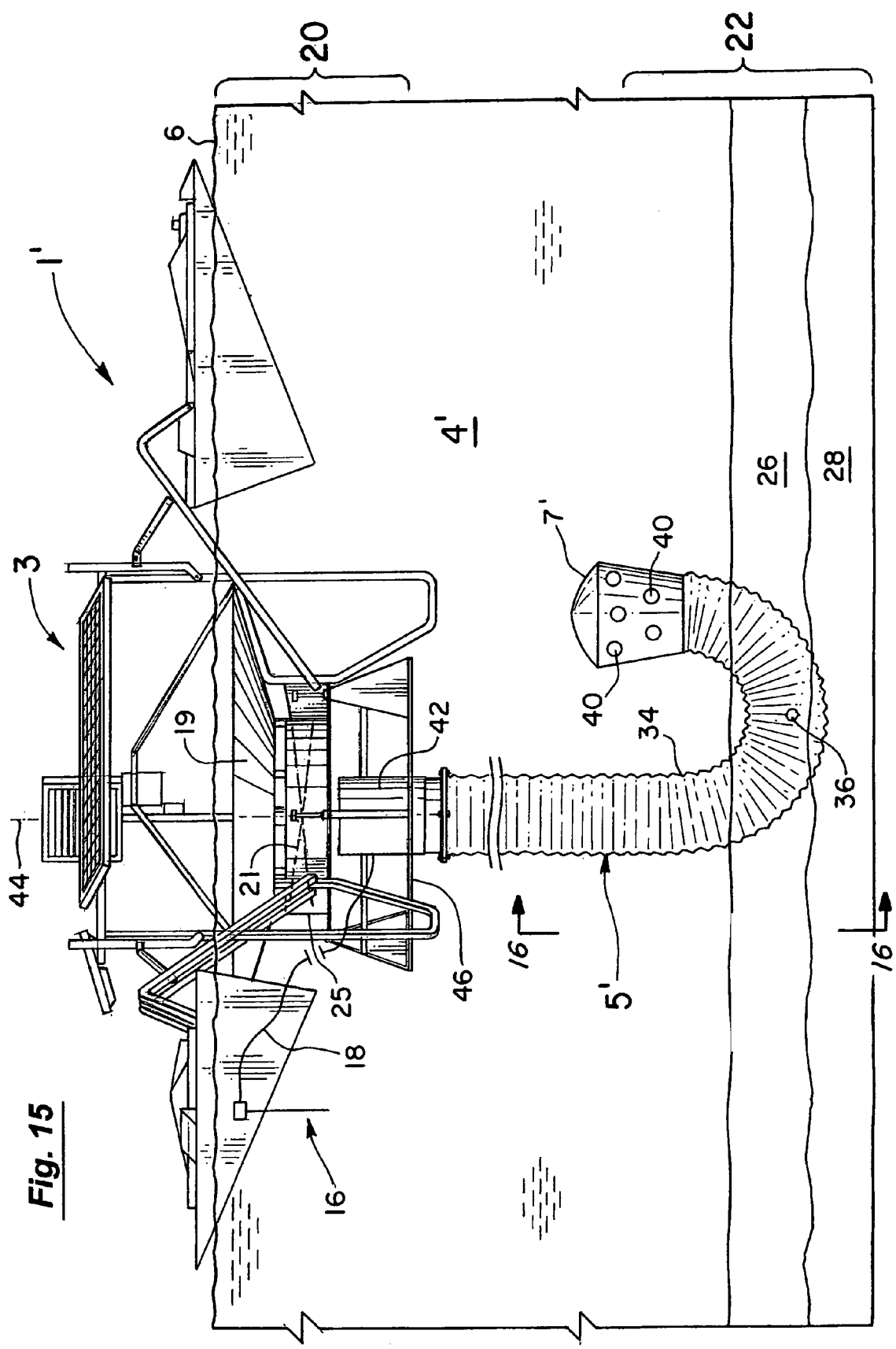
FIG. 15 illustrated the overall structure of the preferred embodiment to create the desired circulation system of FIG. 12.
Figure 18:
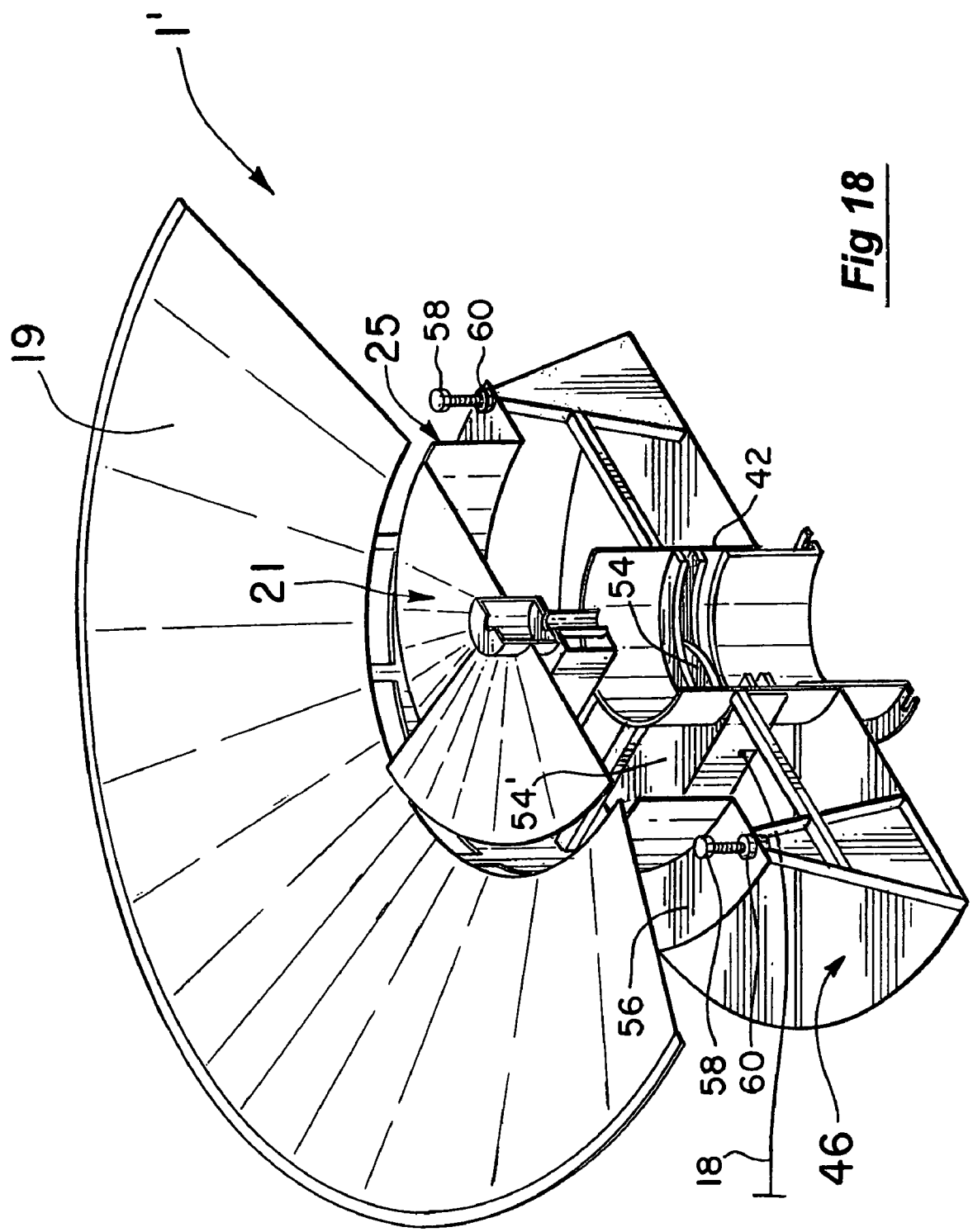
FIG. 18 is a cut away view of FIG. 17.

Referring to FIGS. 15-18, the embodiments 1' of the present invention are specifically designed for the environment of wastewater ponds 4' but preferably have many of the same parts as the embodiments of FIGS. 1-11. As for example, the flotation platform 3 (FIG. 15) is essentially the same as well as the dish 19, impeller 21, and housing 25. Also like the earlier embodiments 1, the embodiments 1' have a draft tube 5' but unlike the earlier embodiments 1, the draft tube 5' has an overall J-shape. The draft tube 5' is also designed to rest in the weight-bearing layer 28 of the sludge with the inlet 7' positioned slightly above (e.g., 1 foot) the slurry or non-weight bearing layer 26. In this regard, the bottom curve or bend in the main body 34 of the draft tube 5' in FIG. 15 can be provided with a bar or other weight 36 (see FIGS. 16 and 16a) secured in place by screws or other members 38. The main body 34 of the tube 5' then rests as illustrated in FIG. 15 in the weight-bearing layer 28 (e.g., capable of supporting 0.25 pounds per square inch) with the inlet portion 7' positioned as shown. The inlet portion 7' is preferably buoyant (e.g., by providing styrofoam floating balls in it). The exact location of the holes 40 in the inlet 7' can vary relative to the sludge layers 26 and 28 and the exact upper limits of the anaerobic zone 22 but ideally, at least the lower set of holes 40 are in the anaerobic zone 22. In any event, the resulting water being drawn through the holes 40 into the draft tube 5' will predominantly be components of the anaerobic materials of the lower zone 22. The weight 36 preferably then anchors the draft tube 5' in the sludge layers 26, 28 even if the flotation platform 3 drifts on the surface 6 to one side or the other. In doing so, the main body 34 of the relatively rigid, fixed length (e.g., 20 feet) tube 5' essentially lays somewhat on its side, descending at a slant or incline to the vertical (see FIG. 16 which is a view taken along line 16-16 of FIG. 15).

Referring again to FIGS. 15-18 and although the flotation platform 3, dish 19, impeller 21, and housing 25 are substantially the same as the embodiments 1 of FIGS. 1-11, the embodiments 1' for the wastewater ponds 4' have a modified supporting arrangement for the draft tube 5'. More specifically, the draft tube 5 of the earlier high flow embodiments 1 had the upper rim thereof (see FIG. 4) secured at 39 about the flange 37. Consequently, preferably all of the water fed to the impeller 21 came from the bottom of the pond 4 up through the draft tube 5. In contrast, the outlet portion 42 (FIG. 15) of the modified tube 5' is supported to feed only a small amount of the total water input fed to the impeller 21. This can be accomplished in a number of ways. As for example, the substantially cylindrical outlet portion 42 of the tube 5' passing up through the central opening in the plate member 46 as seen in FIGS. 15 and 17-19 preferably extends outwardly of the vertical axis 44 (FIG. 15) for a distance (e.g., 0.5 feet) less than the distance (e.g., 1.5 feet) the housing 25 so extends. Further, the supporting arrangement for the tube 5' includes this horizontally extending plate member 46 (see FIGS. 15 and 17-19) which is spaced vertically from and below the impeller housing 25. An inlet opening extending substantially about the vertical axis 44 is thus created therebetween leading to the impeller 21. Additionally, the plate member 46 extends outwardly of the vertical axis 44 (FIG. 19) for a distance (e.g., 2 feet) preferably greater than the distance (e.g., 1 foot) the annular housing 25 extends. Consequently, in operation, the impeller 21 draws a first volume of water 48 in FIG. 19 horizontally above the plate member 46. In doing so, a portion 48' (e.g., 30%) of the total volume of drawn water 48 (e.g., total of 10,000 gallons per minute) passes through the impeller 21 toward the surface 6 from the inlet opening between the plate member 46 and the housing 25. This portion 48' passes up and over the dish 19 at 12 as well as out the annular opening between the dish 19 and housing 25 at 10. This movement of the portion 48' in turn induces the remaining portion 48" (70%) of the first volume 48 to move upwardly about the housing 25. The circulating flow F (see also FIG. 12) is thus created and essentially defines the upper aerobic zone 20.

To this circulating flow F in the zone 20, a second, smaller volume 52 (see FIG. 19) is added which has been drawn up by the impeller 21 through the tube 5' from the lower zone 22. The second volume of water 52 drawn up through the tube 5' is preferably only a small fraction (e.g., 1/100 to 1/3) of the first volume 48. In this manner, the desired aerobic nature of the upper zone 20 is not adversely affected yet valuable reduction of some of the contents (e.g., ammonia and phosphate) of the lower zone 22 is performed adding to the overall treatment and processing of the wastewater pond 4'. Further, as discussed above, some beneficial contents (e.g., carbonic acid) are also brought up to nourish the desirable algae growth in the upper zone 20.

In any event, the second volume 52 allowed to be drawn up must be kept to a relatively small fraction of the circulating flow F so as not to adversely affect the aerobic makeup of the upper zone 20. This can be done in any number of ways. If the characteristics of the particular pond 4' are well known and defined, the diameter of the tube 5' can be selected as desired with a smaller or larger diameter resulting in more or less frictional drag to the flow of the second volume 52. A smaller diameter would thus create more drag and reduce the size of the second volume 52. The tube 5' can also be provided with a valve mechanism (e.g., gate valve 54 in FIGS. 18 and 20) to control and adjust the size of the second volume 52. The planar plate member 46 can also be adjustably supported to the flange 56 of the housing 25 by a bolt and nut arrangement 58 and 60 (see FIGS. 18, 20, and 21). In a manner similar to the operation of members 43 and 45 in FIG. 7, the distance between the plate member 46 and housing 25 can be varied by rotating the threaded bolts 58 in FIGS. 18, 20, and 21 to alter the size of the inlet opening between the plate member 46 and housing 25. Such movement will also vary the space between the end 62 (FIG. 21) of the outlet portion 42 of the tube 5' and the impeller 21 and housing 25. The spacing of the end 62 of the outlet portion 42 can also be separately adjusted by providing a concentric, sliding member 42' on the fixed member 42" of the outlet 42 in FIG. 21. The input through the inlet portion 7' could also be valved in similar manners. Regardless of the manner of adjustment, the absolute and relative sizes of the first and second volumes 48 and 52 are preferably variable as needed and desired.

Figure 22:
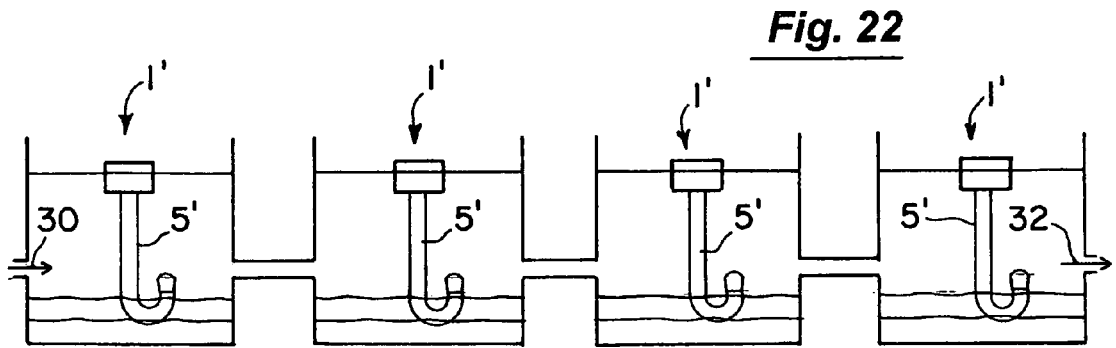
FIG. 22 shows the application of the second set of embodiments to treat a series of bodies of wastewater.

Another advantage of the adjusting techniques for the first and second volumes 48,52 is that essentially the same basic units 1' can be used in a series of wastewater ponds (see FIG. 22). In such a series, it is usually desirable to vary the fraction of the second volume 52. It is also normally the case that the influent 30 entering the first pond is the strongest and most concentrated wherein it is desirable to draw up only a very small fraction (1/60). The treated effluent leaving the first pond and entering the second pond would then be less concentrated and a larger fraction (e.g., 1/40) could be drawn up the tube 5'. The fraction in the third pond could then be even larger (e.g., 1/20) and the final still larger (e.g., 1/5). The water passing through the series of ponds and exiting at 32 would then be progressively and efficiently treated.

The fraction (e.g., 1/60) set for the first pond in FIG. 22 can be varied as discussed above. In doing so, the operating results of the pond can be monitored and adjustments made in the field if necessary. For an initial setting, however, the conditions of the pond can also be studied. As for example and in a pond with a surface area of about 5 acres, the upper and lower zones 20,22 may be considered as respective blocks of 1,000,000 pounds of water each. The lower zone 22 in summer might be mostly raw sewage with about 220 pounds per million of biochemical oxygen demand materials. The 220 pounds of material of the lower zone 22 would then need about 1.5 pounds of dissolved oxygen for fast odorless aerobic digestion. The lower zone 22 might also typically contain 30 pounds per million of liquid ammonium ions. Each pound of ammonium ions would then need about 5 pounds of dissolved oxygen to go through nitrification and eventually denitrification and conversion to nitrogen gas that can be released to the atmosphere. The total requirement of the lower zone 22 materials would thus be about 480 pounds of dissolved oxygen to aerobically treat the biochemical oxygen demand and liquid ammonium ions (i.e., 220 times 1.5 plus 30 times 5). However, the top block of water in zone 20, even at full saturation, typically holds only about 8 pounds per million of dissolved oxygen. So to mix the bottom water with the top and keep all of the dissolved oxygen needs satisfied, a desired mixing fraction is about 60 parts of top water with every 1 part of bottom water. A 60:1 ratio would then be an anticipated setting for such a pond in order not to deplete the dissolved oxygen content of the upper zone 20. On a volume comparison, approximately 160 gallons per minute would be brought up from the lower zone 22 to be mixed with the water of the upper zone circulating at about 10,000 gallons per minute.

It is noted that the various valving and other arrangements for adjusting the size of the volume 52 being drawn up the draft tube 5' could be automated if desired. As for example, a probe or sensor 16 (see FIG. 15) could be provided to monitor the amount of dissolved oxygen in the zone 20. The electronic actuator 54' for the valve 54 in FIG. 18 could then be connected by line 18 to the sensor 16. In operation, the actuator 54' would be automatically activated in response to readings from the sensor 16 to selectively move the valve 54 to adjust the size of the volume 52. If the dissolved oxygen readings are relatively high, the volume 52 could be increased. Conversely, if the readings fall to levels threatening the vitality of the zone 20, the volume 52 can be decreased or even shut off completely. In this regard, all of the various arrangements for adjusting the size of the volume 52 could be so automated.

Referring again to FIG. 1 and in the environment of the first set of embodiments 1 in the ponds 4 with full pond circulation, it is normally desirable to limit the incoming flow to the tube inlet 7 in FIG. 1 to a substantially horizontal flow 66. Preferably, no water is drawn upwardly past the solid planar member 70 of FIG. 1. In this manner, many of the worst contents of the pond 4 (which typically settle to the pond bottom) are not disturbed and not drawn up and circulated to contaminate the rest of the pond 4. However, in some environments such as the tidal canal 4" of FIG. 24, it is desirable to be able to draw up some of the contents 68 below the plate member 70. More specifically and in a canal or similar body of water such as 4", the situation can develop that deadly sulfides from fish waste and other organic waste settle and collect in dangerous amounts at the bottom 26 of the canal 4". This is becoming very common in many canals that may be 100 feet wide with normal 6 foot deep sides but with a central, dredged depression 50 wide and 20 feet deep. Under most conditions during a year, the sulfides are confined and remain at the bottom 26. However, during certain times of the year (e.g., summer) and/or during certain catastrophic events (e.g., big storms or floods), the deadly sulfides can be displaced and/or mixed upwardly into the canal 4". The results can be devastating, including killing virtually all of the fish and other animal life in the canal 4". Such fish and other kills from contact with the deadly sulfides are infrequent events but can destroy the vitality of a canal or similar body of water 4" in simply a matter of days or even hours.

Consequently, in the environment of a body of water like the canal 41" in FIG. 24, it is desirable to continuously draw small volumes 68 of water from below the plate member 70 of the suspended inlet 7 of the depending tube 5 (see also FIG. 23). These sulfides normally build up in and above the layer 26 in FIG. 24 and below (e.g., 2 feet) the planar plate member 70. In operation and over the course of days or months, very small volumes of these deadly sulfides are slowly brought up toward the canal surface and dissipated throughout the canal 4". In such small volumes (e.g., 2%-10% of the total volume drawn up the tube 5 as for example 20-100 gallons per minute of a total draw of 3,000 gallons per minute) and concentrations (e.g., 100 parts per million), the sulfides can be processed and broken down (e.g., to sulfates) in the canal 4" without harming the fish and other wildlife.

When a catastrophic or other unusual condition in the canal 41" occurs, any sulfides at the canal bottom are still raised or stirred up into the main body of the canal 4". However, their volumes and concentrations are much smaller and less toxic due to the prior, cleansing operation of the system of FIGS. 23 and 24. Additionally, the volume and rate of sulfides and other materials being drawn up at 68 through the plate member 70 in FIGS. 23 and 24 are preferably adjustable (e.g., by the sliding valve member 72). In this manner, the operation of the system can be precisely adapted to particular environments and changes in the environments of the ponds or other bodies of water including 41". The valve member 72 in FIG. 23 can even be closed completely if desired or needed to strictly limit the entire flow coming into the tube inlet 7 to the horizontal direction 66 in FIGS. 1, 23, and 24.

Figure 23:
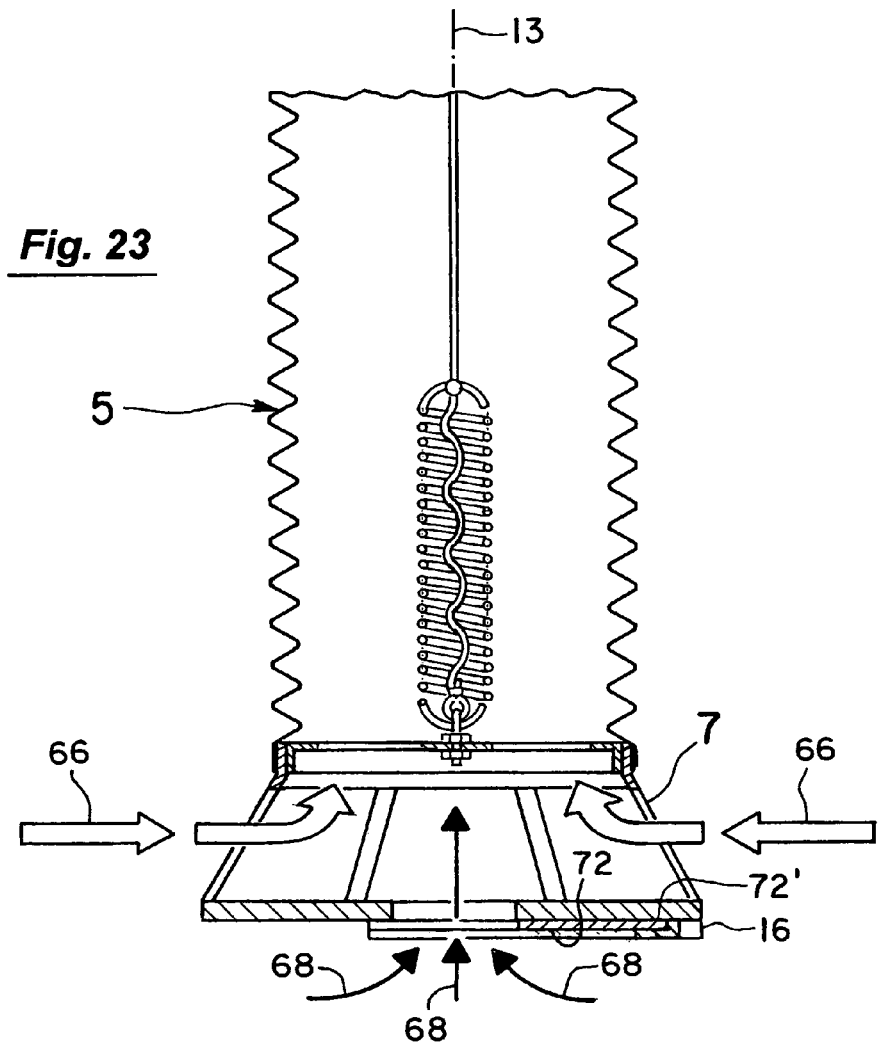
FIG. 23 is an enlarged view of the inlet portion of the draft tube of the embodiment of FIG. 1 modified to allow a controlled amount of water to be drawn up through the bottom plate member thereof.
Figure 24:
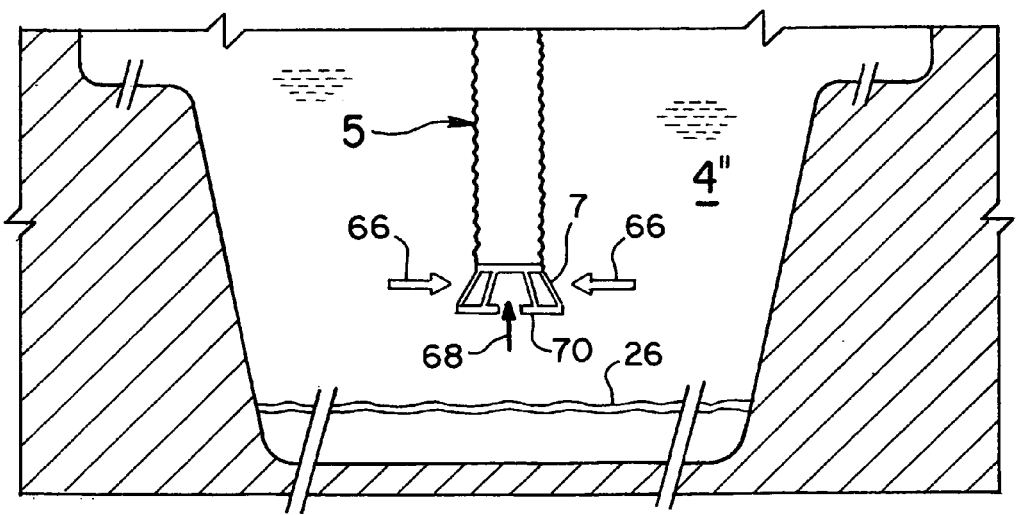
FIG. 24 show the use of the embodiment of FIG. 23 in the environment of a canal.

The plate member 70 in this regard extends substantially horizontally outwardly of the vertical axis 13 in FIG. 23. The plate member 70 is also spaced from and below the main body 34 of the draft tube 5 to create the substantially annular inlet opening therebetween for the incoming flow 66. Additionally, the operation of an electronic actuator 72' for valve 72 in FIG. 23 could be provided if desired to automatically adjust the size of the volume 68. Preferably, the sensor 16 would monitor hydrogen sulfide adjacent the plate member 70 but it could also monitor other conditions or be positioned as in FIG. 15 to read dissolved oxygen levels near the surface 6. If the valve 72 is not automated and the normal tides in the canal 4" or other body of water are fairly significant (e.g., 2 to three feet), the opening through the plate member 70 would either be sized or the valve 72 set to bring up a safe amount of sulfides in the volume 68 at low tide. At high tide with the plate member 70 two or three feet higher, the concentration of the sulfides in the volume 68 would normally be less but sulfides would still be brought up through the plate member 70 for treatment.

Figure 25:
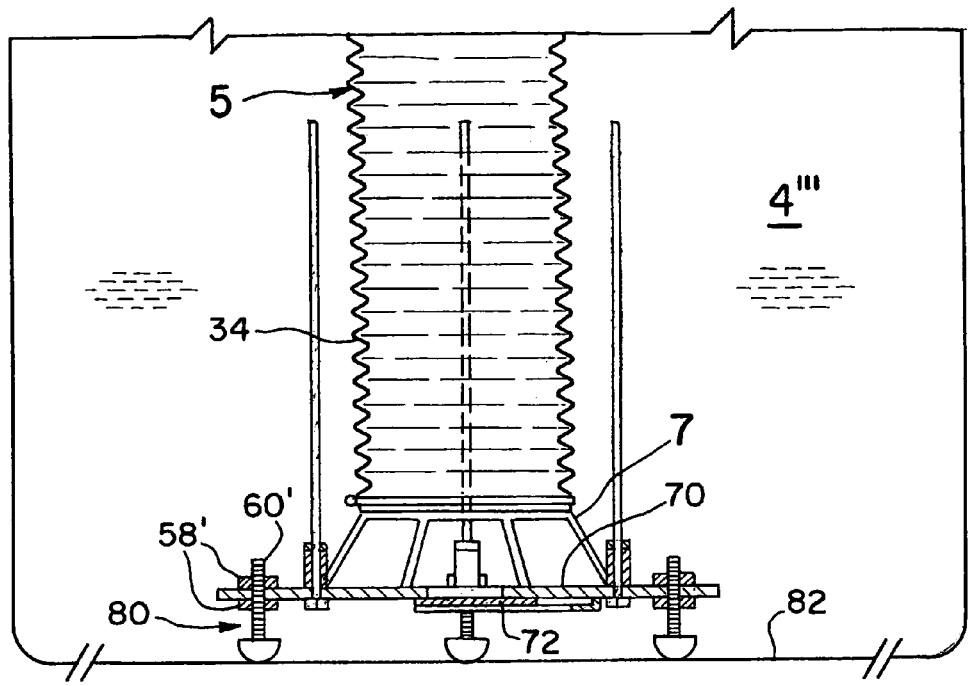
FIGS. 25 and 26 illustrate further modifications to the inlet portion of the embodiment of FIG. 1 adapting it to be supported on the bottom of a municipal water tank and provided with vertically extending arm members to collect and contain the collapsing draft tube as the water level in the tank drops.
Figure 26:
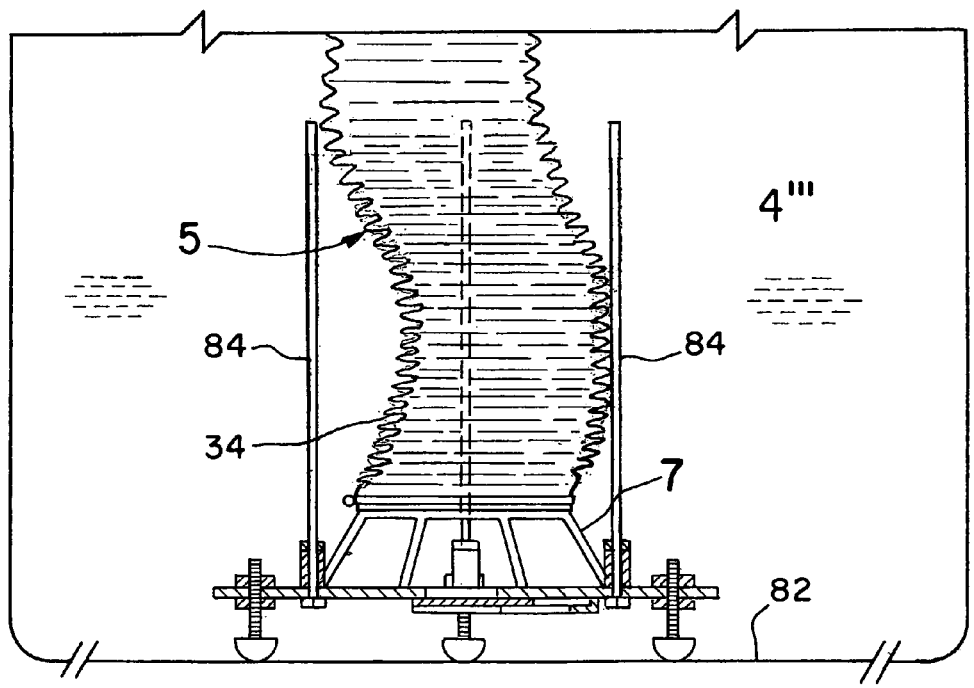

In FIGS. 25 and 26, the inlet 7 of the draft tube 5 has been modified for use in bodies of water such as municipal drinking or potable waster tanks 4'". Such tanks commonly range from 100,000 to 150,000 gallons with depths from 30 feet when full to 4 feet or less during high or emergency use of the water. The water in the tanks like any other bodies of water can stratify due to temperature differences. Additionally, the water can age and become old in some parts of the tank leading to loss of chlorine concentration or residual. Further, if chloramine is used or applied instead of chlorine, nitrification can occur. Consequently, it is desirable to mix the entire body of water in the tank 4'''. In doing so, the inlet 7 of the draft tube 5 as shown in FIG. 25 has been modified to include an arrangement of legs 80 to support the plate member 70 at a predetermined distance just off (e.g., inches to 1 or 2 feet) the bottom 82 of the tank 4'''. Normally, this is just above any sediment in the tank 4''' so as not to unnecessarily disturb and draw it up. Although the plate member 70 can be valved as previously shown, the valve 72 is preferably closed so as to make the plate member 70 solid and not to bring up any flow from below the member 70. The lengths of the legs 80 are adjustable as by threaded bolts 58' and nuts 60'. Consequently, the distance the plate member 70 is positioned above the bottom 82 of the water can be adjusted as needed or desired. Each leg member 80 contacts the bottom 82 and is individually adjustable, which can be advantageous if the bottom 82 of the tank 4''' is sloped or otherwise irregular and not flat. The leg members 80 in FIG. 25 extend downwardly of the plate member 70 and are positioned outwardly (e.g., 1 to 2 feet) of the plate member 70 for stability.

As mentioned above, the depth of the water in tanks such as 4''' can vary widely (e.g., 30 to 4 feet or less) depending upon the municipal water demands. Correspondingly, the length of the collapsible tube 5 can change dramatically. In particular and at low levels of water, the bottom of the depending tube 5 may undesirably fold up and fall to one side or the other of the inlet portion 7 supported on the tank bottom 82. This can then adversely affect the overall operation of the system. To help prevent this, an arrangement of three or more arm members 84 is provided to collect and contain the collapsing tube 5 (see FIG. 26). The arm members 84 as illustrated extend vertically upwardly from adjacent the inlet portion 7 of the tube 5 and are preferably evenly spaced about the main body 34 of the tube 5. Consequently, as the main body 34 of the tube 5 collapses as the water level falls, the arm members 84 will capture or collect and contain the main body 34 of the tube 5 adjacent the inlet portion 7. The arm members 84 then keep the tube 5 from undesirably falling to one side or the other of the inlet portion 7 at the bottom 82 of the tank 4'''.

Figure 27:
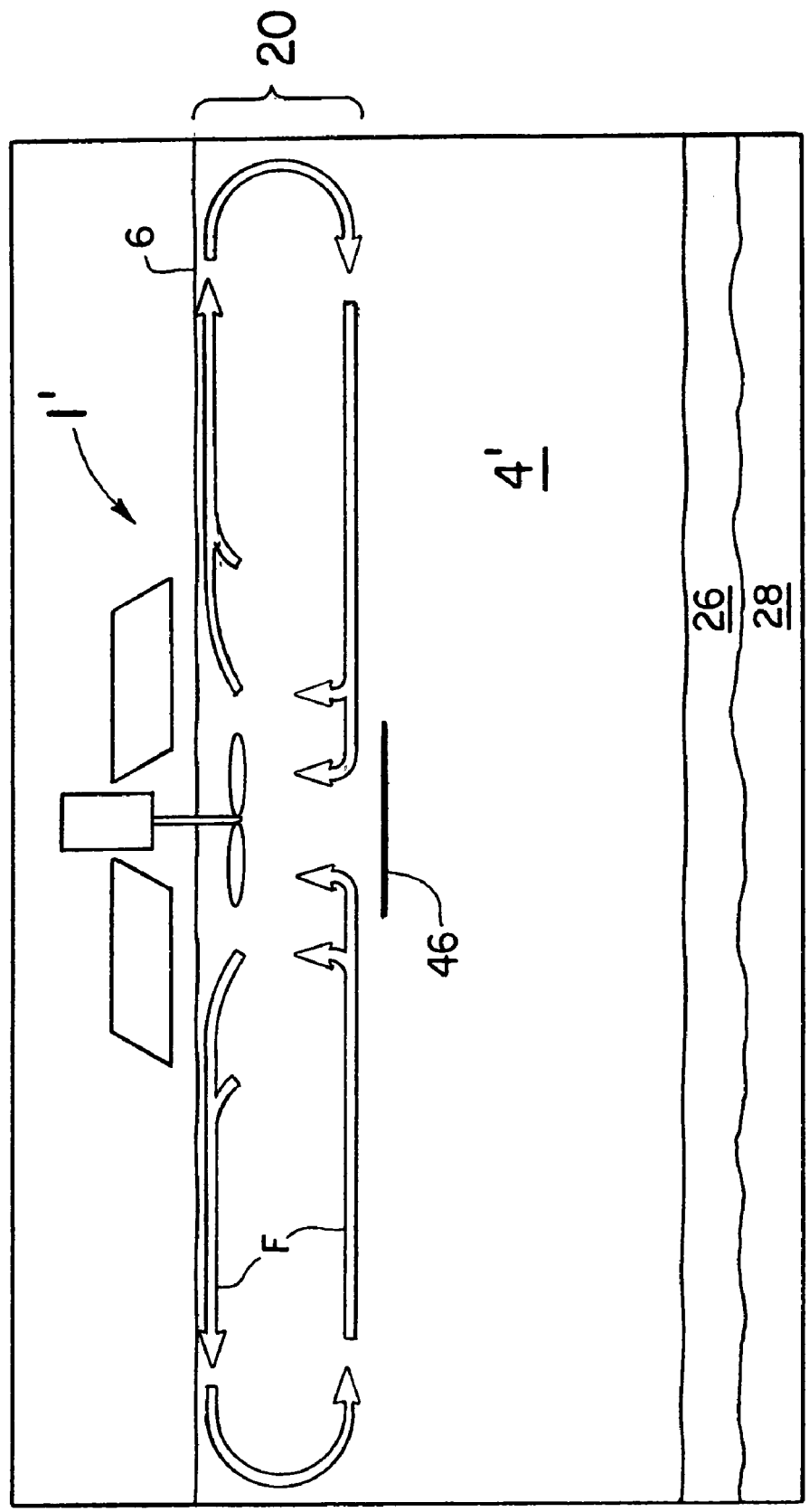
FIG. 27 schematically illustrates another embodiment of the present invention adapted for use to create an odor cap in a waste tank.

FIG. 27 illustrates an adaptation of the present invention to the specific environment in which the contents of the pond 4' or other body of water are intended to remain in place for a relatively long period of time. Such ponds 4' for example might be used to treat strong wastes from meat, vegetable, and paper processing plants as well as waste activated sludge from municipal mechanical wastewater treatment plants. In such ponds 4', it is desirable to let the waste settle to the bottom of the pond 4' to be anaerobically treated (or just stored) for days, months, or years. In such cases, odor control can be paramount as gases from sulfides and other materials bubble up to the surface 6 and escape into the atmosphere.

Figure 19:
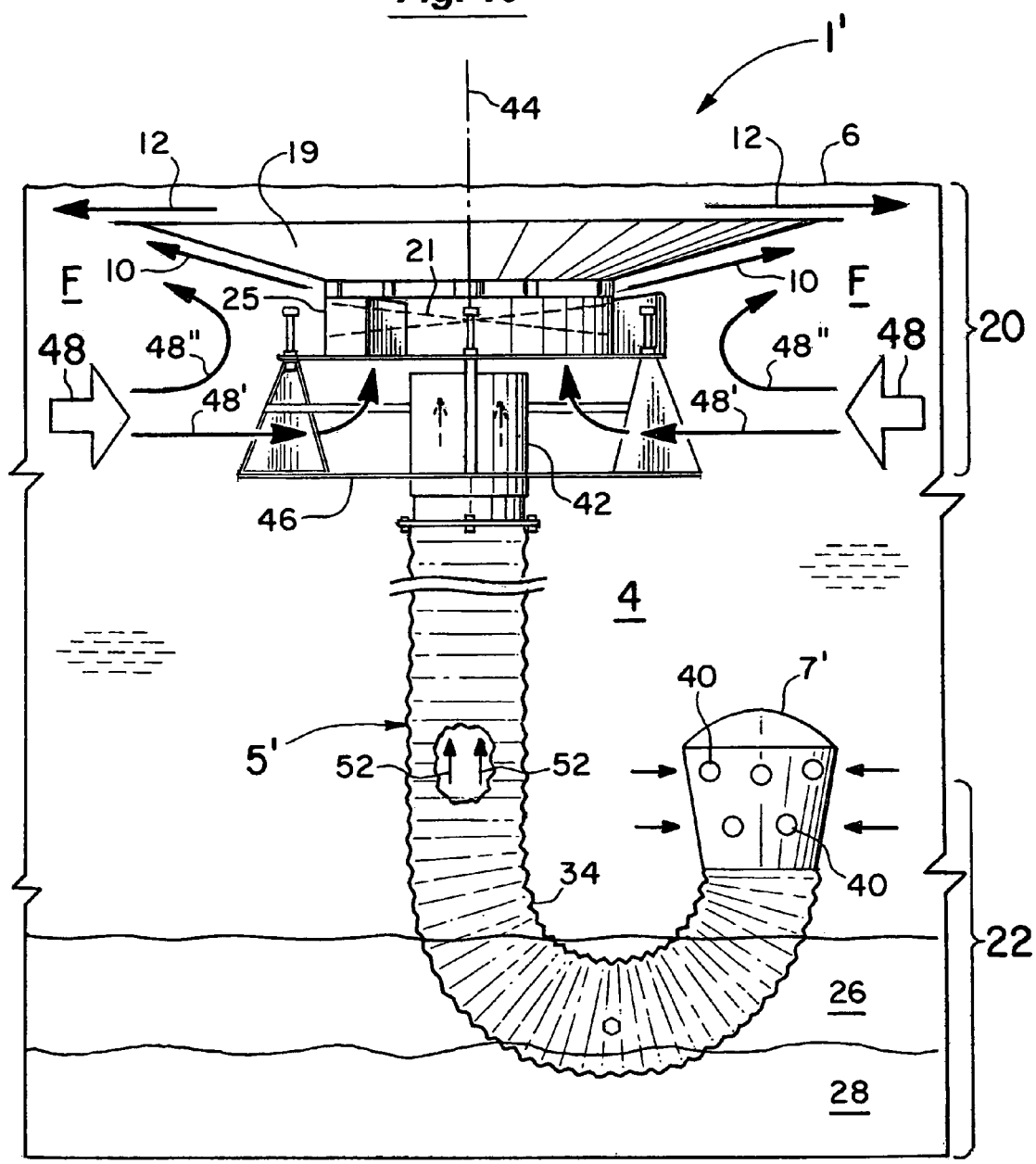
FIG. 19 is view similar to FIG. 15 illustrating the various flow paths created in the system.
Figure 20:
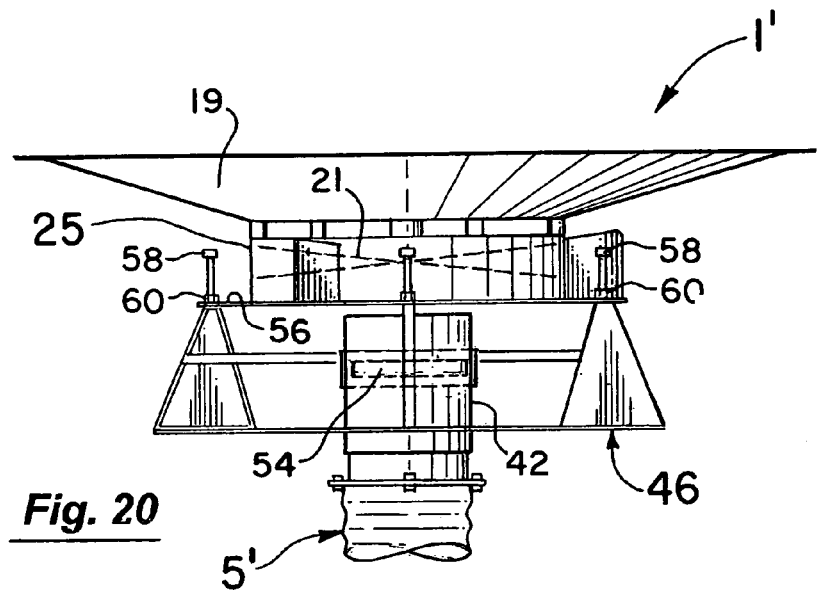
FIG. 20 is a side elevation view of the upper part of the system.
Figure 21:
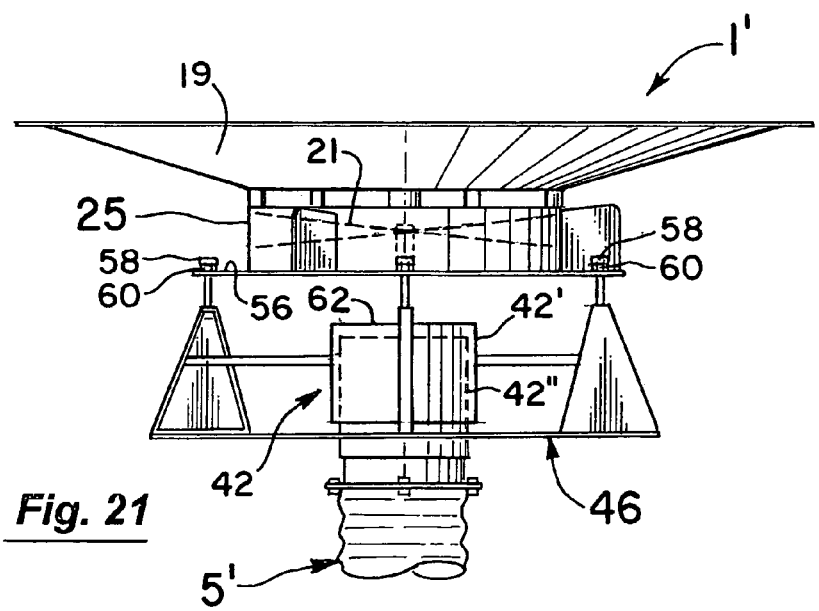
FIG. 21 illustrates the upper part of the system in an adjusted position.

In such environments, the basic circulating structure creating the aerobic zone 20 in the embodiments 1' (e.g., FIGS. 15-19) can be very effectively employed to create an odor cap for the pond 4' of FIG. 27. In particular and with the plate member 46 of the embodiments of FIGS. 15-19 closed or otherwise made into a solid piece and creating the circulating flow F as in FIG. 27, the contents of the pond 4' below the level of the plate member 46 will be essentially isolated and prevented from reaching the surface. Further, any gases bubbling up into the zone 20 from below the level of the plate member 46 will be effectively treated in the aerobic environment of zone 20 and harmlessly released into the atmosphere. Preferably, the operation of the dish 19 (see FIG. 19) would still be substantially the same in the environment of FIG. 27, whether or not the plate member 46 of FIG. 19 is solid or the flow through the draft tube 5' is simply closed to effectively make the member 46 a solid piece. The flow 48' from the depths (e.g., 1 to 2 feet) of the pond 4' passing through the housing 25 would then be proportioned as in the earlier embodiments 1 to flow along paths 10 and 12 in FIG. 19.

Figure 28:
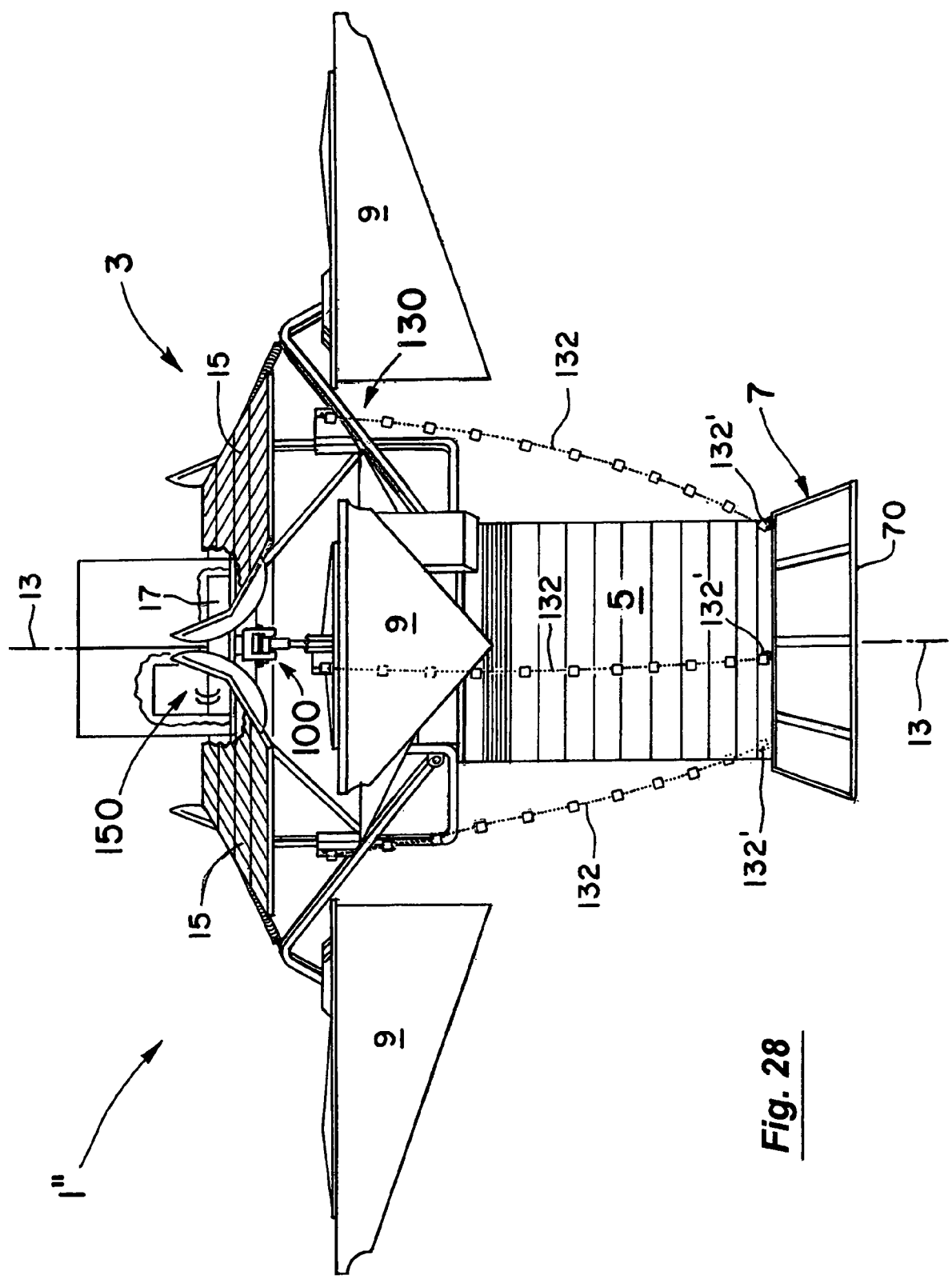
FIG. 28 illustrates an embodiment with other improvements.
Figure 29:
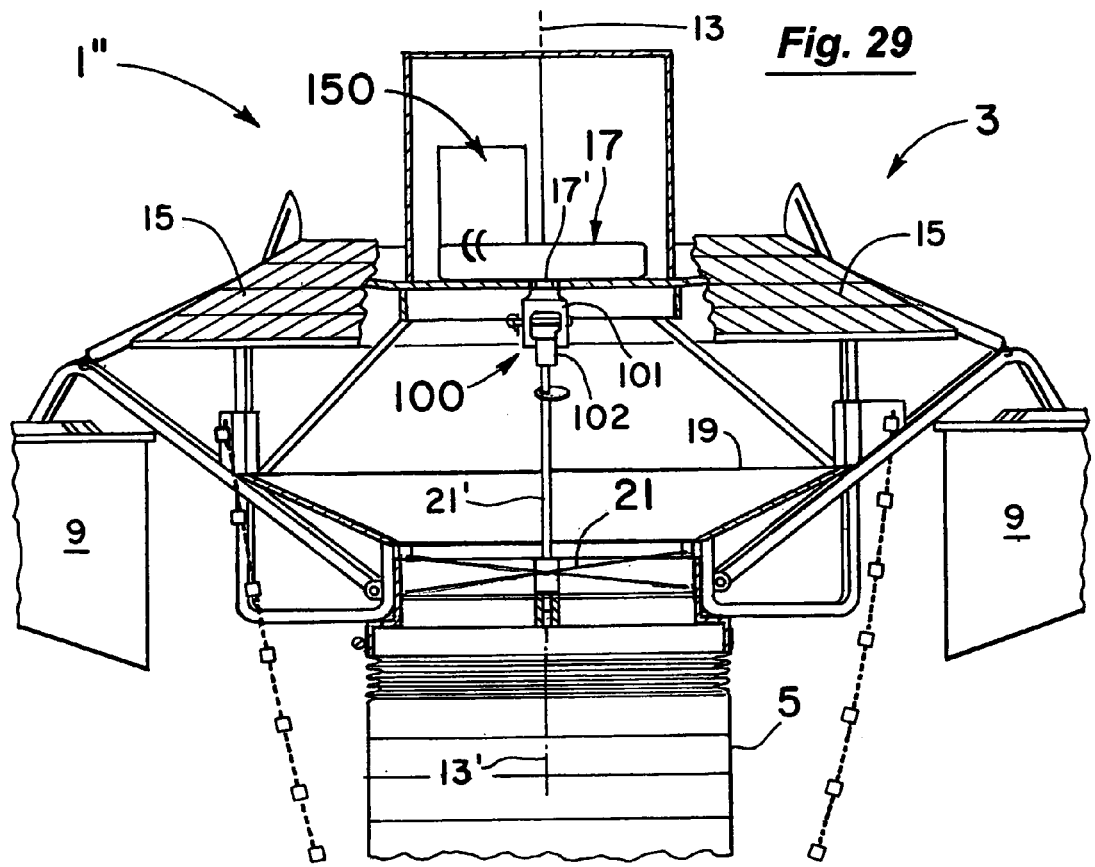
Figure 30:
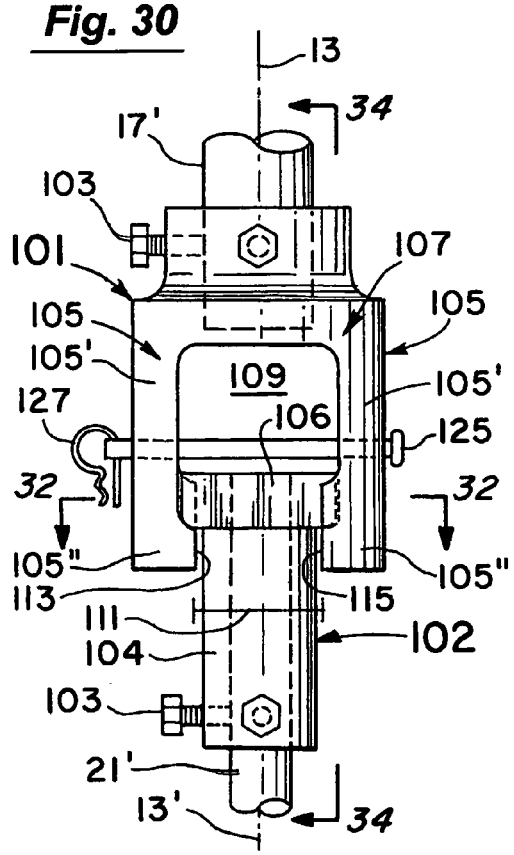
Figure 31:
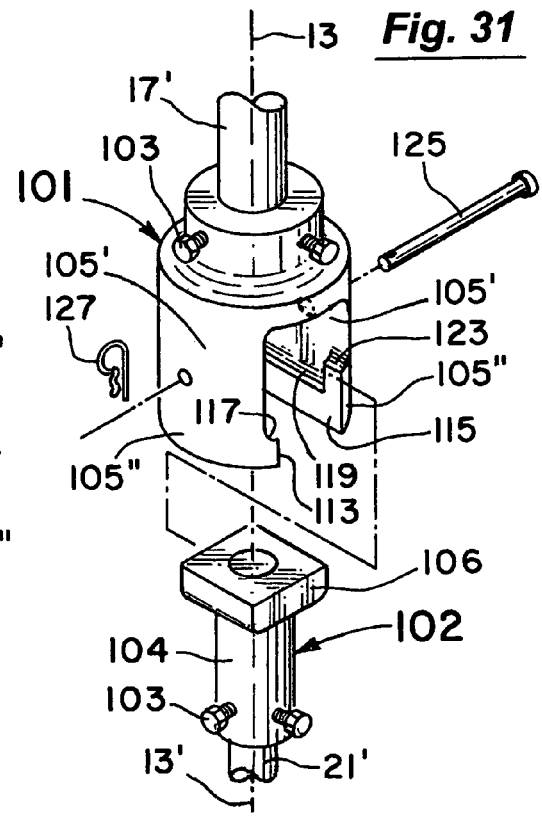

FIGS. 28-37 illustrate a further embodiment 1'' of the invention which includes an improved connecting arrangement 100 (FIG. 28) between the electric drive motor 17 (see also FIG. 29) and the impeller 21. The arrangement 100 of FIGS. 28-37 permits the driven shaft 21' of the impeller 21 as illustrated in FIGS. 35-37 to be quickly and easily connected and disconnected to the motor drive shaft 17'. More specifically, the connecting arrangement 100 includes first and second coupling members 101 and 102 (FIGS. 30-31). The first and second coupling members 101 and 102 are respectively attached by set screws 103 or other means to the motor drive shaft 17' and to the driven shaft 21' secured to the impeller 21. The first coupling member 101 as best seen in FIG. 30 has a pair of legs 105 extending away from the main body 107 of the coupling member 101 along the axis 13. The legs 105 are spaced from the axis 13 and each other.

The second member 102 in turn has a main body 104 (FIGS. 30-31) with a substantially rectangular head 106 thereon. The head 106 extends along and about the axis 13' and is removably receivable and securable between the legs 105 of the first coupling member 101. The legs 105 in this regard have a first gap 109 (FIG. 30) between the upper leg sections 105' and a smaller gap 111 between the lips 113,115 of the free standing, leg end portions 105'' (see also FIG. 32). In this last regard, the head 106 of the second coupling member 102 (FIG. 30) extends outwardly of the axis 13' of the second coupling member 102 for a distance greater than the gap distance 111 between the lips 113, 115 and less than the gap distance 109 between the leg sections 105'.

Each lip 113,115 extends in a direction substantially perpendicular to the axis 13 of the first coupling member 101 (FIG. 30) and has a surface 117,119 (FIGS. 31-33) to support the head 106 of the second coupling member 102. To help maintain the head 106 laterally coupled in place, stops 121,123 are provided that respectively extend upwardly along the axis 13 substantially perpendicular to each lip surface 117,119 (see FIGS. 32-34). In operation and with the head 106 of the second coupling member 102 supported on and abutting the lip surfaces 117,119, the stops 121,123 then positively limit lateral movement of the head 106 in either direction along an axis substantially perpendicular to the axis 13.

The lip surfaces 117, 119 could have stops at each end if desired but the single stops 121,123 on opposing ends of the surfaces 117, 119 as illustrated in FIG. 32 are sufficient to limit any lateral movement. In this manner and due to the weight of the impeller 21 and its downward pull during operation, the head 106 of the lower coupling member 102 is effectively secured in place. However, to positively limit any undesirable axial movement of the head 106 upwardly along the axis 13 above the height of the stops 121,123 a retaining pin 125 and clip 127 (see FIGS. 30-31 and 33-34) are preferably provided.

The head 106 of the second coupling member 102 as illustrated in FIGS. 32 and 34 is preferably supported on the lip surfaces 117,119 with the axes 13 and 13' (FIG. 34) of the shafts 17' and 21' collinearly aligned. To disconnect the coupling of the members 101 and 102 as shown in FIGS. 35-37, the clip 127 and retaining pin 125 are first removed (FIG. 35). The shaft 21' and secured impeller 21 can then be raised (e.g., two inches) to lift or slide the head 106 of the second coupling member 102 upwardly into the gap 109 between the leg sections 105' of the first coupling member 101. This movement also lifts the impeller 21 out of the lower bearing 63 as shown in FIG. 35. Once raised, the head 106 can be laterally removed (FIG. 36) from between the leg sections 105' of the upper coupling member 101. In doing so, the head 106 and the secured impeller shaft 21' and impeller 21 can be tilted if desired (FIGS. 36-37) to facilitate passing the impeller 21 out of the structure of the flotation platform including the dish 19. The first and second coupling members 101 and 102 as illustrated in FIG. 35 are thus removably attachable to each other by a releasable sliding arrangement. As illustrated, the arrangement allows the coupling members 101 and 102 to be moved relative to each other between an attached position (FIG. 30) and an unattached position (FIG. 35).

As indicated above, the axes 13 and 13' of the driving and driven shafts 17' and 21' are preferably collinearly aligned as in FIG. 34. In this position, the head 106 of the lower coupling member 102 then abuts and is supported on the lip surfaces 117,119 of FIGS. 32 and 34. However, the coupling members 101 and 102 as illustrated in FIGS. 34 and 34a are specifically designed to accommodate slight axial misalignments (e.g., 1-5 degrees or more) and still rotatably couple the members 101 and 102. In doing so, the head 106 (which is preferably rectangular about and along the axis 13') can rock or pivot about an edge portion 129 of the head 106 (see FIG. 34a). The edge portion 129 (which can be slightly curved) then acts as a pivotal axis that is substantially perpendicular to and spaced from the substantially vertical axis 13 of the motor drive shaft 17'. The axes 13 and 13' although not collinear in FIG. 34a do preferably still intersect. The substantially rectangular or square head 106 can also adjust for slight misalignments by rocking or pivoting on the opposite edge portion 131 in FIG. 34a. In doing so, the main body 104 of the rocking coupling member 102 is confined by the lips 113,115 to movement substantially in a central plane between the lips 113,115.

Regardless of whether the head 106 has rocked or pivoted to either edge portion 129 or 131 to accommodate any misalignments, the head 106 stays in that position relative to the upper coupling member 101 as the coupling members 101 and 102 are rotated. Again, the range of misalignment that can be efficiently accommodated is on the order of a few degrees. Further, in the rocked or pivoted position of FIG. 34a, the retaining pin 125 is still positioned to keep the cocked head 106 from moving axially upwardly beyond the height of the stops 121, 123. It is noted that although the members 101 and 102 of the coupling are shown and described with the coupling member 101 being the upper one, the relative positioning of the members 101 and 102 could be reversed with coupling member 102 being the upper one. Thus, with the connecting arrangement 100, a strong coupling is provided which not only can handle the rotating (torque) and axial forces between the shafts 17' and 21' but also can handle minor misalignments therebetween.

Figure 38:
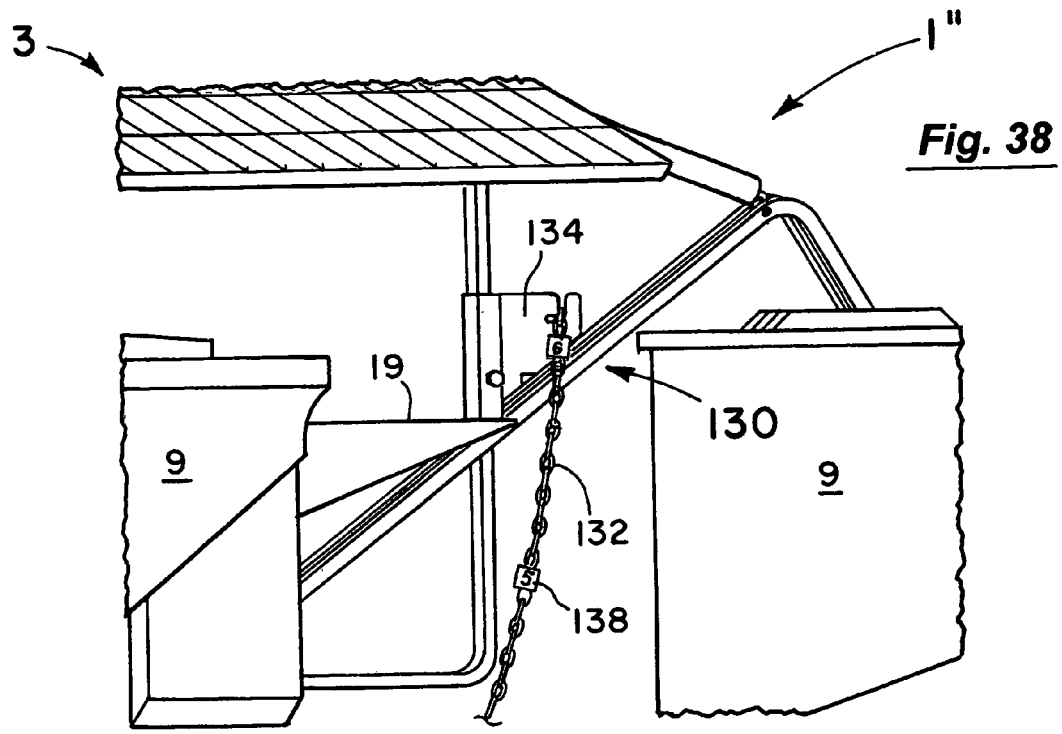
FIGS. 38-39 show an adjustable depth arrangement for the draft tube of FIG. 28.
Figure 39:
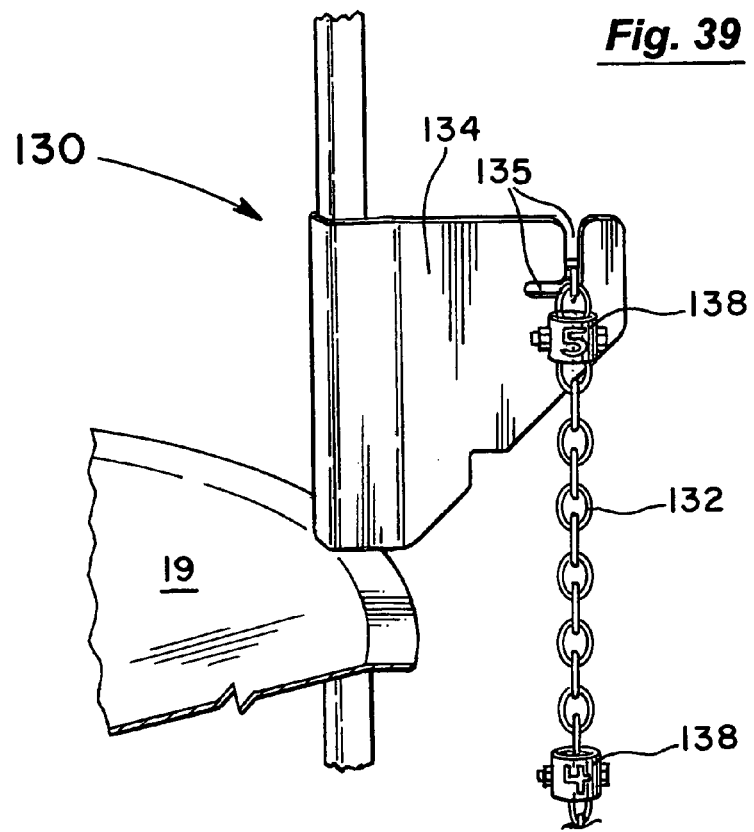

FIGS. 28 and 38-39 illustrate an arrangement 130 for adjusting and marking the depth of the lower end portion and inlet 7 of the draft tube 5 (see also FIG. 1). The arrangement 130 also helps to keep the planar or plate member 70 of the inlet 7 of FIG. 28 substantially horizontal to aid in desirably confining the incoming flow 66 (FIG. 1) to a substantially horizontal direction.

More specifically, the adjusting and marking arrangement 130 of FIG. 28 preferably includes at least three linear members 132 (e.g., chains or cables). The members 132 are preferably spaced substantially equally (e.g., 120 degrees) about the axis 13 of the flotation platform 3 and lower end portion of the draft tube 5. The lower end portion 132' of each linear member 132 is fixedly attached adjacent the lower end of the draft tube 5. The upper end portion of each linear member 132 is then releasably and adjustably securable (FIGS. 38-39) to the flotation platform 3 at different, desired locations along the upper portion of each member 132. This can be done in any number of manners. In the illustrated one of FIGS. 38-39, a plate 134 with perpendicular slots 135 (FIG. 39) is mounted on the flotation platform 3 to selectively receive and secure links of the illustrated chain 132 in a known manner.

In use, the depth of the lower end portion and inlet 7 of the collapsible draft tube 5 in FIG. 28 can be selectively set as desired by adjusting the location of the secured upper portion of each chain 132 on the slotted plate 134. This can be done manually without the need for any tools. Depth markers 138 in FIGS. 38 and 39 are preferably attached to the chain or other linear member 132 at predetermined distances along the lengths thereof (e.g., each foot) and numerically marked accordingly. Preferably, the secured locations of the chains 132 on the slotted plates 134 of the flotation platform 3 are above the surface of the body of water. In this manner, the markers 138 will be visible even from shore (e.g., with the aid of binoculars if needed). If the linear members 132 are simple cables or other means, the enlarged markers 138 could also serve as stops in cooperation with the slots 135 to selectively set the depth of the draft hose inlet 7.

Regardless and with the arrangement 130, the depth of the lower end portion and inlet 7 of the draft hose 5 can be accurately set and adjusted as desired or needed. This is accomplished as discussed above by varying the distance between the affixed lower portion 132' of each chain 132 and the secured location of the upper portion thereof. Additionally, the depth can be visually monitored or seen by reference to the markers 138. Further, with the preferred equal spacing of the at least three linear members 132 about the axis 13 of FIG. 28 coupled with the depth markers 138, the planar member 70 of the draft hose inlet 7 in FIGS. 1 and 28 can be set in its preferred orientation extending substantially level or horizontally.

Figure 46:
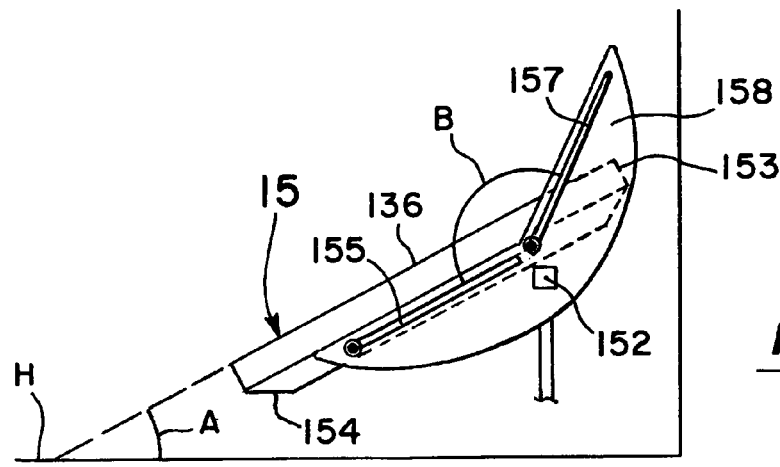
FIGS. 46-50a illustrate mountings for the solar panels that permit them to be angularly adjusted about a horizontal axis.
Figure 47:
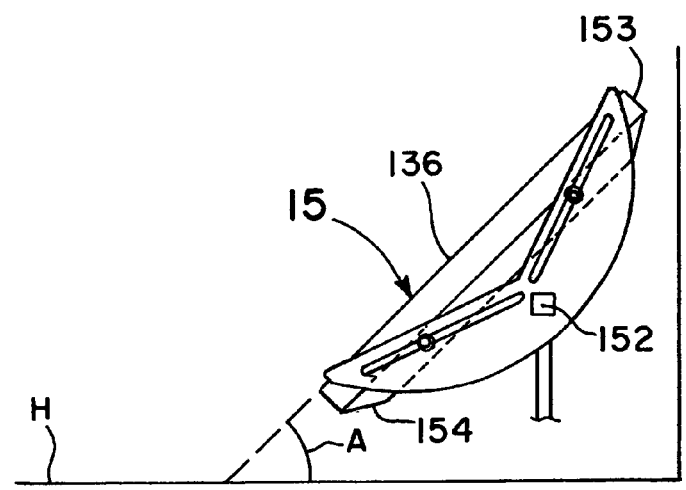
Figure 48:
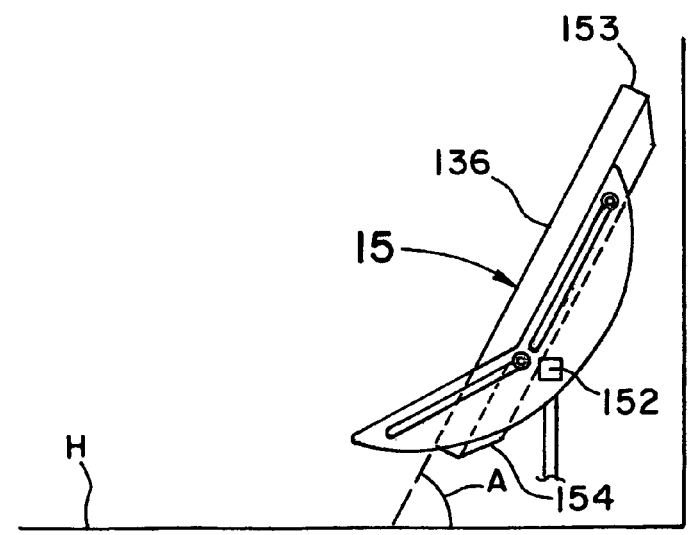
Figure 49:
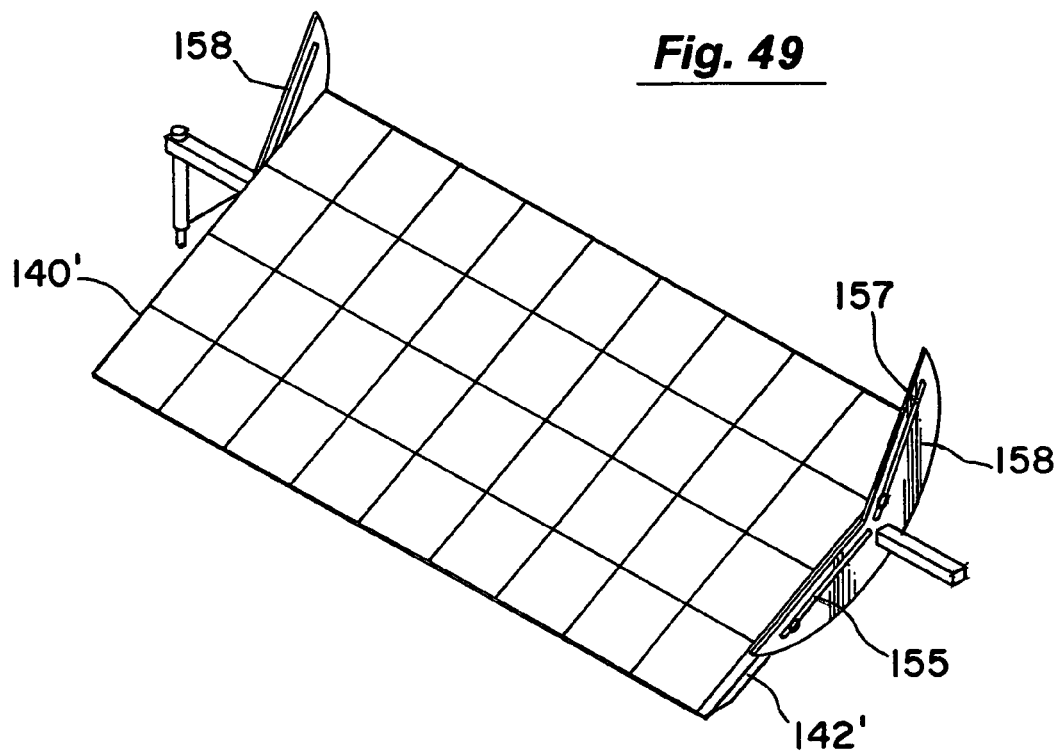

FIGS. 40-54 illustrate improvements to the mountings for the solar panels 15. With them, the panels 15 can be pivoted outwardly (compare FIGS. 40 and 41). Additionally, the angle A of the planar face 136 of the solar panels 15 to the horizontal plane H (FIGS. 46-48) can be adjusted. Further, at least panel 15' (FIGS. 51-52) of the solar panels 15,15' can be mounted to face toward the central axis 13 of the flotation platform 3.

Figure 40:
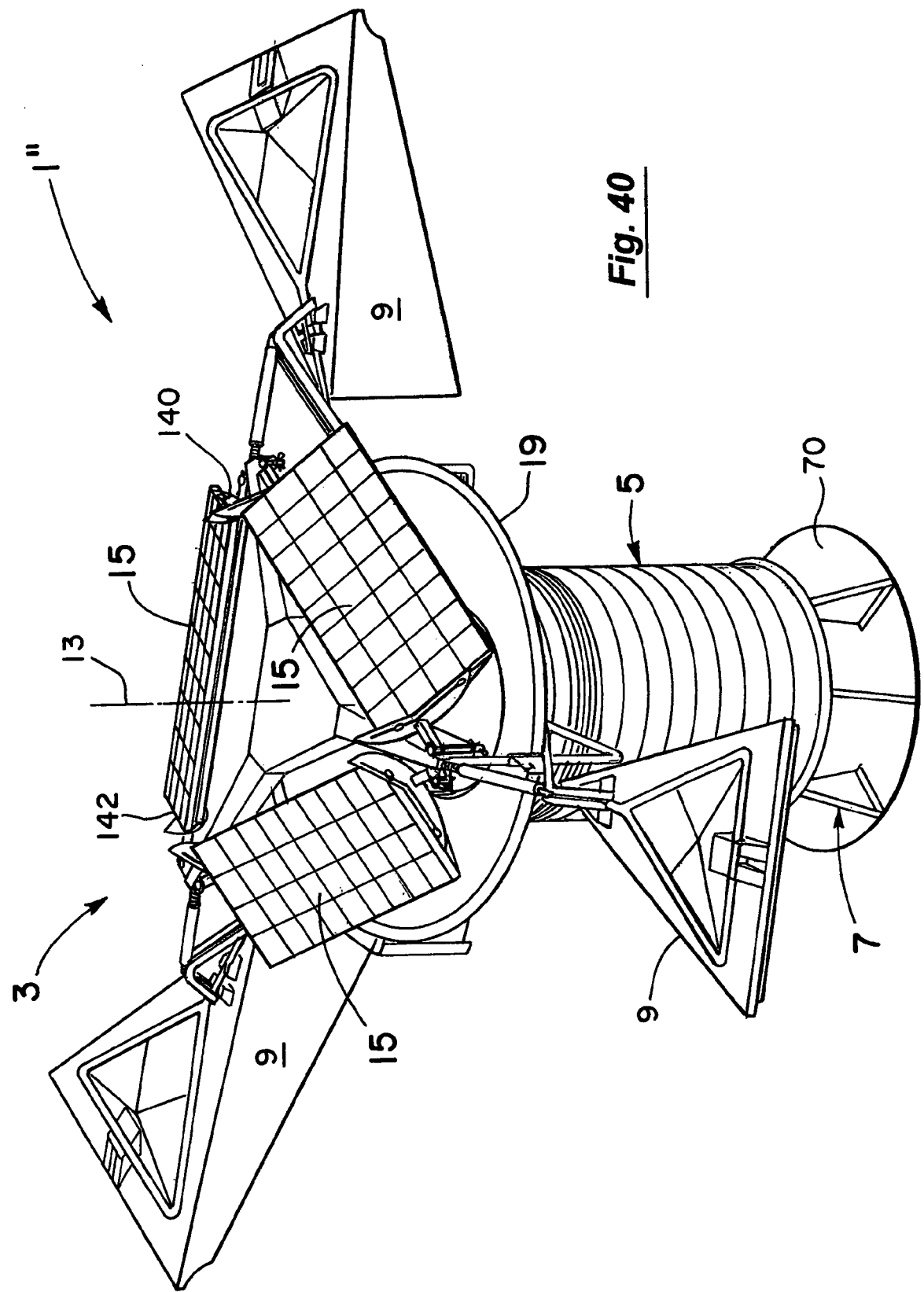
FIGS. 40-45 show an arrangement of the embodiment of FIG. 28 that allows the solar panels to be swung outwardly to provide better visibility and access to the interior of the flotation platform and the components on it including the impeller.
Figure 41:
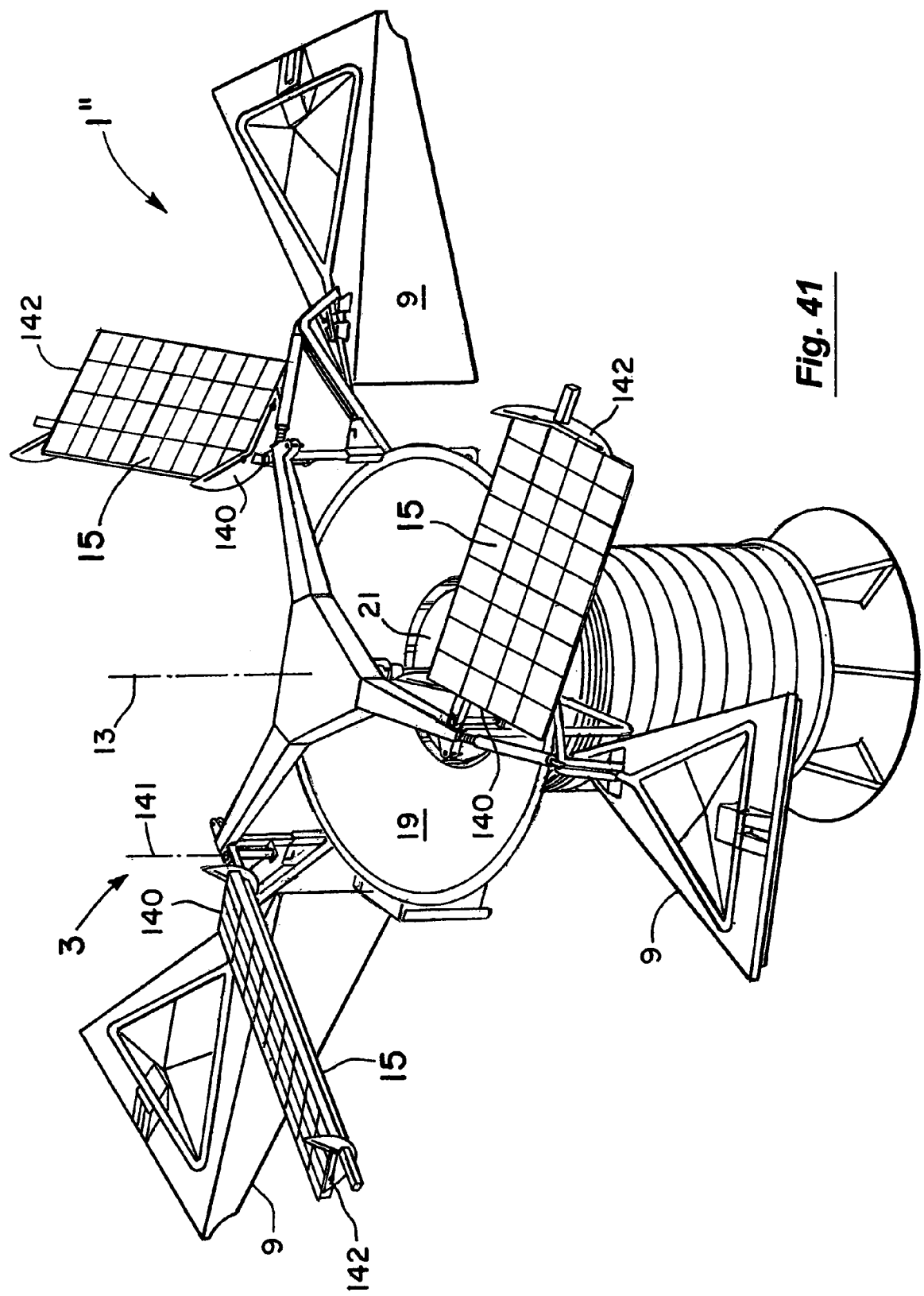
Figure 42:
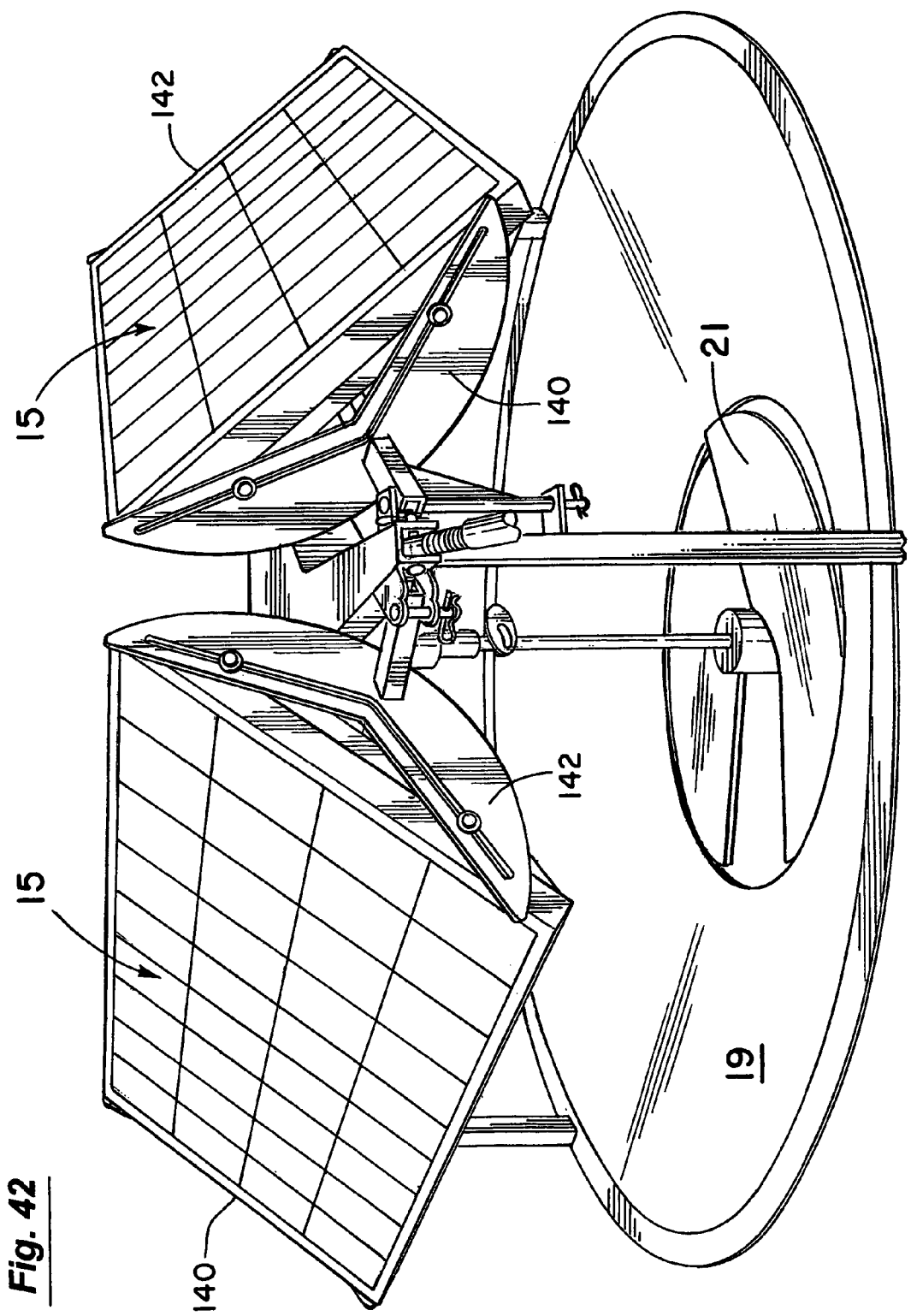
Figure 43:
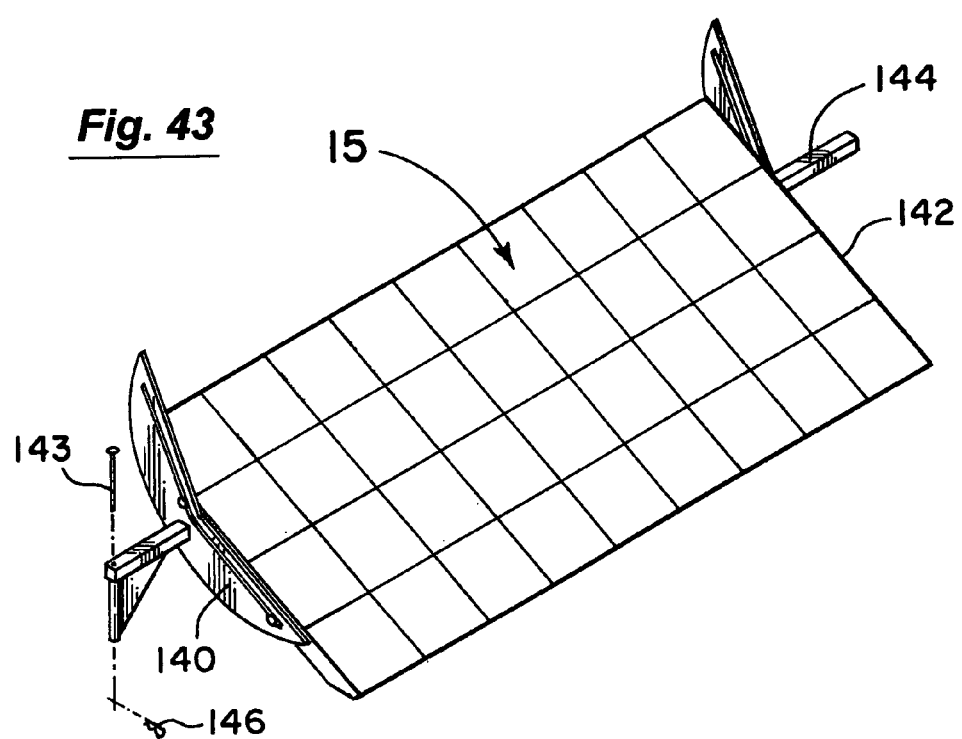

More specifically and referring first to the mountings of FIGS. 40-54, it is desirable to be able to move the solar panels 15 from the closed, compact position of FIG. 40 to the open position of FIG. 41. In the open position of FIG. 41, the interior structure and components on the flotation platform 3 including the impeller 21 can then be more easily seen and-serviced. The various components can also be more easily removed and replaced if need, in particular the impeller 21 of FIGS. 35-37. To accomplish the movement of the panels 15 to the open position of FIG. 41, one side portion 140 of each panel 15 is mounted on the flotation platform 3 for pivotal movement about a substantially vertical axis 141 (see the far left panel 15 in FIG. 41). The axis 141 as shown is spaced from and substantially parallel to the central vertical axis 13 of the flotation platform 3. The other or free side portion 142 of each respective panel 15 is then selectively lockable to the flotation platform 3 in the closed position of FIGS. 40 and 42. In the closed position of FIGS. 40 and 42, each solar panel 15 preferably extends above and substantially over the dish 19 in a compact manner.

Figure 44:
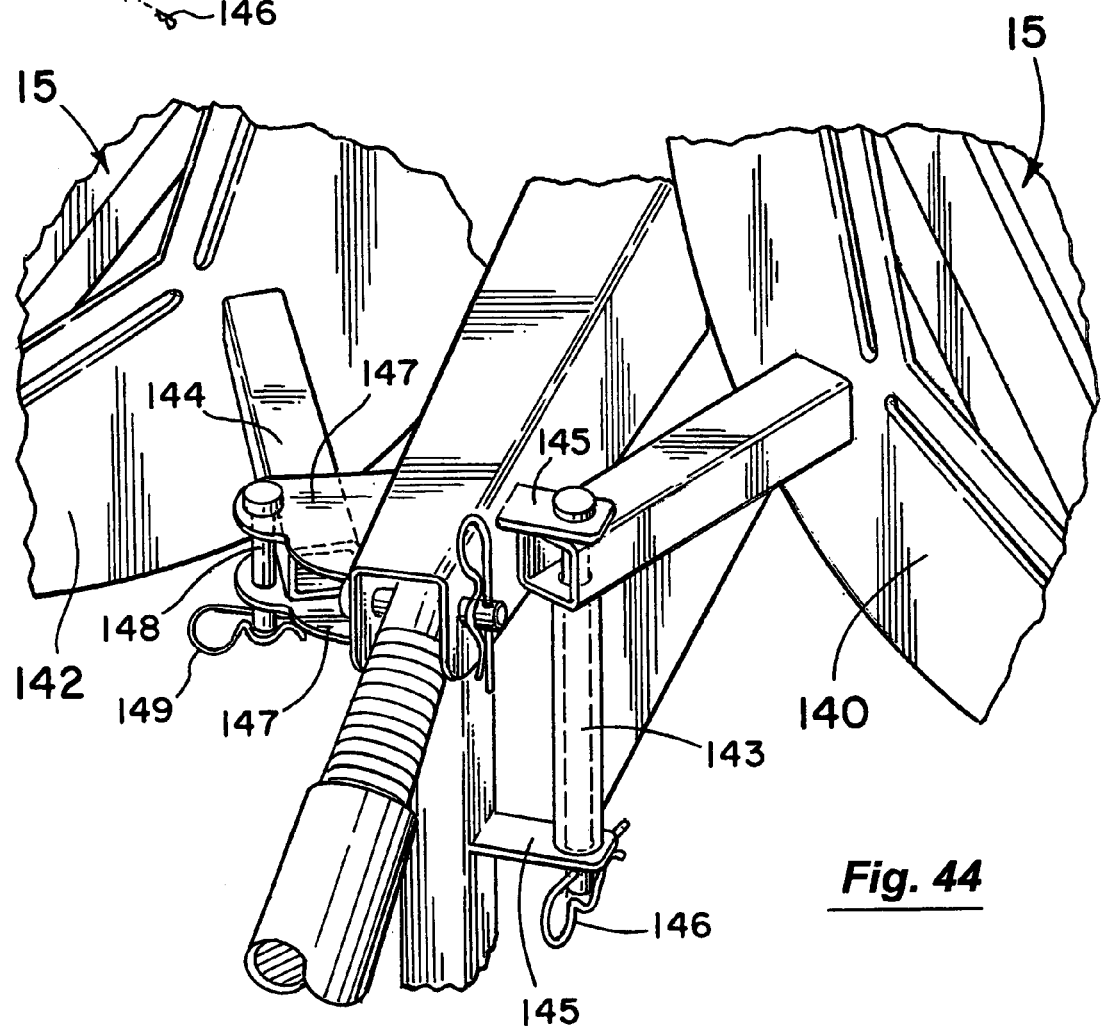
Figure 45:
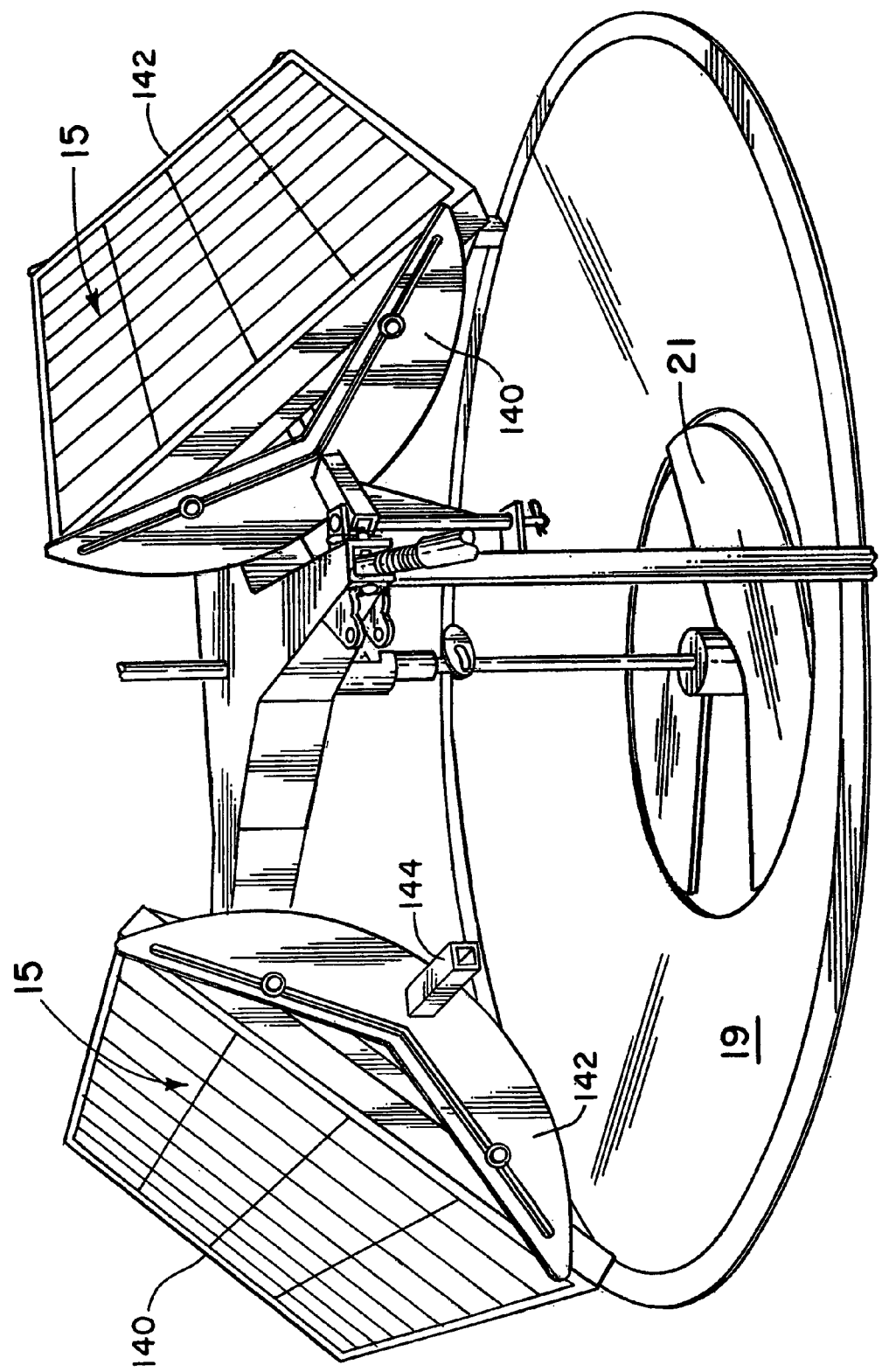

The solar panels 15 can be pivotally mounted to the flotation platform 3 and locked in the closed position in any number of ways. In the illustrated one of FIGS. 40-45, each panel 15 is provided with a hinge pin 143 (FIG. 43) on the one side portion 140 and a simple, projecting bar 144 on the other side portion 142. The hinge pin 143 can be easily and quickly secured in place as illustrated in FIG. 44 between the flanges 145 on the flotation platform 3 by clip 146. The projecting bar 144 on the other side portion 142 can then be secured in place between the flanges 147 on the flotation platform 3 by the rod 148 and clip 149 arrangement of FIG. 44. In this manner and in the closed position of the solar panels 15 of FIG. 44, each panel 15 is securely locked in place.

To release each panel 15, the clip 149 and rod 148 of FIG. 44 can be quickly and easily removed and the panel 15 pivoted outwardly (FIG. 45) toward its open position. In the open position (e.g., FIG. 41), the free side portions 142 of the panels 15 are spaced farther from the central vertical axis 13 of the flotation platform 3 than in the closed position of FIG. 40. The side portions 142 also preferably extend horizontally outwardly beyond the dish 19 in the open position. Each panel 15 in the open position then serves to provide better access to the interior of the flotation platform 3, including the impeller 21 and electronic control box 150 (see FIGS. 28-29) for the electric motor 17 and other components of the system 1". It is noted that the control box 150 of FIGS. 28-29 in this regard is not shown in the other views for clarity.

Each solar panel 15 is preferably also mounted so that the angle A (see FIGS. 46-48) of the planar face 136 of the panel 15 can be adjusted relative to a horizontal plane H. In this manner, each solar panel 15 is movable generally about a horizontal axis 152. The axis 152 in turn is substantially perpendicular to the central vertical axis 13 of the flotation platform 3 and the pivotal axis 141 (FIG. 41) of each panel 15. The solar panels 15 are preferably compactly and evenly spaced from each other about the axis 13 and always spaced above the water surface (e.g., H). Consequently, it is desirable that any adjustments as in FIGS. 46-48 move the upper portion 153 of the panel 15 laterally in and out as little as possible so as not to strike an adjacent panel 15. It is also desirable that the lower portion 154 of the panel 15 move vertically up and down as little as possible so as to remain spaced from the water surface H during any such adjustments. To accomplish this, slotted tracks 155,157 have been provided on each side support member 158 (see FIGS. 46 and 49) of the panels 15. Pins 159 on the corresponding side portions 140',142' of the main body of each panel 15 (FIG. 50) are then received and confined in each respective track 155,157 in members 158. The slotted tracks 155,157 (FIG. 46) of each pair are at an obtuse angle B (e.g., 130-150 degrees) to one another. In operation, the pins 159 on each side portion 140',142' of the main body of the panels 15 can be slid along the respective tracks 155,157 and tightened in place as desired. In this manner, the angle A of the planar face 136 of each panel 15 in FIGS. 46-48 can be easily and quickly adjusted as desired or needed to maximize the solar energy captured by each panel 15. In the winter months in the northern hemisphere with the adjustment of FIG. 48, there is also less of a tendency for snow to collect on the steeply inclined face 136 of the panel 15.

Figure 51:
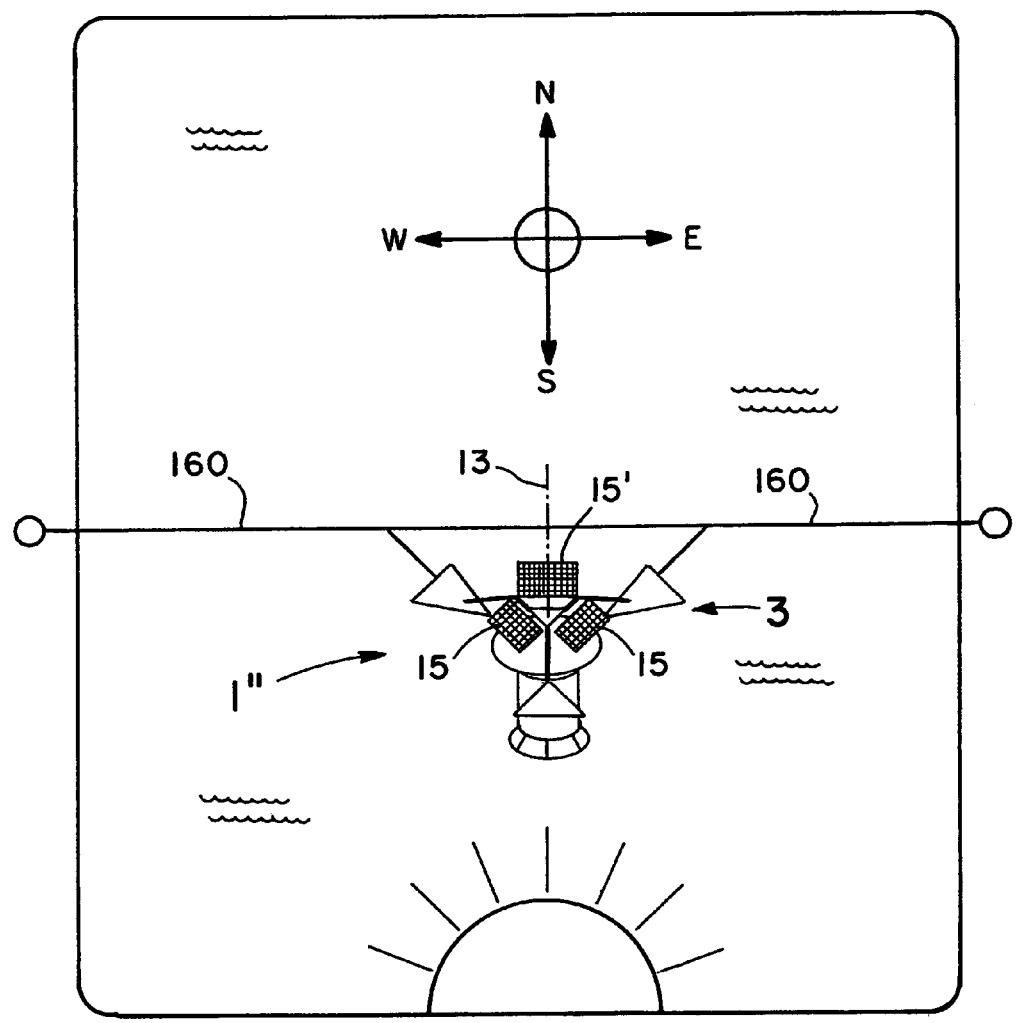

In some applications of the improved embodiment 1" of the invention as illustrated in FIG. 51, it is desirable to tether the flotation platform 3 to the shore (e.g., by ropes or cables 160). In such cases and in contrast to prior applications, the directional orientation of the flotation platform 3 about its central vertical axis 13 is essentially fixed. For increased operational efficiency, at least one of the solar panels 15 of the prior embodiments is replaced with a modified panel 15'. The modified panel 15' faces toward the central axis 13 of the flotation platform 3 (see FIG. 52) rather than away as with panels 15. The modified panel 15' is preferably still pivotally mounted to the flotation platform 3 via the arrangement of hinge pin 143 and projecting bar 144 of FIGS. 43-44 and 53. However, as indicated above, the modified panel 15' preferably faces toward the central axis 13 of the flotation platform 3 and preferably in a southerly direction as in FIG. 51. The modified panel 15' as illustrated also preferably extends vertically above or higher than the other panels 15, which are preferably facing generally southeasterly and southwesterly. In this manner and particularly in the winter months with the sun lower above the horizon in the northern hemisphere, the full face 136' of the panel 15' will preferably be exposed to the sun above any shadows cast by the other panels 15.

Figure 55:
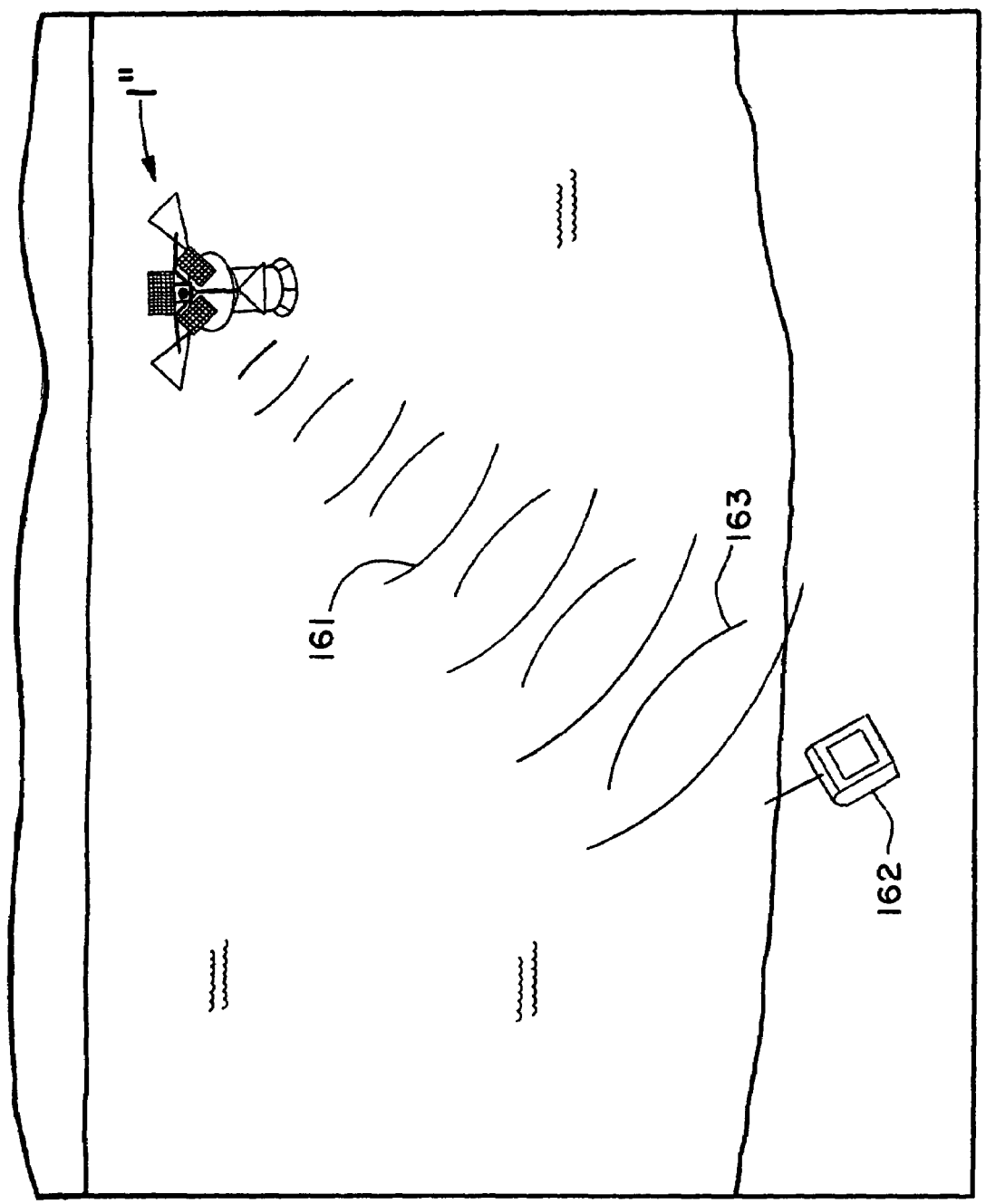
FIG. 55 illustrates an arrangement for the embodiment of FIG. 28 in which the operation of the components of the system can be monitored and controlled including remotely from shore by two-way communications.

FIG. 55 illustrates an improvement wherein one or more operating characteristics of the system 1" can be remotely monitored and controlled (e.g., from a location on shore or even a central location miles away). As for example, it is often desirable to be able to check the operation of the system 1" (e.g., rate of rotation of the motor 17 and impeller 21, power load being drawn by the motor 17, output of the solar panels 15,15') from the shore without having to physically go out to it (e.g., by boat). In this regard, the system 1" is preferably provided with the monitoring and controlling box 150 illustrated in FIGS. 28 and 29. In use, the box 150 electronically or otherwise monitors one or more operational characteristics of the components of the flotation platform 3 and electronically transmits them (e.g., by radio signals 161) to a handheld or other receiver 162 on shore. The receiver 162 as discussed above could also be miles away at a central location and the signals 161 could even be relayed via satellite.

Figure 50:
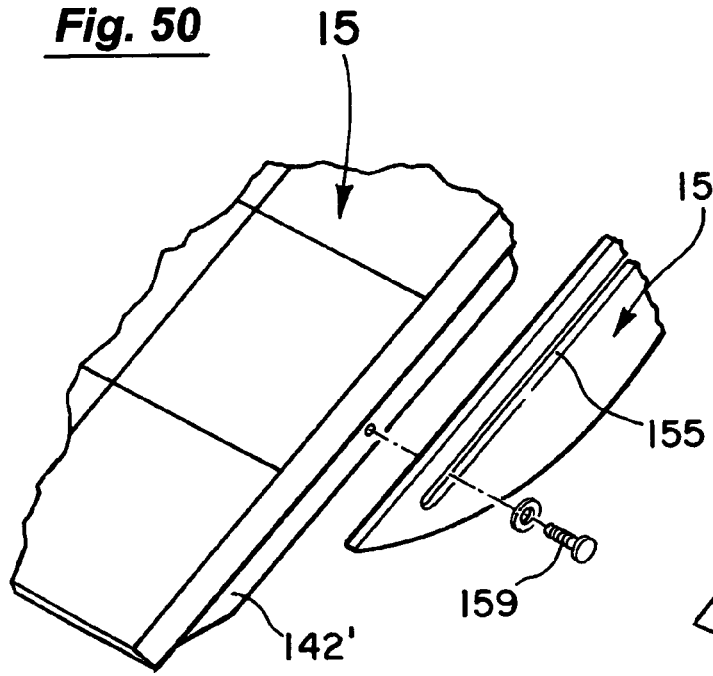
Figure 50A:
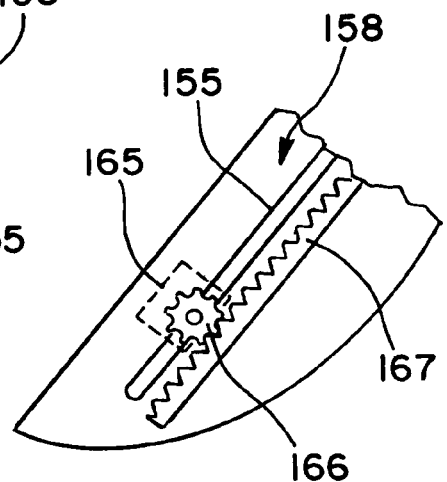

The communication between the system 1" on the body of water in FIG. 55 and the receiver 162 could be two way if desired. Signals 163 could then be transmitted to the box 150 from shore to adjust or otherwise control the operating characteristics of the system 1". As for example, it is not uncommon for the impeller 21 to become clogged and slowed down or even stopped by debris (e.g., grass, twigs, garbage bags, or dead fish, ducks, and turtles). In an effort to unclog the impeller 21, the direction of rotation of the impeller 21 about the axis 13 can be reversed. With the remote arrangement of the present invention, the load or power draw of the drive motor 17 for the impeller 21 or the rate of revolution can be monitored and if the draw is higher than normal or the rotational rate lower, it can be read from shore. If appropriate, a boat trip to the flotation platform 3 can be made or if desired, the control box 150 can be remotely operated from shore to reverse the rotational direction of the drive motor 17 and impeller 21, adjust the rotational rate, and/or shut down the motor 17. Other operational characteristics could also be similarly monitored (e.g., the angle A of the planar face 136 of the solar panels 15 of FIGS. 46-48) and remotely adjusted (e.g., by activating the motor 165 and gear/track arrangement 166,167 of FIG. 50a).

The control box 150 of FIGS. 28-29 is also preferably programmable to perform actions by itself based on time intervals as well as predetermined changes in the operating characteristics sensed by it. As for example and to reduce the accumulation of debris on the impeller 21 that may clog or eventually stop it, the control box 150 can be programmed to reverse the rotational direction of the motor 17 and impeller 21. This can be done at predetermined time intervals (e.g., once or more a day) for predetermined periods (e.g., 1-5 minutes). The periodic reversal could also be at odd intervals such as every 25 hours (or at intervals not totaling 24 hours) so the cleansing or unclogging of the impeller 21 will occur at different times of the day over extended periods. Additionally, the control box 150 can be programmed to reverse the rotation based upon sensing a predetermined change such as a higher than normal loads or power draws (e.g., amperage) by the motor 17. If a clog is sensed and remains after a reversal of rotation, the control box 150 will preferably perform a number of spaced reversals (e.g., 1 minute every 10 minutes). Eventually, the control box 150 will shut down the motor 17 if the clog cannot be cleared or if the clog represents a potentially damaging operating condition on one or more of the components of the system 1" (e.g., overheating of the motor 17). In the remote operational configuration of FIG. 55, a signal 161 would then be sent to the receiver 162 on shore or at a central location indicating a problem. As discussed above and in the two-way arrangement, a signal 163 could be remotely sent from shore or the central location to the control box 150 to shut down the system 1" including turning off the motor 17 in the event a problem or undesirable condition was discovered.

As indicated above, it is anticipated that the motor reversals attempting to unclog the impeller 21 would normally be for relatively short periods of time (e.g., minutes). However, the reversals could be run for significantly longer periods of time and with any of the embodiments disclosed above. For example, a particular body of water such as a city or other recreational park may develop unsightly and undesirable surface weeds, blue-green algae, or other surface plant growth. In such cases, it may be beneficial to reverse the normal direction of rotation of the impeller 21 for relatively long periods of time (e.g., at least about a day or many days). This would serve to draw in the surface weeds (e.g., duck weed or Eurasian milfoil) and blue-green algae and drive them downwardly through the impeller 21 into the depths (e.g., 5 feet or more) of the body of water and outwardly away from the flotation platform 3. In most applications, the primary circulation in the body of water would then be essentially the reverse of the previously illustrated ones as in FIGS. 1, 12-14, and 27. Although the physical moving and reverse circulation of the surface plant growth down into the body of water may not necessarily in and of itself kill the weeds or algae, it does upset the natural environment promoting their growth and can reduce and may eventually eliminate them.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

We claim:

1. A circulation system for a body of water, said system including a flotation platform, a dish, an impeller, a drive motor, and a connecting arrangement (100) between said drive motor (17) and said impeller (21), said connecting arrangement including a first shaft (17') driven by said drive motor to rotate about a first, substantially vertical axis (13), a second shaft (21') extending along a second axis (13') and secured to said impeller, and a coupling between said first and second shafts to substantially align said first and second axes wherein rotation of said first shaft about said substantially vertical first axis by said drive motor rotates said second shaft and the impeller secured thereto about said second axis, said coupling including at least first (101) and second (102) coupling members removably attached to one another wherein said second shaft (21') and the impeller (21) secured thereto can be selectively removed from attachment to said first shaft (17') wherein one (101) of said coupling members has at least a pair of legs (105) extending along said first axis (13), said legs being spaced from one another to create a gap extending between and through said legs and open on opposite sides of the legs wherein the other (102) of said coupling members has a substantially rectangular head (106), said substantially rectangular head being selectively, removably receivable between the legs of said one coupling member from either side of said gap and securable between the legs of said one coupling member.

2. The system of claim 1 wherein said head is substantially square.

3. A circulation system for a body of water, said system including a flotation platform, a dish, an impeller, a drive motor, and a connecting arrangement (100) between said drive motor (17) and said impeller (21), said connecting arrangement including a first shaft (17') driven by said drive motor to rotate about a first, substantially vertical axis (13), a second shaft (21') extending along a second axis (13') and secured to said impeller, and a coupling between said first and second shafts to substantially align said first and second axes wherein rotation of said first shaft about said substantially vertical first axis by said drive motor rotates said second shaft and the impeller secured thereto about said second axis, said coupling including at least first (101) and second (102) coupling members removably attached to one another wherein said second shaft (21') and the impeller (21) secured thereto can be selectively removed from attachment to said first shaft (17') wherein said first and second coupling members are movable relative to each along said first axis (13) between an attached position and an unattached position.

4. The system of claim 1 wherein said first and second coupling members are removably attached to each other by a releasable sliding arrangement.

5. The system of claim 1 wherein said first and second coupling members are removably attached to one another for movement relative to each other about a pivotal axis (129) substantially perpendicular to and spaced from the substantially vertical first axis (13) of the shaft (17') driven by said drive motor.

6. A circulation system for a body of water, said system including a flotation platform, a dish, an impeller, a drive motor, and a connecting arrangement (100) between said drive motor (17) and said impeller (21), said connecting arrangement including a first shaft (17') driven by said drive motor to rotate about a first, substantially vertical axis (13), a second shaft (21')

extending along a second axis (13') and secured to said impeller, and a coupling between said first and second shafts to substantially align said first and second axes wherein rotation of said first shaft about said substantially vertical first axis by said drive motor rotates said second shaft and the impeller secured thereto about said second axis, said coupling including at least first (101) and second (102) coupling members removably attached to one another wherein said second shaft (21') and the impeller (21) secured thereto can be selectively removed from attachment to said first shaft (17') wherein said first and second coupling members are removably attached to one another for pivotal movement relative to each other about first and second pivotal axes (129,131) substantially perpendicular to and spaced from the substantially vertical first axis (13) of the shaft (17') driven by said drive motor.

7. A circulation system for a body of water, said system including a flotation platform, a dish, an impeller, a drive motor, and a connecting arrangement (100) between said drive motor (17) and said impeller (21), said connecting arrangement including a first shaft (17') driven by said drive motor to rotate about a first, substantially vertical axis (13), a second shaft (21') extending along a second axis (13') and secured to said impeller, and a coupling between said first and second shafts to substantially align said first and second axes wherein rotation of said first shaft about said substantially vertical first axis by said drive motor rotates said second shaft and the impeller secured thereto about said second axis, said coupling including at least first (101) and second (102) coupling members removably attached to one another wherein said second shaft (21') and the impeller (21) secured thereto can be selectively removed from attachment to said first shaft (17') wherein said first coupling member has a main body (107) and at least a pair of legs (105) extending away from the main body along said first axis (13), said legs having respective sections (105') spaced from one another a first distance to create a first gap (109) therebetween, each leg having a free standing end portion (105") spaced from the main body and having a lip (113,115) extending toward the axis of the first coupling member and toward the other lip, said lips being spaced from each other a second distance to create a second gap (111) therebetween, said second distance being less than said first distance, said second coupling member (102) having a main body (104) and a head (106) extending away from the main body thereof along and about said second axis (13'), said head extending outwardly of said second axis for a third distance less than the first distance (109) between the leg sections (105') of the first coupling member and greater than the second distance (111) between the lips (113,115) of the leg end portions (105") wherein the head of said second coupling member can be moved to be received between the legs sections (105') of the first coupling member and thereafter moved along the axis (13) of the first coupling member to abut the lips of said first coupling member to connect the first and second coupling members together with the axes (13,13') of said first and second coupling members substantially aligned.

8. The system of claim 7 wherein each lip extends in a direction substantially perpendicular to the axis (13) of the first coupling member and has a surface (117,119) abutting the head (106) of the second coupling member, said first coupling member further including at least one stop extending along the axis (13) of the first coupling member substantially perpendicular to at least one of the lip surfaces (117,119) to positively limit movement of said abutting head in a first direction along said one lip surface.

9. The system of claim 8 wherein each lip surface (117, 119) has at least one stop (121,123).

10. The system of claim 9 wherein each lip surface (117,119) has only one stop and the stops (121,123) are on opposite ends of the respective lip surfaces (115,117) to positively limit movement of said abutting head in said first direction and in a direction opposite to said first direction along said lip surfaces.

11. A circulation system for a body of water, said system including a flotation platform, a dish, an impeller, a drive motor, and a connecting arrangement (100) between said drive motor (17) and said impeller (21), said connecting arrangement including a first shaft (17') driven by said drive motor to rotate about a first, substantially vertical axis (13), a second shaft (21') extending along a second axis (13') and secured to said impeller, and a coupling between said first and second shafts to accommodate a slight misalignment of said first and second axes (13,13') wherein rotation of said first shaft (17') about said substantially vertical first axis (13) by said drive motor rotates said second shaft (23') and the impeller secured thereto about said slightly misaligned second shaft (13'), said coupling including at least first (101) and second (102) coupling members attached to each other for movement relative to each other about a pivotal axis (129) substantially perpendicular to and spaced from the substantially vertical first axis (13) of the shaft (17') driven by said drive motor wherein said first and second coupling members are attached to each other for movement about first and second pivotal axes (129,131) said pivotal axes being spaced from one another and substantially perpendicular to and spaced from the substantially vertical first axis (13) of the shaft (17') driven by said drive motor.

12. The system of claim 11 wherein one of said coupling members has a least a pair of legs (105) extending along the first axis (13), said legs being spaced from one another to create a gap (109) therebetween and wherein the other coupling member has a head receivable in said gap between the legs of said one coupling member, said first and second pivotal axes being spaced from one another and substantially perpendicular to and spaced from the substantially vertical first axis (13) of the shaft (17') driven by the drive motor, said first and second pivotal axes being respectively defined by first and second edges portions (129,131) of said head.

13. The system of claim 11 wherein said first and second coupling members are removably attached to one another.

14. The system of claim 11 wherein said first and second coupling members are removably attached to one another by a releasable sliding arrangement.

15. A circulation system for a body of water, said system including a flotation platform, a dish, an impeller, a drive motor, and a connecting arrangement (100) between said drive motor (17) and said impeller (21), said connecting arrangement including a first shaft (17') driven by said drive motor to rotate about a first, substantially vertical axis (13), a second shaft (21') extending along a second axis (13') and secured to said impeller, and a coupling between said first and second shafts to accommodate a slight misalignment of said first and second axes (13,13') wherein rotation of said first shaft (17') about said substantially vertical first axis

(13) by said drive motor rotates said second shaft (23') and the impeller secured thereto about said slightly misaligned second shaft (13'), said coupling including at least first (101) and second (102) coupling members attached to each other for movement relative to each other about a pivotal axis (129) substantially perpendicular to and spaced from the substantially vertical first axis (13) of the shaft (17') driven by said drive motor wherein said first and second coupling members (101,102) are movable relative to each other along said first axis (13) between an attached position and an unattached position.

16. A circulation system for a body of water, said system including a flotation platform, a dish, an impeller, a drive motor, and a connecting arrangement (100) between said drive motor (17) and said impeller (21), said connecting arrangement including a first shaft (17') driven by said drive motor to rotate about a first, substantially vertical axis (13), a second shaft (21') extending along a second axis (13') and secured to said impeller, and a coupling between said first and second shafts to substantially align said first and second axes wherein rotation of said first shaft about said substantially vertical first axis by said drive motor rotates said second shaft and the impeller secured thereto about said second axis, said coupling including at least first (101) and second (102) coupling members removably attached to one another wherein said second shaft (21') and the impeller (21) secured thereto can be selectively removed from attachment to said first shaft (17') and wherein one (101) of said coupling members has at least a pair of legs (105) extending along said first axis (13), said legs being spaced from one another to create a gap therebetween, the other (102) of said coupling members having a substantially square head (106), said substantially square head (106) being selectively, removably receivable between the legs (105) of said one coupling in first and second positions relative to said first axis (13) and securable therebetween, said first and second positions being spaced substantially 90 degrees from one another about said first axis (13).

* * * * *